(12) United States Patent
Kim et al.

(10) Patent No.: US 10,548,067 B2
(45) Date of Patent: Jan. 28, 2020

(54) APPARATUS AND METHOD FOR TRANSMITTING AND RECEIVING IN MOBILE COMMUNICATION SYSTEM

(71) Applicant: Samsung Electronics Co., Ltd., Suwon-si, Gyeonggi-do (KR)

(72) Inventors: Soeng-Hun Kim, Suwon-si (KR); Gert-Jan Van Lieshout, Staines (GB); Himke Van Der Velde, Staines (GB); Kyeong-In Jeong, Suwon-si (KR); Sang-Bum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 14/654,715

(22) PCT Filed: Dec. 20, 2013

(86) PCT No.: PCT/KR2013/011983
§ 371 (c)(1),
(2) Date: Jun. 22, 2015

(87) PCT Pub. No.: WO2014/098534
PCT Pub. Date: Jun. 26, 2014

(65) Prior Publication Data
US 2015/0334637 A1 Nov. 19, 2015

(30) Foreign Application Priority Data

Dec. 20, 2012 (KR) .................. 10-2012-0149777
Apr. 15, 2013 (KR) .................. 10-2013-0041306
(Continued)

(51) Int. Cl.
H04W 48/12 (2009.01)
H04W 72/04 (2009.01)
(Continued)

(52) U.S. Cl.
CPC ....... *H04W 48/12* (2013.01); *H04W 72/0413* (2013.01); *H04W 72/005* (2013.01);
(Continued)

(58) Field of Classification Search
None
See application file for complete search history.

(56) References Cited

U.S. PATENT DOCUMENTS

2009/0316615 A1* 12/2009 Vedantham ....... H04W 36/0007
370/312
2010/0158147 A1 6/2010 Zhang et al.
(Continued)

FOREIGN PATENT DOCUMENTS

| CN | 102480689 A | 5/2012 |
|----|----|----|
| CN | 1735231 A | 2/2016 |
| KR | 10-2012-0034159 A | 4/2012 |

OTHER PUBLICATIONS

3GPP TSG-RAN WG2 Meeting #79, "Introducing MBMS enhancements for REL-11", Aug. 2012, Whole Document.*
(Continued)

*Primary Examiner* — Adnan Baig
(74) *Attorney, Agent, or Firm* — Jefferson IP Law, LLP

(57) ABSTRACT

An apparatus and a method for receiving a broadcast service from a cell supporting multiple frequency bands for a frequency by a UE in a wireless communication system is provided. The method includes determining whether a supportable frequency band combination includes a frequency band of a frequency at which a particular broadcast service may be received, and if the supportable frequency band combination includes the frequency band, transmitting, to a base station, a control message including identification information corresponding to a frequency of the broadcast service desired to be received.

8 Claims, 33 Drawing Sheets

(30) Foreign Application Priority Data

Apr. 16, 2013 (KR) .................. 10-2013-0041717
May 20, 2013 (KR) .................. 10-2013-0056759

(51) Int. Cl.
*H04W 88/08* (2009.01)
*H04W 88/02* (2009.01)
*H04W 72/00* (2009.01)

(52) U.S. Cl.
CPC ........ *H04W 72/0453* (2013.01); *H04W 88/02* (2013.01); *H04W 88/08* (2013.01)

(56) References Cited

U.S. PATENT DOCUMENTS

| | | | |
|---|---|---|---|
| 2011/0070905 A1 | 3/2011 | Kazmi et al. | |
| 2011/0134774 A1 | 6/2011 | Pelletier et al. | |
| 2011/0243056 A1 | 10/2011 | Jen | |
| 2012/0058772 A1* | 3/2012 | Kazmi | H04W 72/048 455/450 |
| 2012/0076042 A1 | 3/2012 | Chun et al. | |
| 2012/0164939 A1* | 6/2012 | Ito | H04B 7/15535 455/7 |
| 2012/0275369 A1 | 11/2012 | Zhang et al. | |
| 2014/0036676 A1* | 2/2014 | Purnadi | H04W 36/0055 370/235 |
| 2014/0228030 A1* | 8/2014 | Jung | H04W 8/26 455/436 |
| 2014/0269566 A1* | 9/2014 | Wang | H04W 4/06 370/329 |

OTHER PUBLICATIONS

Samsung, Introducing MBMS enhancements for REL-11, 3GPP TSG-RAN WG2 Meeting #79, R2-124261, Qingdao, P.R. of China, Sep. 9, 2012.
Ericsson et al., MBMS interest indication and RRC signaling details, 3GPP TSG-RAN WG2 #77bis, R2-122705, Prague, Czech Republic, May 14, 2012.
LG Electronics, Inc., UE Interested to Receive MBMS on a Frequency Under IDS Interference, 3GPP TSG-RAN WG2 Meeting #80, Nov. 12-16, 2012, R2-125527, New Orleans, LA, USA.
Samsung, Extension of FBI and EARFCN, 3GPP TSG-RAN2 Meeting #80, Oct. 8-12, 2012, R2-125428, Bratislava, Slovakia.
Huawei, Hisilicon, Correction to MBMS Service Continuity, 3GPP TSG-RAN WG2 Meeting #80, Dec. 12-16, 2012, R2-126077, New Orleans, USA.
Ericsson, St-Ericsson, On Bursts of MBMS Interest Indications, 3GPP TSG-RAN2 Meeting #80, Nov. 12-16, 2012, R2-125607, New Orleans, USA.
"3rd Generation Partnership Project; Technical Specification Group Services and System Aspects; Multimedia Broadcast/Multicast Service(MBMS); Architecture and functional description (Release 11)", XP050915347, 3GPP TS 23.246 v11.1.0, Mar. 2012.
"Ericsson", MBMS User Service Description file, 3GPP TSG-SA4#32, Tdoc S4-040464, XP050286975, Aug. 16-20, 2004.
"3rd Generation Partnership Project; Technical Specification Group Services and System Aspects; Multimedia Broadcast/Multicast Service (MBMS); Architecture and functional description (Release 11)", Mobile Competence Center, 3GPP Draft; 23.246-V11.1.0, Mar. 8, 2012.
Korean Examination Report dated Mar. 7, 2019, issued in Korean Application No. 10-2013-0056759.

* cited by examiner

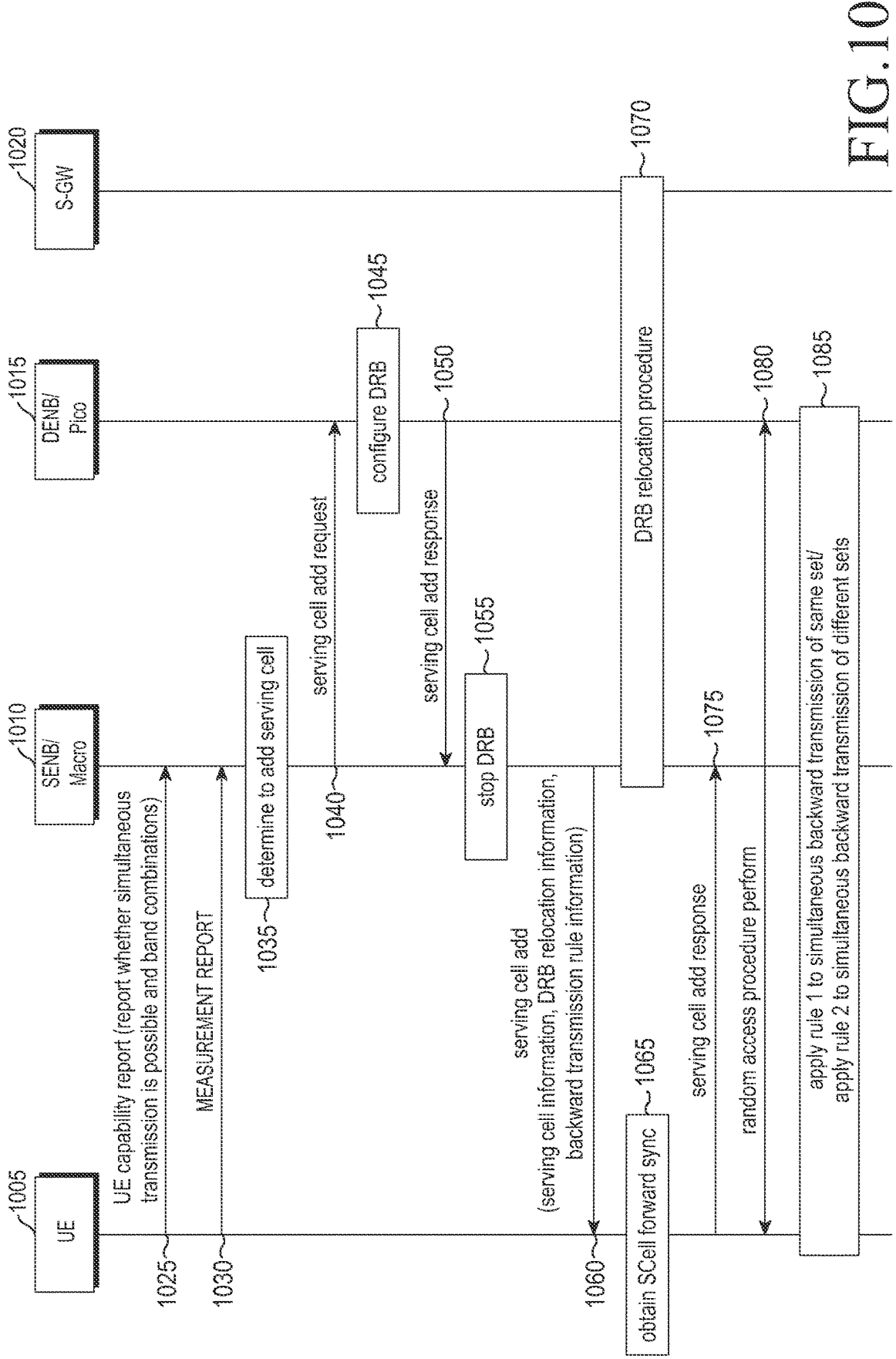

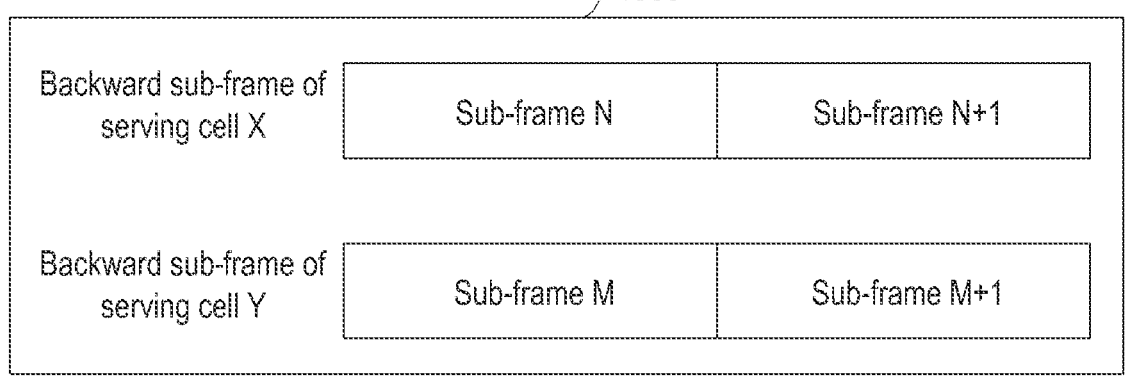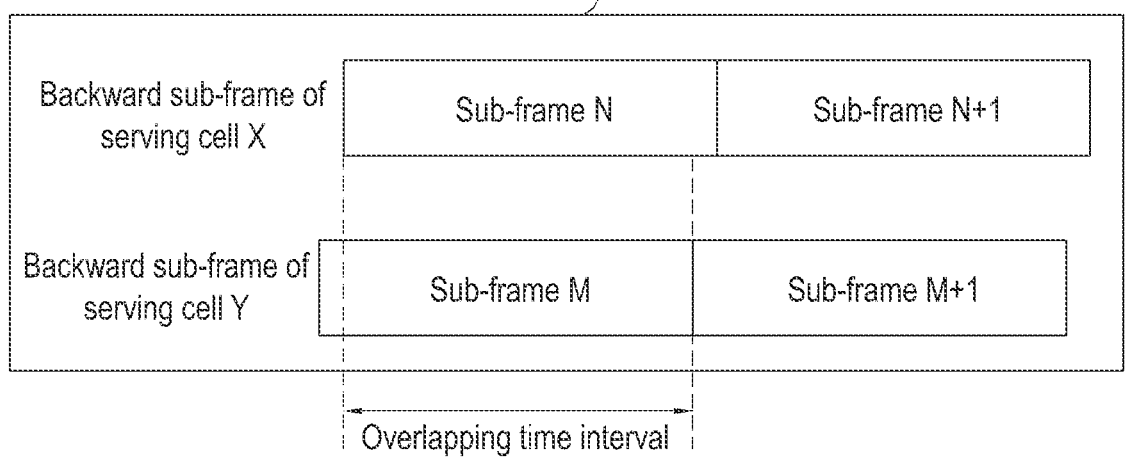
FIG.13

APPARATUS AND METHOD FOR TRANSMITTING AND RECEIVING IN MOBILE COMMUNICATION SYSTEM

CROSS-REFERENCE TO RELATED APPLICATION(S)

This application is a U.S. National Stage application under 35 U.S.C. § 371 of an International application filed on Dec. 20, 2013 and assigned application number PCT/KR2013/011983, which claimed the benefit of a Korean patent application filed on Dec. 20, 2012 in the Korean Intellectual Property Office and assigned Serial number 10-2012-0149777, and of a Korean patent application filed on Apr. 15, 2013 in the Korean Intellectual Property Office and assigned Serial number 10-2013-0041306, and of a Korean patent application filed on Apr. 16, 2013 in the Korean Intellectual Property Office and assigned Serial number 10-2013-0041717, and of a Korean patent application filed on May 20, 2013 in the Korean Intellectual Property Office and assigned Serial number 10-2013-0056759, the entire disclosure of each of which is hereby incorporated by reference.

TECHNICAL FIELD

The present disclosure relates to apparatuses and methods for communicating signals using a plurality of carriers in mobile communication systems.

BACKGROUND

Mobile communication systems are being developed to provide communication services to users while the users are on the move. Mobile communication systems, starting with voice communication services, are now able to offer high-speed data communication services.

For example, mobile communication systems for high-data communication services have evolved from the 3rd Generation Partnership Project (3GPP) system to the Long Term Evolution (LTE) system. The LTE system enables high-data communication services at a speed up to 100 Mbps.

The LTE system is now progressing to the LTE-Advanced (LTE-A) system for increased transmission speed. A representative technique as newly adopted for the LTE-A system is carrier aggregation.

Carrier aggregation is a technology in which a user equipment (UE) communicates signals using multiple forward (or downlink) carriers and multiple backward (or uplink) carriers. As an example, the LTE-A system is highly likely to adopt intra-evolved Node B (eNB) carrier aggregation.

The above information is presented as background information only to assist with an understanding of the present disclosure. No determination has been made, and no assertion is made, as to whether any of the above might be applicable as prior art with regard to the present disclosure.

SUMMARY

Typically, intra-evolved Node B (eNB) carrier aggregation may fail to aggregate a macro cell and multiple pico cells in a communication system operating the macro cell and the pico cells in an overlapping manner.

Aspects of the present disclosure are to address at least the above-mentioned problems and/or disadvantages and to provide at least the advantages described below. Accordingly, an aspect of the present disclosure is to provide an apparatus and method for communicating signals by applying inter-eNB carrier aggregation to different eNBs in a mobile communication system.

Another aspect of the present disclosure is to provide an apparatus and method for performing backward transmission pursuant to the optimal transmission rule considering the eNB where a plurality of serving cells belong when backward transmission to the plurality of serving cells in a mobile communication system.

Another aspect of the present disclosure is to provide an apparatus and method for transmitting signals based on a transmission rule considering the configuration of a primary serving cell (P_Cell) and at least one secondary serving cell (S_Cell) in a mobile communication system.

Another aspect of the present disclosure is to provide an apparatus and method for transmitting signals first to a primary serving cell in case the primary serving cell and at least one secondary serving cell, which are controlled by different eNBs, overlap in backward transmission interval in a mobile communication system.

Another aspect of the present disclosure is to provide an apparatus and method for transmitting a signal with a relatively material attribute among signals to be transmitted to a primary serving cell and at least one secondary serving cell in case the primary serving cell and the secondary serving cell, which are controlled by the same eNB, overlap in backward transmission interval in a mobile communication system.

Another aspect of the present disclosure is to provide an apparatus and method for transferring, from an eNB to a User Equipment (UE), as system information, information regarding a data transmission rate predictable by the eNB in the current cell in a mobile communication system.

Another aspect of the present disclosure is to provide an apparatus and method for determining a second best signal transmission scheme depending on the reason for failure of random access in a mobile communication system.

Another aspect of the present disclosure is to provide an apparatus and method for determining whether the reason for failure of random access comes from congestion or comes from an imbalance between forward transmission and backward transmission and supporting signal communication differentiated considering a result of the determination in a mobile communication system.

Another aspect of the present disclosure is to provide an apparatus and method for allocating a center frequency of a target cell for handover in a mobile communication system using multiple frequency bands.

Another aspect of the present disclosure is to provide an apparatus and method for determining, by a UE, whether there is a change in Status Information (SI) by an eNB in a mobile communication system using a long discontinuous reception cycle (DRX).

Another aspect of the present disclosure is to provide an apparatus and method for supporting easy paging reception in a Machine Type Communications (MTC) device with a long communication period upon communicating with an eNB.

Another aspect of the present disclosure is to provide an apparatus and method for selectively using, by a UE, Multimedia Broadcast Multicast Services (MBMSs) supported by an eNB in a mobile communication system using multiple frequency bands.

Another aspect of the present disclosure is to provide an apparatus and method for, upon failure of a Scheduling Request (SR), performing different random access procedures depending on the type of a cell where the SR failure occurs in a mobile communication system.

Another aspect of the present disclosure is to provide an apparatus and method for performing handover by a UE exchanging control messages with multiple cells in a mobile communication system.

In accordance with an aspect of the present disclosure, a method for receiving a broadcast service from a cell supporting multiple frequency bands for a frequency by a UE in a wireless communication system is provided. The method includes determining whether a supportable frequency band combination includes a frequency band of a frequency at which a particular broadcast service may be received, and if the supportable frequency band combination includes the frequency band, transmitting, to a base station, a control message including identification information corresponding to a frequency of the broadcast service desired to be received.

In accordance with another aspect of the present disclosure, a UE receiving a broadcast service from a cell supporting multiple frequency bands for a frequency in a wireless communication system is provided. The UE includes a controller configured to determine whether a supportable frequency band combination includes a frequency band of a frequency at which a particular broadcast service may be received, and if the supportable frequency band combination includes the frequency band, to determine to transmit, to a base station, a control message including identification information corresponding to a frequency of a broadcast service desired to be received and a transmitting unit configured to transmit the control message to the base station in response to a request from the controller.

In accordance with another aspect of the present disclosure, a method for supporting a broadcast service for a UE by a serving cell supporting multiple frequency bands for a frequency in a wireless communication system is provided. The method includes transmitting a system information block including broadcast service-related information and receiving, from the UE, a control message including identification information corresponding to a frequency of a broadcast service desired to be received, which is identified based on the broadcast service-related information included in the system information block.

In accordance with another aspect of the present disclosure, a serving cell for supporting a broadcast service for a UE based on multiple frequency bands for a frequency in a wireless communication system is provided. The serving cell includes a transmitting unit configured to transmit a system information block including broadcast service-related information, a receiving unit configured to receive a control message from the UE and a controller, when receiving, through the receiving unit, a control message including identification information corresponding to a frequency of a broadcast service desired to be received, which is identified based on the broadcast service-related information included in the system information block, to provide a broadcast service considering frequency information included in the control message.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which

FIG. 10 is a view illustrating an overall signal processing procedure for a UE to transmit signals using a plurality of carriers in a mobile communication system according to an embodiment of the present disclosure;

FIG. 13 is a view illustrating an example where backward transmission intervals to two serving cells overlap each other on the time axis for applying an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
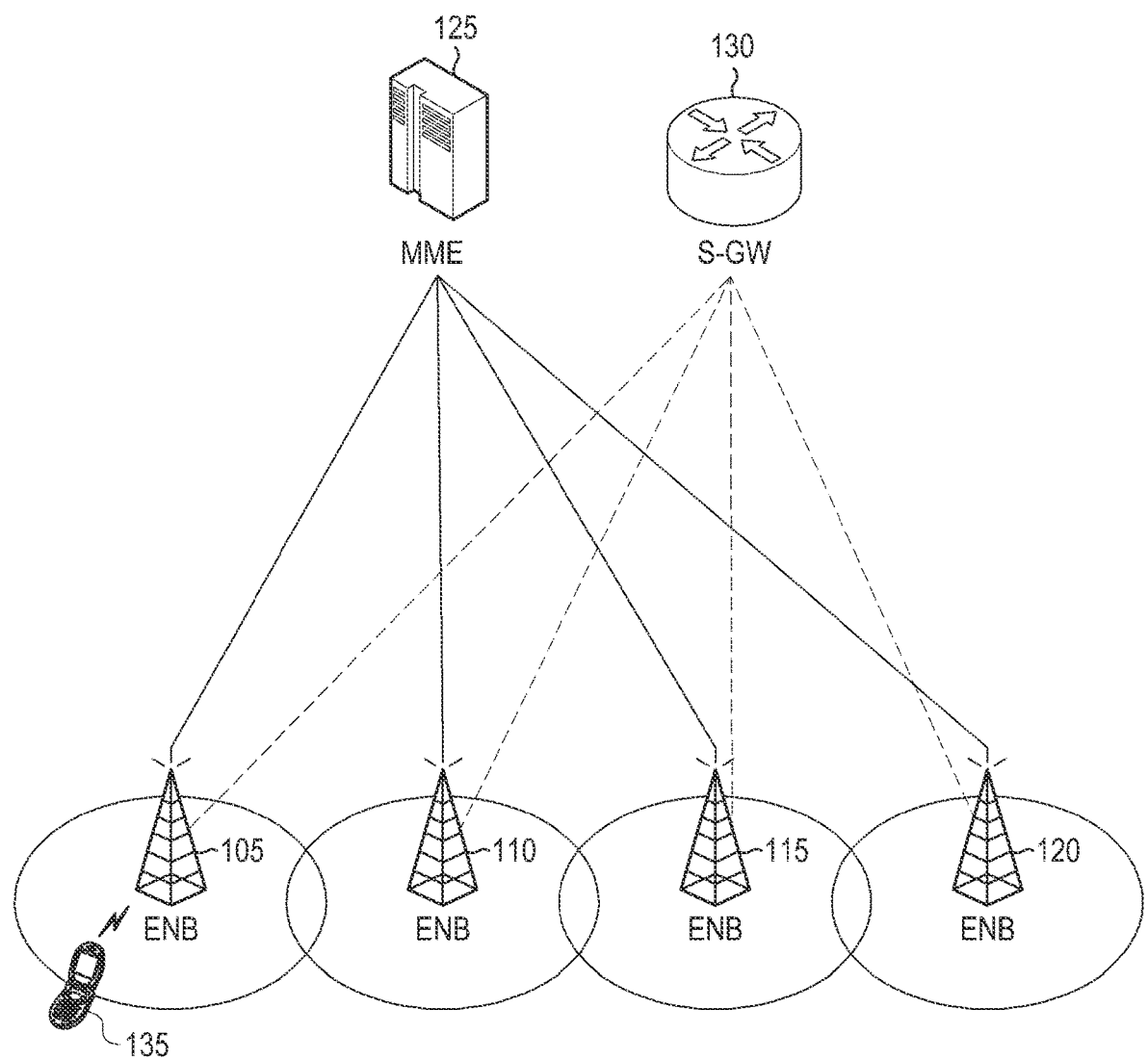
FIG. 1 is a view illustrating the structure of a Long Term Evolution (LTE) system according to an embodiment of the present disclosure.

FIG. 1 illustrates a structure of a Long Term Evolution (LTE) system according to an embodiment of the present disclosure. However, various embodiments of the present disclosure are not limited to the LTE system.

Referring to FIG. 1, a radio access network (RAN) forming the LTE system includes evolved Node Bs (hereinafter, denoted "eNBs," "Node B," or "base stations") 105, 110, 115, and 120, a mobility management entity (MME) 125, and a serving gateway (S-GW) 130. The eNBs 105, 110, 115, and 120 and the S-GW 130 connect a user equipment (hereinafter, denoted a "UE" or "terminal") 135 to an external network.

At least one of the eNBs 105, 110, 115, and 120 is connected with the UE 135 through a wireless channel. The eNBs 105, 110, 115, and 120 correspond to Node Bs in the Universal Mobile Telecommunications System (UMTS), but play more sophisticated roles as compared with the Node Bs.

For example, the LTE system serves most user traffic, including Voice over Internet Protocol (VoIP) or other real-time services, through a shared channel based on the IP. Accordingly, the LTE system requires a device for compiling state information, such as buffer state, available transmission power state, or channel state of the UE, and performing scheduling, and an eNB is in charge of the same.

The LTE system adopts, as a radio access technology, Orthogonal Frequency Division Multiplexing (OFDM) that is based on a 20 MHz bandwidth in order to implement a transmission speed of 100 Mbps.

An adaptive modulation & coding (AMC) scheme applies to the UE 135. The AMC scheme is a technique for adaptively using a modulation scheme and a channel coding rate considering the channel state.

The S-GW 130 generates or releases data bearers with the eNBs 105, 110, 115, and 120 and the external network under the control of the MME 125. The MME 125 is linked with the multiple eNBs 105, 110, 115, and 120 and is in charge of mobility of the UE 135 or other various control functions.

Figure 2:
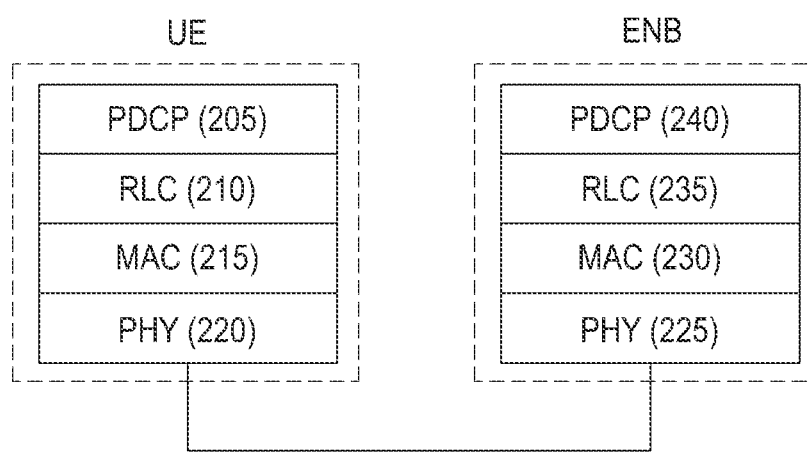
FIG. 2 is a view illustrating a structure of a wireless protocol in an LTE system according to an embodiment of the present disclosure.

FIG. 2 illustrates a structure of wireless protocols in an LTE system according to an embodiment of the present disclosure. In other words, FIG. 2 illustrates respective wireless protocol structures of a UE and an eNB constituting the LTE system.

Referring to FIG. 2, the respective wireless protocols of the UE and the eNB, respectively, include Packet Data Convergence Protocol (PDCP) Layers 205 and 240, Radio Link Control (RLC) Layers 210 and 235, Medium Access Control (MAC) Layers 215 and 230, and Physical (PHY) Layers 220 and 225.

The PDCP layers 205 and 240 are in charge of compression or restoration of an IP header. The RLC layers 210 and 235 reconfigure a PDCP packet data units (PDUs) into a proper size. In particular, the RLC layers 210 and 235 may perform, e.g., an Automatic Repeat-reQuest (ARQ) operation upon reconfiguring reception PDCP PDUs.

The MAC layers 215 and 230 form connections between various RLC layers and the physical layers configuring one UE or one eNB.

For example, the MAC layers 215 and 230 configure MAC PDUs by multiplexing RLC PDUs provided from the RLC layers 210 and 235. The MAC layers 215 and 230 transfer the configured MAC PDUs to the physical layers 220 and 225. Further, the MAC layers 215 and 230 extract the RLC PDUs by demultiplexing the MAC PDUs provided from the physical layers 220 and 225. The MAC layers 215 and 230 transfer the extracted RLC PDUs to the RLC layers 210 and 235.

The physical layers 220 and 225 generate OFDM symbols by channel-coding and modulating higher layer data and transmit the generated OFDM symbols through radio channels. The physical layers 220 and 225 perform demodulation and channel-decoding on the OFDM symbols received through the radio channels and transfer to higher layers. The higher layers of the physical layers may be the MAC layers.

The definitions of terms frequently used in the detailed description are given below.

"Carrier aggregation" (CA) may be appreciated as a technique in which, assuming that one carrier transmitted from one eNB (hereinafter, "forward carrier") and one carrier received by one eNB (hereinafter, "backward carrier") constitute one cell, a UE simultaneously communicate signals with several cells. In this case, the maximum data transmission rate of the UE is proportional to the number of carriers aggregated.

As termed below, "UE receives a signal through a forward carrier or transmits a signal through a backward carrier" includes, in its meaning, "signals or data are communicated using a control channel and data channel corresponding to a frequency band and center frequency specifying the forward and backward carriers.

As described below, CA may be represented as "multiple serving cells are configured." The multiple serving cells include, in its meaning, a primary serving cell (P_Cell) and a secondary serving cell (S_Cell).

As described below, the terms "primary set" and "non-primary sets" are used. The primary set means a set of serving cells controlled by an eNB controlling the P_Cell (hereinafter, "reference eNB"). The non-primary set means a set of serving cells controlled by an eNB controlling the P_Cell, but not a reference eNB, (hereinafter, "secondary eNB"). For example, the primary set includes one P-Cell and at least one S-Cell, and the non-primary set includes at least one S-Cell.

To that end, the eNB should be able to indicate to the UE, through a process of configuring a corresponding serving cell, whether a predetermined serving cell belongs to the primary set or the non-primary set. One primary set and one or more non-primary sets may be configured in one UE.

As described below, other terms than primary set and non-primary set may be used for better understanding. For example, primary set and non-primary set may be interchangeably used with primary carrier group and secondary carrier group, respectively. However, it should be noted that although denoted with different terms, what they mean remains the same.

It is preferable that the other terms as used herein to describe various embodiments are interpreted as typically defined in the LTE system.

Figure 3:
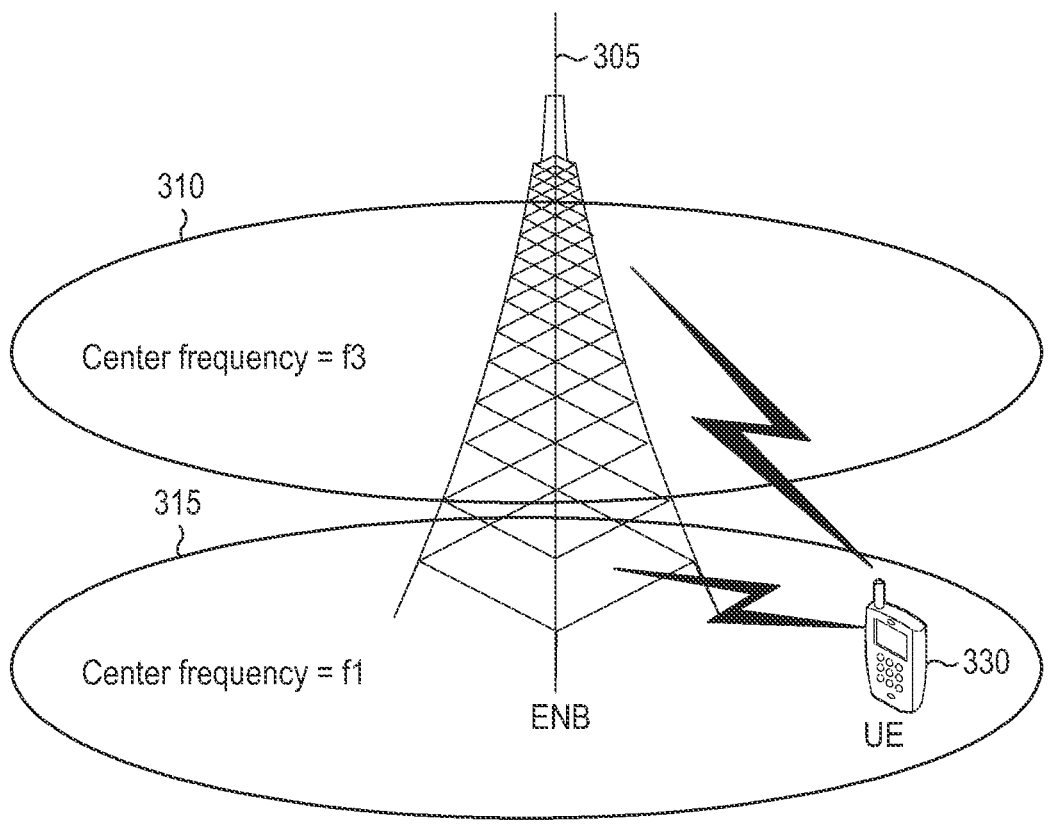
FIG. 3 is a view illustrating an example of communicating signals based on carrier aggregation (CA) in a mobile communication system according to an embodiment of the present disclosure.

FIG. 3 illustrates an example of communicating signals based on CA in a mobile communication system according to an embodiment of the present disclosure. FIG. 3 assumes one eNB.

Referring to FIG. 3, an eNB 305 communicates signals with a UE 330 using multiple carrier frequencies. The carrier frequencies may be distributed over several frequency bands and are distinguished from one another by center frequencies. That is, each of the multiple carrier frequencies has a different center frequency.

For example, in case multiple carrier frequencies respectively with center frequencies f1 315 and f3 310 are available, the eNB 305 communicates signals with one UE 330 using one of the multiple carrier frequencies. However, in case the UE 330 has CA capability, the eNB 305 may communicate with the UE 330 using the multiple carrier frequencies.

Accordingly, it is preferable in light of efficient use of resources that the eNB 305 determines whether to use the multiple carrier frequencies considering whether the UE has CA capability. That is, this makes it possible to provide a relatively higher data transmission rate to a UE with CA capability than to a UE with no CA capability.

As described below, the terms "intra-eNB CA" and "inter-eNB CA" are distinctively used depending on the environment where CA applies. "Intra-eNB CA" means that a UE aggregates a forward carrier frequency and a backward carrier frequency for communicating signals with one eNB. "Inter-eNB CA" means that a UE aggregates a forward carrier frequency and a backward carrier frequency for communicating with a plurality of different eNBs.

Figure 4:
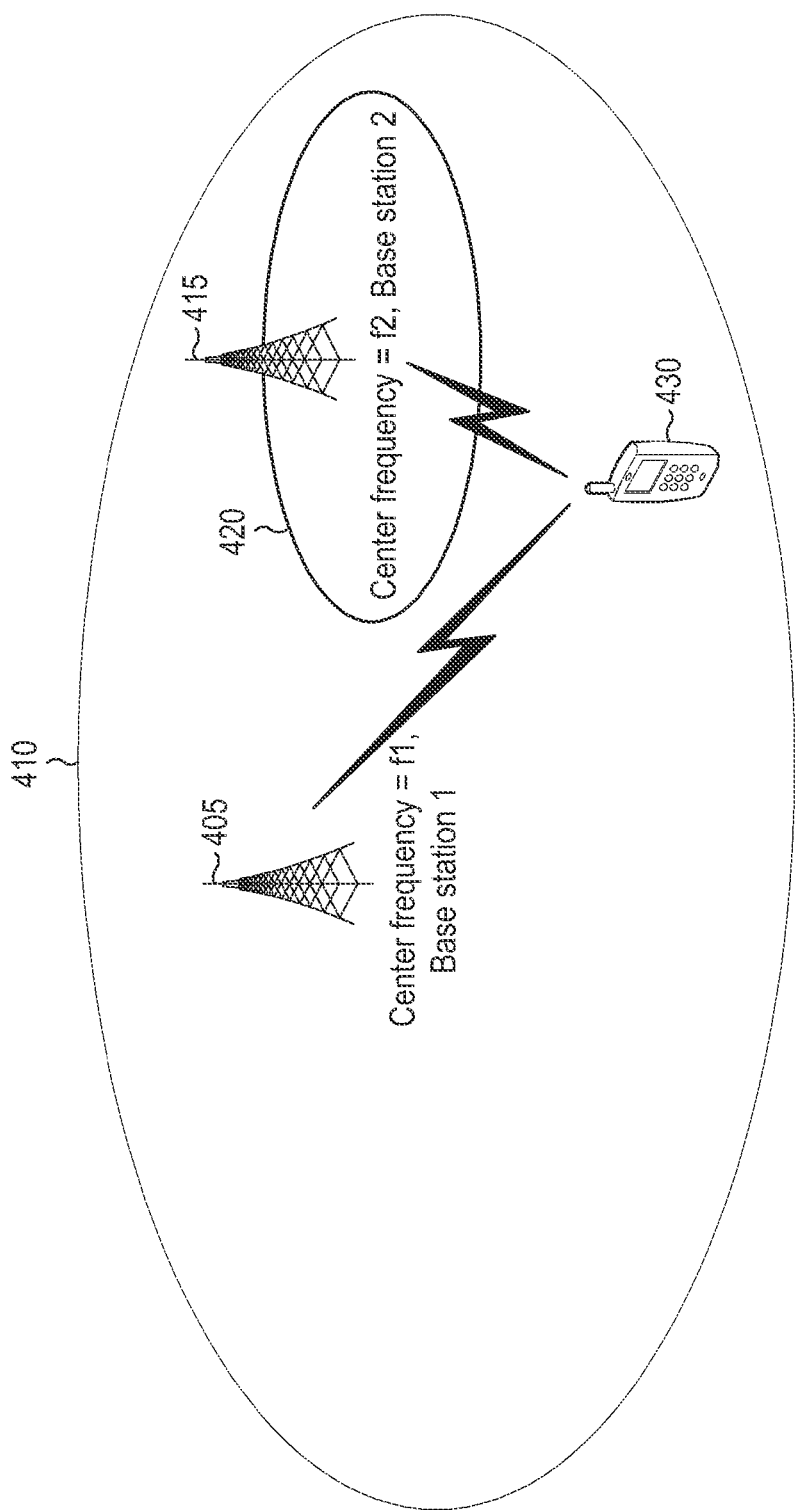
FIG. 4 is a view illustrating an example of transmitting signals based on inter-evolved Node B (eNB) CA in a mobile communication system according to an embodiment of the present disclosure.

FIG. 4 illustrates an example of transmitting signals based on inter-eNB CA in a mobile communication system according to an embodiment of the present disclosure.

Referring to FIG. 4, a first eNB 405 provides a communication service in first service coverage 410 using a carrier with a center frequency f1. A second eNB 415 provides a communication service in second service coverage 420 using a carrier with a center frequency f2. A UE 430 communicates with signals with the first eNB 405 using the carrier with the center frequency f1 and communicates with the second eNB 415 using the carrier with the center frequency f2.

The UE 430 may aggregate the carrier with the forward center frequency f1 and the carrier with the forward center frequency f2, resultantly to aggregate carriers communicated from one or more eNBs. This is called inter-eNB CA.

Figure 5:
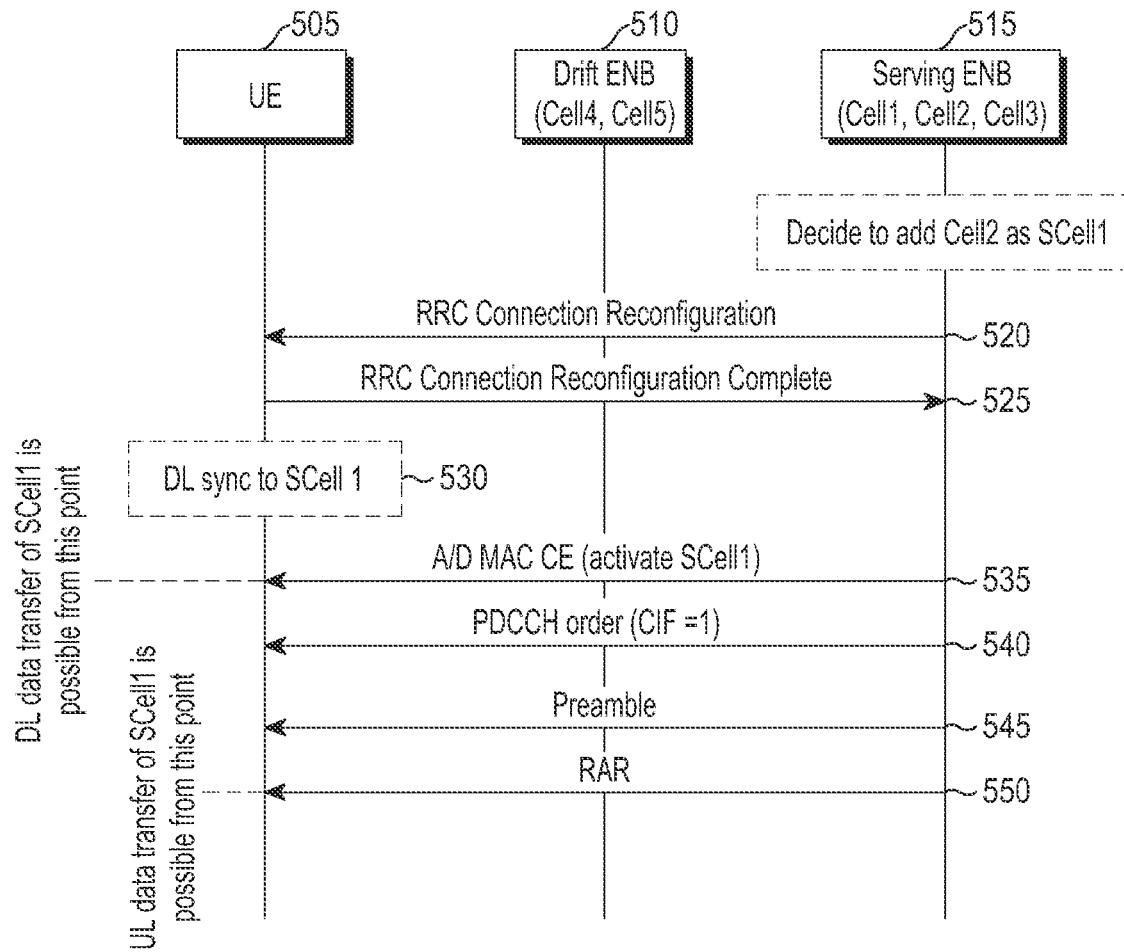
FIG. 5 is a view illustrating an example of a signal processing procedure for configuring a serving cell in a mobile communication system according to an embodiment of the present disclosure.

FIG. 5 illustrates an example of a signal processing procedure for configuring a serving cell in a mobile communication system according to an embodiment of the present disclosure. That is, FIG. 5 illustrates a signal processing procedure between a UE and an eNB for configuring an S-Cell belonging to primary set.

Referring to FIG. 5, a mobile communication system is assumed including one UE 505 and two eNBs (a first eNB 515 and a second eNB 510). Here, assume that the first eNB 515 is a serving eNB, and the second eNB 510 is a drift eNB.

The primary set supported for signal communication by the serving eNB 515 includes three cells (Cell 1, Cell 2, and Cell 3), and the non-primary set supported for signal communication by the drift eNB 510 includes two cells (Cell 4 and Cell 5). The serving eNB 515 controls the first, second, and third cells Cell 1, Cell 2, and Cell 3 included in the primary set, and the drift eNB 510 controls the fourth and fifth cells Cell 4 and Cell 5 included in the non-primary set.

Assume, with respect to the UE 505, the first cell Cell 1 is a P-Cell, and the other cells Cell 2, Cell 3, Cell 4, and Cell 5 are S_Cells. Among the S_Cells, the second cell Cell 2 is assumed to be an S_Cell to be newly added.

Referring to FIG. 5, the serving eNB 515 transmits an RRC message to the UE 505 at operation 520. In case the RRC message is transmitted as a control message for RRC connection reconfiguration, the RRC message contains information regarding the S_Cell to be newly added, i.e., the second cell.

The following Table 1 shows examples of information contained in the RRC message per cell transmitted for RRC connection reconfiguration.

TABLE 1

| Name | Description |
| --- | --- |
| S_CellIndex-r10 | An identifier of a serving cell. An integer with a predetermined size. Used to update information on serving cell in the future. |
| cellIdentification-r10 | Information for physically identifying serving cell. Consists of forward center frequency and physical cell Id (PCI). |
| radioResourceConfigCommonS_Cell-r10 | Information related to radio resource of serving cell. Includes, e.g., forward bandwidth, forward HARQ feedback channel configuration information, backward center frequency information, and backward bandwidth information. |
| radioResourceConfigDedicatedS_Cell-r10 | Information related to dedicated resource allocated to UE in serving cell. Includes, e.g., reference signal structure information for channel quality measurement and inter-carrier scheduling configuration information. |
| TAG (Timing Advance Group) info | Information indicating which TAG UE belongs to. May include, e.g., TAG id and Timing Advance (TA) timer. If UE belongs to P-TAG, this information is not signaled. |

Table 1 above defines Timing Advance Group (TAG) information. The TAG means a set of serving cells sharing the same backward transmission timing. For example, the TAG includes a primary TAG (P-TAG) and a secondary TAG (S-TAG). The P-TAG is a TAG configured by the P-Cell and at least one S_Cell, and the S-TAG is a TAG configured by at least one S_Cell only.

A serving cell belonging to a particular TAG means that the backward transmission timing of the serving cell is the same as the backward transmission timing of other serving cell belonging to the particular TAG. Typically, the TA timer enables determination as to whether backward sync has been achieved between serving cells belonging to a particular TAG.

As an example, the backward transmission timing for a TAG is established as a random access procedure is performed in a serving cell belonging to the TAG and may be maintained as a TA command is received. To that end, the UE drives or re-drives the TA timer of the TAG whenever receiving TA commands on a TAG. If the TA timer expires, the UE determines that the backward transmission sync of the TAG is lost and stops backward transmission until random access resumes.

The UE 505 transmits, to the serving eNB 515, a response message (RRC Connection Reconfiguration Complete) at operation 525 responsive to the received RRC message at operation 520. The UE 50, after transmitting the response message to the serving eNB 515, establishes forward sync for a first S_Cell (i.e., Cell 2) at operation 530. "UE establishes forward sync for a cell" means, e.g., obtaining a sync channel of the cell to acquire a forward frame transmission interval.

The serving eNB 515 transmits an MAC layer control command to the UE 505 at operation 535. The MAC layer control command is to request to activate the first S_Cell forward sync-established by the UE 505. As an example, the serving eNB 515 may transmit the MAC layer control command to the UE 505 at a time when the UE 505 is determined to have complete a configuration for the first S_Cell. The MAC layer control command may be an Activate/Deactivate MAC Control Element (A/D MAC CE).

For example, the MAC layer control command may be configured with a bitmap, each bit of which corresponds to a unique S_Cell. By way of example, a first bit in the bitmap configuring the MAC layer control command corresponds to the first S_Cell, a second bit to a second S_Cell, and an nth bit to an nth S_Cell. Each bit constituting the bitmap indicates activation or deactivation of a corresponding S_Cell.

The UE 505 starts to monitor the physical control channel of the first S_Cell a predetermined time after receiving the MAC layer control command. The physical control channel starting to monitor may be a physical dedicate control channel (PDCCH) providing forward and backward transmission resource allocation information.

If the first S_Cell belongs to the TAG with sync already established, the UE 505 may start signal communication in the forward and backward directions at the time of reception of the MAC layer control command.

However, if the first S_Cell belongs to the TAG with sync not established, the UE 505 initiates reception of a forward signal at the time of reception of the MAC layer control command, but not performs backward signal transmission. For example, the UE 505, upon reception of forward transmission resource allocation information through the PDCCH, receives forward data, and although backward transmission resource allocation information through the PDCCH, disregards it. That is, if an S_Cell where an MAC layer control command is received does not belong to a TAG with sync not established, the UE 505 waits without initiating data communication until a predetermined S_Cell belonging to the TAG receives a random access command through the PDCCH. Here, the random access command is for the case where a set value is recorded in a predetermined field constituting backward transmission resource allocation information, and is to instruct a predetermined serving cell to transmit a designated preamble. As an example, an identifier of a serving cell to perform preamble transmission may be indicated in a carrier indicator field (CIF) of the random access command.

The UE 505 receives the random access command instructing transmission of a random access preamble from the serving eNB 515 at operation 540. Here, the serving eNB 515 may be considered the first S_Cell.

The UE 505 transmits, to the serving eNB 515, the preamble indicated by the received random access command at operation 545. The UE 505 monitors a PDCCH to be transmitted from the P-Cell and receives a response message (Random Access Response (RAR) message) responsive to the transmitted preamble by monitoring the PDCCH at operation 550. The RAR message includes a TA command and other control information.

As an example, if the cell to which the UE 505 has transmitted the preamble is a cell controlled by the serving eNB 515, it is efficient in various aspects that the P-Cell responds to the preamble. That is, since RAR reception is done only in the P-Cell, the load of the UE 505 for PDCCH monitoring may be reduced.

The UE 505, upon reception of a valid response message from the P-Cell, determines that backward signal transmission is possible a predetermined period after the response message is received. For example, if a valid RAR is received in sub-frame n, backward transmission is considered to be possible from sub-frame (n+m).

Figure 6:
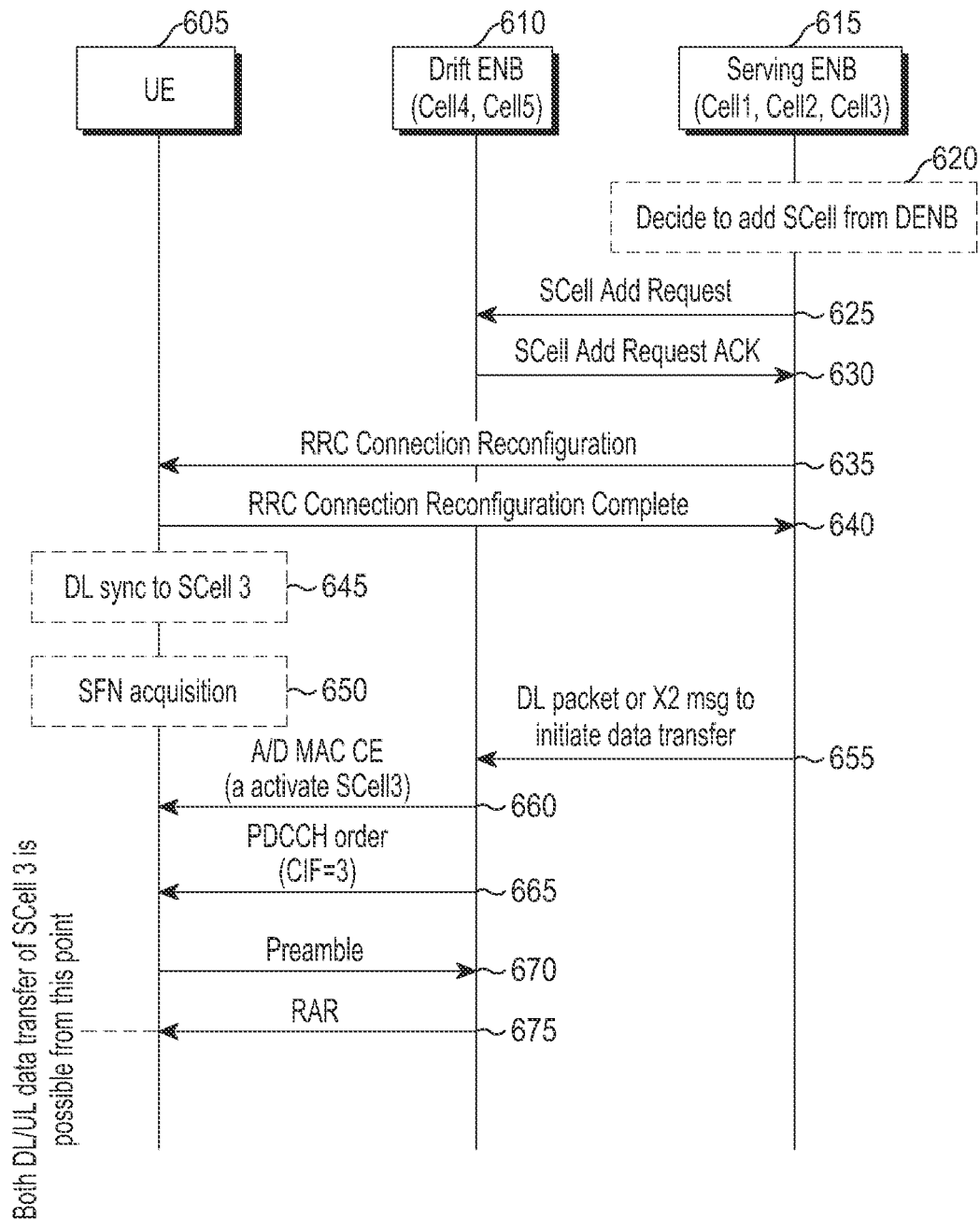
FIG. 6 is a view illustrating another example of a signal processing procedure for configuring a serving cell in a mobile communication system according to an embodiment of the present disclosure.

FIG. 6 illustrates an example of a signal processing procedure for configuring a serving cell in a mobile communication system according to an embodiment of the present disclosure. That is, FIG. 6 illustrates a signal processing procedure between a UE and an eNB for configuring an S-Cell belonging to a non-primary set.

Referring to FIG. 6, a serving eNB 615 determines to add an S_Cell for a UE 605 at a time. If the UE 605 is located in a cell region controlled by a drift eNB 610, the serving eNB 615 determines to add cells controlled by the drift eNB 610, i.e., the fourth and fifth cells Cell 4 and Cell 5 as S_Cells for the UE 605 at operation 620.

The serving eNB 615 transmits a control message (S_Cell Add Request) to the drift eNB 610 to request to add S_Cells according to the determination at operation 625.

The following Table 2 defines information contained the control message (S_Cell Add Request) to request to add S_Cells.

TABLE 2

| Name | Description |
| --- | --- |
| S_Cell id info | Information related to identifiers of S_Cells to be configured in D-eNB Includes one or more S_CellIndex-r10's. S-eNB determines and informs D-eNB to prevent identifier already in use in S-eNB from being reused. |
| TAG id info | Information related to identifier of TAG to be configured in D-eNB S-eNB determines and informs D-eNB to prevent identifier already in use in S-eNB from being reused. |
| backward scheduling-related information | Includes logical channel group information and priority information regarding logical channels configured in UE D-eNB interprets buffer state report information of UE using the information and performs backward scheduling. |
| Data transmission rate-related information | UE's predicted forward/backward data transmission rate information D-eNB determines whether to accept or reject S_Cell Add Request using the information. |

The drift eNB 610, upon reception of an S_Cell add request control message from the serving eNB 615, determines whether to accept or not considering the current load condition. If determining to accept, the drift eNB 610 transmits a response message (S_Cell Add Request ACK) to the serving eNB 615 at operation 630.

The following Table 3 defines information contained in the response message (S_Cell Add Request ACK) transmitted from the drift eNB 610 to the serving eNB 615.

TABLE 3

| Name | Description |
| --- | --- |
| S_CellToAddMod | Information related to S_Cells configured in D-eNB, and this information includes S_CellIndex-r10, cellIdentification-r10, radioResourceConfigCommonS_Cell-r10, radioResourceConfigDedicatedS_Cell-r10, and TAG-related information. |
| PUCCH information PUCCH S_Cell | PUCCH is configured in at least one of S_Cells belonging to non-primary set. Backward control information, such as HARQ for feedback, Channel Status Information (CSI), Sounding Reference Signal (SRS), or Scheduling Request (SR), is transmitted through PUCCH. Hereinafter, the S_Cell where PUCCH is transmitted is denoted "PUCCH S_Cell." lower level information of the backward control information contains identifier information of PUCCH S_Cell and PUCCH configuration information. |

TABLE 3-continued

| Name | Description |
| --- | --- |
| Information for data forwarding | Information regarding logical channel (or logic tunnel) to be used for data exchange between S-eNB and E-eNB. Includes information, such as GPRS Tunnel Protocol (GTP) tunnel identifier for forward data exchange and GTP tunnel identifier for backward data exchange. |
| UE's identifier | Cell Radio Network Temporary Identity (C-RNTI) to be used by UE in S_Cell of non-primary set. |

The serving eNB 615, upon reception of the response message from the drift eNB 610, generates an RRC control message (RRC Connection Reconfiguration) to instruct to add a serving cell and transmits the RRC control message to the UE 605 at operation 635.

The following Table 4 defines information contained in the RRC control message (RRC Connection Reconfiguration) transmitted from the serving eNB 615 to the UE 605.

TABLE 4

| Name | Description |
| --- | --- |
| S_CellAddMod | Information transferred from D-eNB is stored as is. That is, the same information as S_CellAddMod in Table 3. One S_CellAddMod is stored per S_Cell. S_CellAddMod is lower level information of S_CellAddModList. |
| PUCCH information for PUCCH S_Cell | Information transferred from D-eNB is stored as is. That is, the same information as PUCCH information for PUCCH S_Cell in Table 3. |
| Non-primary S_Cell List | Information regarding S_Cells belonging to non-primary set among S_Cells configured. May be identifiers of the S_Cells or identifiers of TAGs belonging to non-primary set. |
| UE's identifier | C-RNTI to be used by UE in serving cell of non-primary set. |

The RRC control message may contain configuration information on a plurality of serving cells. The RRC control message may be configured for both the serving cell of primary set and the serving cells of non-primary set.

For example, if the second cell, third cell, fourth cell, and fifth cell are configured as S_Cells for the UE with the first cell as its P-Cell, the information defined in Table 4 above may be arranged in the RRC control message (RRC Connection Reconfiguration) in various orders.

The UE 605 transmits, to the serving eNB 615, a response message (RRC Connection Reconfiguration Complete) responsive to the RRC control message received from the serving eNB 615 at operation 640.

The UE 605 establishes forward sync with at least one S_Cell newly configured at operation 645. The UE 605 obtains the system frame number (SFN) of the PUCCH S_Cell among the at least one S_Cell newly configured at operation 650. Obtaining the SFN is performed in the process of receiving system information called a master information block (MIB). For example, the SFN may be obtained as an integer incremented by one every 10 ms from 0 to 1023. The UE 605 may grasp the PUCCH transmission time of the PUCCH S_Cell using the SFN and the PUCCH configuration information. Thereafter, the UE 605 waits until the S_Cells are activated.

The drift eNB 610 receives forward data (DL packet) from the serving eNB 615 or receives a predetermined control message (X2 message to initiate data transfer) to instruct S_Cell at operation 655. The drift eNB 610, when receiving the control message to request activation of S_Cell or forward data, starts a procedure for activate S_Cell.

For example, the drift eNB 610 transmits, to the UE 605, an A/D MAC CE to instruct activation of S_Cell 3 at operation 660. The UE 605, if having received the A/D MAC CE in sub-frame n, activates S_Cell 3 in sub-frame (n+m1). However, since backward sync of PUCCH S_Cell is not yet established in sub-frame (n+m1), although S_Cell 3 is activated, none of forward/backward communication is possible. In other words, the UE 605 monitors PDCCH of activated S_Cell 3, but although receiving a forward/backward resource allocation signal, disregards it.

The drift eNB 610 transmits a random access command to the UE 605 at operation 665. The random access command instructs the UE 605 to establish backward sync of PUCCH S_Cell.

The UE 605 initiates a random access procedure in PUCCH S_Cell using a dedicated preamble indicated by the random access command. That is, the UE 605 transmits the preamble to the S_Cell controlled by the drift eNB 610 at operation 670. The UE 605 monitors a PDCCH to be transmitted from the S_Cell and receives a response message (RAR message) responsive to the transmitted preamble by monitoring the PDCCH at operation 675. The RAR message includes a TA command and other control information.

If the preamble has been transmitted in the primary set, the RAR message is transmitted from the P-Cell to the UE 605. Exchange of additional information may be required between the drift eNB 610 and the serving eNB 615 in order to process the RAT message in the P-Cell. For example, the UE 605 may receive the RAR message using a C-RNTI to be used in the non-primary set. Communication of the response message using the C-RNTI requires it to be known what UE the eNB having received the dedicated preamble should transmit the RAR message to. To that end, it should be assumed that the C-RNTI is previously allocated to the UE 605 and that the UE 605 uses a dedicated preamble. Accordingly, use of the C-RNTI to communicate the response message may prevent malfunctions due to collisions.

If the preamble has been transmitted in the non-primary set, the preamble is transferred from the PUCCH S_Cell or S_Cell to which the preamble has been transmitted to the UE 605. In this case, the UE 605 monitors the PDCCH of the PUCCH S_Cell or S_Cell to which the preamble has been transmitted in order to receive the RAR message.

The UE 605, upon reception of a valid response message from the PUCCH S_Cell or S_Cell to which the preamble has been transmitted, applies the TA command of the response message to adjust the backward transmission timing of the PUCCH S_Cell and the TAG where the PUCCH S_Cell belongs. The UE 605 activates backward at a predetermined time using the adjusted backward transmission timing. The predetermined time may be sub-frame (n+m2), when a valid TA command or valid random access response message is received in sub-frame n. Here, m2 is a predetermined integer.

If one or more serving cells are configured for the UE 605, the UE 605 may be instructed to simultaneously perform backward transmission in one or more serving cells. In this case, such simultaneous backward transmission may cause unexpected side effects depending on the capability or structure of the UE 605.

For example, if the UE 605 simultaneously performs backward transmission in serving cells respectively with center frequencies f1 and f2 using one power amp, it may cause undesired interference with other frequencies associated with the two frequencies and a predetermined equation, e.g., 2·f1−f2 or 2·f2−f1. However, use of a separate power amp in backward transmission at the two frequencies may avoid the above issues. Nonetheless, simultaneous transmission may result in insufficient transmission output.

In particular, when serving cells controlled by different eNBs are configured, since the different eNBs make scheduling determinations by driving separate schedulers, the eNBs cannot be avoided from the possibility that they simultaneously instruct backward transmission.

Accordingly, the UE using one power amp requires a scheme for preventing such backward transmission from being performed at the same time. As an example, the UE may consider applying strict time division scheduling to the primary set and the non-primary set. However, this may increase the complexity of the UE as well as deteriorate scheduling efficiency.

A solution to prevent the increase in the UE's complexity while addressing the side effects due to the simultaneous backward transmission may be prepared based on the following principles.

First, allow backward data transmission to be carried out through a pico cell as possible. In other words, the UE performs data communication through an activated pico cell. In this case, if the UE is located in the coverage of the pico cell, transmission of data to the pico cell may minimize the power consumption by the UE while increasing data transmission efficiency.

Second, transmit data with a higher degree of importance and an RRC control message related to mobility control through a macro cell. This is why pico cells with small service coverage may have reduced connection robustness.

Typically, a non-primary set is related to small cells such as pico cells, and a primary set is related with macro cells. Accordingly, if the above two principles are met, the UE may naturally perform backward transmission through a pico cell. That is, the possibility that simultaneous backward transmission occurs may be remarkably reduced.

If a plurality of backward transmission is simultaneously instructed, the UE grants priority to transmission of relatively more important data through backward transmission via a macro cell. As an example, if the time period when backward transmission is performed through a macro cell, at least partially, overlaps the time period when backward transmission is performed through a pico cell, the UE grant priority such that a relatively more important signal is transferred through backward transmission in the macro cell.

Figure 7:
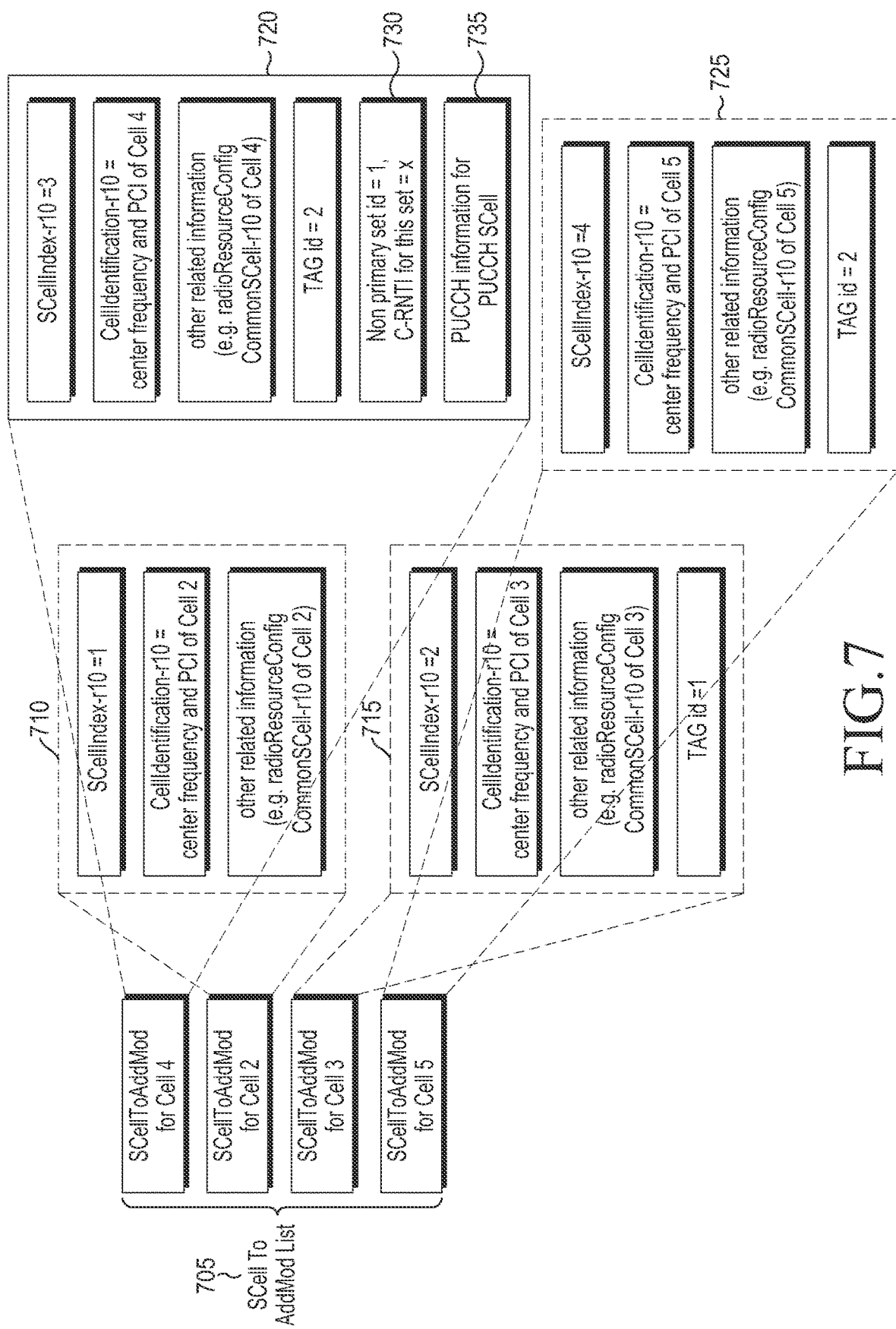
FIG. 7 is a view illustrating an example of a Radio Resource Control (RRC) control message (RRC Connection Reconfiguration) used for configuring a serving cell in a mobile communication system according to an embodiment of the present disclosure.

FIG. 7 illustrates an example of an RRC control message (RRC Connection Reconfiguration) used for configuring a serving cell in a mobile communication system according to an embodiment of the present disclosure.

Referring to FIG. 7, Cell 1 and Cell 2 with the same backward transmission timing configure a P-TAG, Cell 3 configures S-TAG 1, and Cell 4 and Cell 5 configure S-TAG 2.

An RRC control message includes an S_CellToAddModList 705. The S_CellToAddModList 705 includes an S_CellToAddMod 710 for Cell 2, an S_CellToAddMod 715 for Cell 3, an S_CellToAddMod 720 for cell 4, and an S_CellToAddMod 725 for Cell 5.

The S_CellToAddMod 710 for Cell 2 may or may not include particular information depending on the characteristics of the S_Cell. As an example, if Cell 2 belongs to the P-TAG, the S_CellToAddMod 710 does not include TAG-related information. Here, "Cell 2 belongs to the P-TAG" means that an S_Cell (=Cell 2) and the P-Cell have the same backward transmission timing. The S_CellToAddMod's 715, 720, and 725 for the S_Cells (Cell 3, Cell 4, and Cell 5) belonging to the other TAGs includes the identifiers of the TAGs where the S_Cells belong and TA timer values.

The S_CellToAddMod for at least one of the cells belonging to the non-primary set include non-primary set-related information. The non-primary set-related information may contain the identifier of the non-primary set and the C-RNTI of the UE that is to be used in the non-primary set. FIG. 7 illustrates an example in which non-primary set-related information 730 is included in the S_CellToAddMod 720 for Cell 4.

The S_CellToAddMod for one of the cells belonging to the non-primary set contains PUCCH configuration information. FIG. 7 illustrates an example in which PUCCH configuration information 735 is included in the S_CellToAddMod 720 for Cell 4.

For the S_Cells that belong to the non-primary set but do not contain the non-primary set-related information, the non-primary set-related information of the S_Cell with the same TAG id may apply likewise to the S_Cells. For example, if Cell 5 does not contain non-primary set-related information and Cell 4 with the same TAG id contains non-primary set-related information, the UE may use the C-RNTI and the identifier of the non-primary set contained in Cell 4 for Cell 5.

Figure 8:
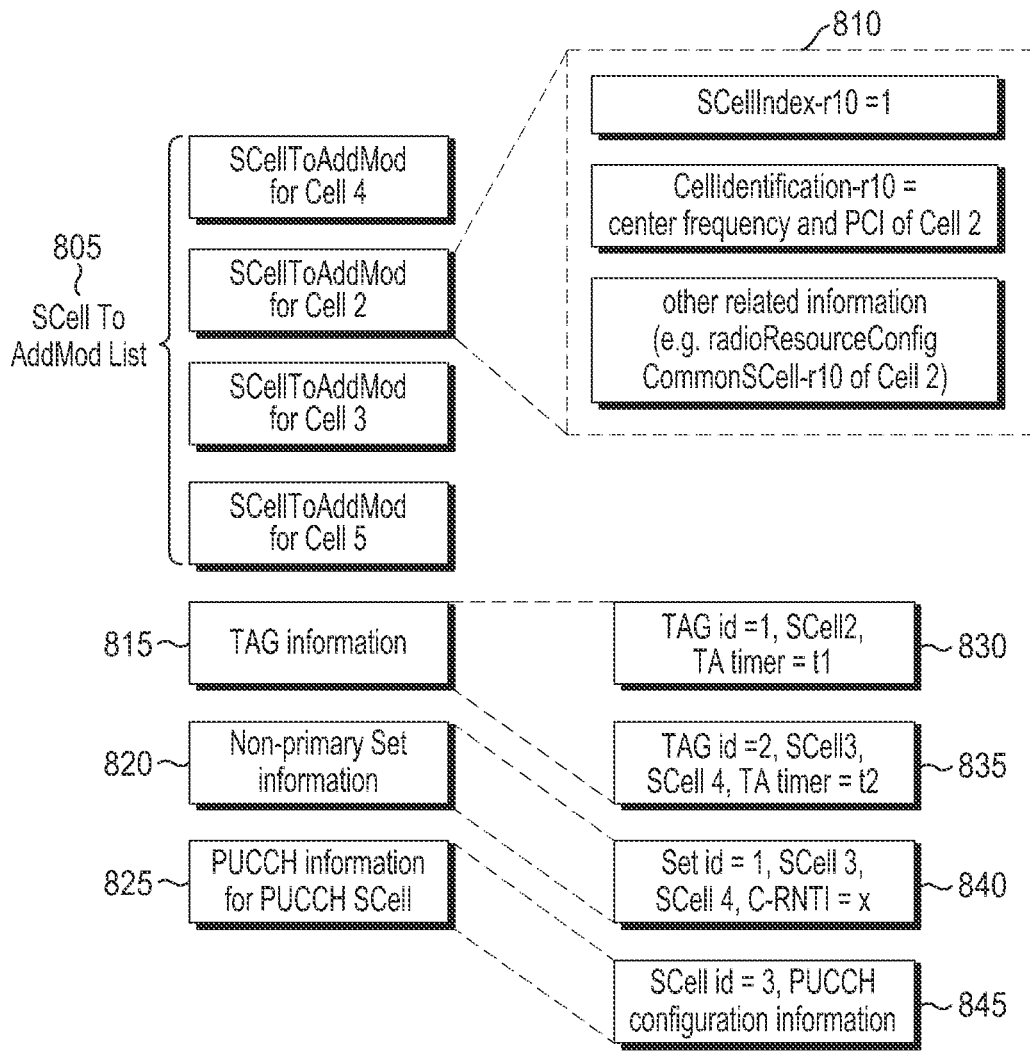
FIG. 8 is a view illustrating another example of an RRC control message (RRC Connection Reconfiguration) used for configuring a serving cell in a mobile communication system according to an embodiment of the present disclosure.

FIG. 8 illustrates another example of an RRC control message (RRC Connection Reconfiguration) used for configuring a serving cell in a mobile communication system according to an embodiment of the present disclosure. That is, FIG. 8 illustrates an example in which TAG-related information and non-primary set-related information are contained in a separate location, but not in an S_CellToAddMod.

Referring to FIG. 8, an RRC control message includes an S_CellToAddModList 805. The S_CellToAddModList 805 includes an S_CellToAddMod 810 for Cell 2, an S_CellToAddMod for Cell 3, an S_CellToAddMod for cell 4, and an S_CellToAddMod for Cell 5. The respective S_CellToAddMod's for the cells contain the same type of information. For example, each of the S_CellToAddMod's includes information such as S_CellIndex-r10, cellIdentification-r10, radioResourceConfigCommonS_Cell-r10.

The RRC control message may further include TAG-related information (TAG information) 815, non-primary set-related information (Non-primary Set information) 820, and PUCCH configuration information of PUCCH S_Cell (PUCCH information for PUCCH SCell) 825.

The TAG-related information 815 includes a TAG identifier (TAG id), an S_Cell (S_Cell 2) of at least one S_Cell constituting a TAG, and a TA timer value (TA time). For example, the TAG-related information 815 includes two pieces of TAG-related information, first TAG-related information 830 and second TAG-related information 835, respectively corresponding to two TAGs. The first TAG-related information 830 includes a TAG identifier (TAG id) "1," a serving cell identifier "S_Cell 2," and a TA timer value (TA time) "t1." The second TAG-related information 835 includes a TAG identifier (TAG id) "2," serving cell identifiers "S_Cell 3" and "S_Cell 4," and a TA timer value (TA time) "t2."

The non-primary set-related information 820 contains a set identifier (SET id) for each non-primary set, an identifier of at least one serving cell constituting a set (S_Cell #), and C-RNTI information (C-RNTI) to be used in a corresponding set. For example, the non-primary set-related information 820 includes one piece of non-primary set-related information 840 corresponding to one non-primary set. The non-primary set-related information 840 includes a set identifier (SET id) "1," serving cell identifiers "S_Cell 3" and "S_Cell 4," and C-RNTI information "x."

As another example, the non-primary set-related information 820 may include a TAG identifier (TAG id) instead of the serving cell identifiers (S_Cell #). For this, TAGs are presumed to be configured over multiple sets. As an example, the non-primary set-related information 820 may include a TAG identifier "TAG id 2" instead of the serving cell identifiers "S_Cell 3" and "S_Cell 4." In this case, the UE may determine that S_Cell 3 and S_Cell 4 belonging to TAG id 2 are non-primary set.

In contrast, primary set-related information is not signaled and may be determined based on a <primary set-related information determination rule>. For example, a serving cell belonging to the primary set may be determined by the P-Cell and at least one S_Cell that does not belong to any non-primary set, and a C-RNTI to be used in the primary set may be determined by a C-RNTI that is being used in the P-Cell.

The PUCCH configuration information 825 of the PUCCH S_Cell includes a non-primary set identifier, a PUCCH serving cell identifier, and PUCCH configuration information. One PUCCH S_Cell per non-primary set exists. CSI or HARQ feedback object information regarding the serving cells belonging to the non-primary set may be transmitted through a PUCCH configured in the PUCCH S_Cell.

As another example, rather than explicitly signaling the PUCCH S_Cell identifier, the PUCCH S_Cell may be determined according to a predetermined rule. As an example, the S_Cell corresponding to the first S_CellToAddMod of the S_CellToAddModList may be determined as the PUCCH S_Cell, the S_Cell with the highest S_Cell identifier among the S_Cells containing S_CellToAddMod information as the PUCCH S_Cell, or the S_Cell with the lowest S_Cell identifier as the PUCCH S_Cell. Such implicit determination scheme presumes that there is only one non-primary set.

Figure 9A:
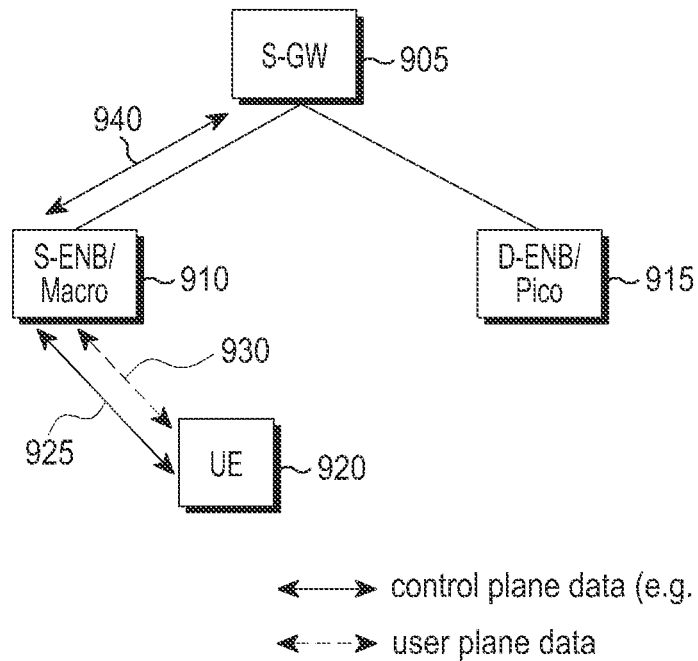
FIG. 9A is a view illustrating a signal communication scenario by a User Equipment (UE) located in the coverage of a macro cell (S-eNB) where a radio wave from a pico cell (D-eNB) does not reach in a mobile communication system according to an embodiment of the present disclosure.
Figure 9B:
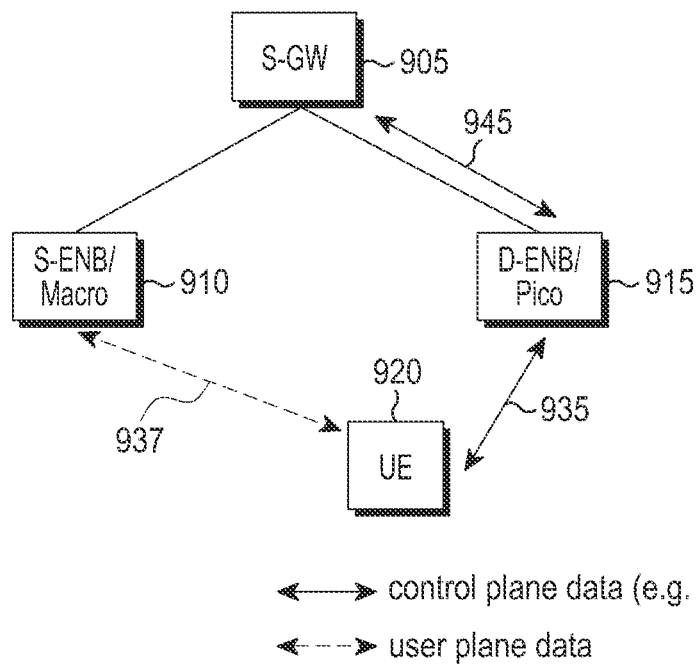
FIG. 9B is a view illustrating a signal communication scenario by a UE located in a coverage of a macro cell (S-eNB) where a radio wave from a pico cell (D-eNB) does not reach in a mobile communication system according to an embodiment of the present disclosure.

FIG. 9A illustrates a scenario in which a UE located in the coverage of a macro cell (S-eNB) which is not reached by a radio wave from a pico cell (D-eNB) communicates signals in a mobile communication system according to an embodiment of the present disclosure. FIG. 9B illustrates a scenario in which a UE located in the coverage of a macro cell (S-eNB) which is reached by a radio wave from a pico cell (D-eNB) communicates signals in a mobile communication system according to an embodiment of the present disclosure.

Referring to FIG. 9A, a UE 920 located in the coverage of the macro cell which is not reached by a radio wave from a pico cell communicates control plane data 925 and user plane data 930 with the eNB controlling the macro cell (i.e., S-eNB).

The control plane data 930 is processed by the S-GW 905. To that end, a S-eNB 910 forms a bearer 940 for communicating the control plane data with a S-GW 905.

Referring to FIG. 9B, the UE 920 located in a region reached by both a radio wave from the macro cell and a radio wave from a pico cell communicates control plane data 935 with the eNB (D-eNB) 910 controlling the pico cell and communicates user plane data 937 with the eNB (S-eNB) 910 controlling the macro cell. The D-eNB 910 forms a bearer 945 for communicating the control plane data with the S-GW 905.

In the scenarios illustrated in FIGS. 9A and 9B, the UE 920, if such a situation occurs where it should simultaneously perform backward transmission to the S-eNB 910 and the D-eNB 915, applies a predetermined rule to perform only one of the two backward transmission operations and do not perform the other backward transmission operation.

FIG. 10 illustrates an overall signal processing procedure for a UE to transmit signals using a plurality of carriers in a mobile communication system according to an embodiment of the present disclosure. In FIG. 10, assume that a micro cell is controlled by an S-eNB, and a pico cell is controlled by a D-eNB.

Referring to FIG. 10, a UE 1005, when predetermined conditions required in an LTE network are met, reports its capability to the S-eNB 1010 at operation 1025. For example, a representative example of the predetermined conditions is that an eNB requests the UE to report its capability.

A capability report message transmitted from the UE 1005 to the S-eNB 1010 to report the capability of the UE 1005 includes a frequency band list supported by the UE, a frequency band combination list supported by the UE, and an MIMO capability per frequency band combination. The capability report message may further include information indicating whether to be able to perform simultaneous transmission (or share a power amp) per frequency band combination supported by the UE.

In general, use of the same power amp in a band combination configured with the same frequency band would cause no unnecessary interference issue, or even so, would have little effect. Thus, the above-defined information may be reported only for frequency band combinations configured with different frequency bands among the frequency band combinations.

Assuming that a predetermined UE is supportive of frequency band A, frequency band B, and frequency band combinations as shown in the following Table 5, the UE reports whether to be able to do simultaneous transmission (or share a power amp) only for frequency band combination 3.

TABLE 5

| | Description |
|---|---|
| Combination A + A 1 | Indicates a total of two serving cells may be simultaneously configured in frequency band A. |
| Combination B + B 2 | Indicates a total of two serving cells may be simultaneously configured in frequency band B. |
| Combination A + B 3 | Indicates one serving cell in frequency band A and one serving cell in frequency band B may be simultaneously configured. |

As an example, if combination 3 as defined in Table 5 has been reported, this means that, even when the UE simultaneously performs backward transmission with the serving cell configured in frequency band A and the serving cell configured in frequency band B, there is no interference with other frequency having a predetermined relationship with the frequencies of the two serving cells. The UE may report that the power amp is not shared, instead of reporting that simultaneous backward transmission is possible.

If a predetermined event occurs under the circumstance where the UE communicates data with the S-eNB 1010 in the coverage of the macro cell, the UE transmits a measurement result message (Measurement Report) to the S-eNB 1010 at operation 1030. As an example, the predetermined event may be occurrence of a situation where the channel quality of a pico cell meets a predetermined reference. In this case, the particular result message may include a cell identifier and a channel quality or reference signal strength of a cell. The cell identifier is an identifier that indicates a cell meeting a predetermined channel quality reference, and an example thereof may be a physical layer cell identifier (PCI or Physical Cell Id). The channel quality of cell may be a channel quality measured for the cell corresponding to the cell identifier. The reference signal strength of cell may be a signal strength measured for a reference signal transmitted from the cell corresponding to the cell identifier.

The S-eNB 1010, upon reception of the measurement result message, recognizes that the UE 1005 is located in the coverage of the pico cell. The S-eNB 1010 determines to configure the pico cell for the UE 1005 as an additional serving cell at operation 1035. Data communication through the pico cell is efficient as compared with data communication through the macro cell. Accordingly, if the UE 1005 is located in the coverage of the pico cell, it is preferable to add the pico cell as a serving cell.

The S-eNB 1010 identifies the D-eNB 1015 controlling the pico cell by referencing the identifier of the pico cell. The S-eNB 1010 transmits a control message to the identified D-eNB 1015 to request to add as a serving cell at operation 1040.

The control message transmitted to request to add as a serving cell may include, in addition to the information defined in Table 2 above, information related to a data radio bearer (DRB) to be serviced through the D-eNB (hereinafter, "DRB-related information") and channel information for the serving cell requested to be additionally configured (hereinafter, "additional serving cell channel information").

The DRB means a radio bearer configured to process user plane data. If the UE enters the pico cell coverage, all or most user plane data is preferably processed through the pico cell. To that end, the S-eNB transfers information on DRBs to be processed through the pico cell to the D-eNB. For example, the DRBs-related information includes PDCP configuration information, RLC information, and logical channel-related information. The PDCP configuration information may include a PDCP header structure and header compression protocol-related information. The RLC information may include an RLC operation mode and various timers, and the logical channel-related information may include a logical channel identifier and priority.

The D-eNB determines final configuration information for the DRB by referencing the DRBs-related information to be processed through the pico cell, as transferred from the S-eNB. The final configuration information may contain channel information for the serving cell requested to be additionally configured.

The S-eNB 1010 transfers the channel quality information reported in the measurement report message by the UE 1005 to the D-eNB 1015. The D-eNB 1015 determines whether to accept the serving cell add request using the information and data transmission rate-related information.

The D-eNB 1015 determines whether to accept or reject the serving cell add request using channel information of the serving cell and UE's data transmission rate-related information.

The D-eNB 1015, upon determining to accept, configures one or more DRBs at operation 1045. The D-eNB 1015 processes the data communicated with the UE 1005 through one or more DRBs configured.

The configuration of DRBs by the D-eNB 1015 may be appreciated in the same meaning as configuring a PDCP layer and RLC layer to process a data stream requiring a predetermined QoS. The configuration of DRBs may be the same or different from the original configuration informed by the S-eNB 1010.

The D-eNB generates a control message to accept the S_Cell add request and transmits the control message to the S-eNB 1010 at operation 1050. The control message may include, in addition to the information defined in Table 3 above, a list of DRBs reconfigured for location and scheduling information process-related information.

The DRB configuration information, if identical to the DRB configuration used in the S-eNB 1010, may be omitted. The list of DRBs reconfigured for location, if all the DRBs are reconfigured for location, may be omitted. The DRB relocation is described below in further detail. The scheduling information process-related information includes scheduling-related information, such as a Buffer Status Report (BSR) or a Power Headroom Report (PHR). As an example, the scheduling-related information may include information regarding a triggering condition or a periodic reporting period. The scheduling information process-related information, if identical to the information for the S-eNB 1010, may be omitted.

The S-eNB 1010 receives a serving cell add response message from the D-eNB 1015 at operation 1050. The S-eNB 1010, after receiving the serving cell add response message, stops the forward operation on the DRB to be reconfigured for location at operation 1055. That is, the S-eNB 1010 stops the forward data transmission on the DRB and continues to receive and process the backward data on the DRB.

The S-eNB 1010 generates an RRC control message to instruct to add a serving cell and transmits the RRC control message to the UE 1005 at operation 1060. The control message may include, in addition to the information defined in Table 4 above, a list of DRBs reconfigured for location, scheduling information process-related information, and backward transmission rule information.

DRB configuration information: Information transferred from the D-eNB 1015 in operation 1050

List of DRBs reconfigured for location Information transferred from the D-eNB 1015 in operation 1050

Scheduling information process-related information: Information transferred from the D-eNB 1015 in operation 1050

Backward transmission rule information: Different backward transmission rules may apply depending on whether the serving cell configured in the UE 1005 is a cell in the primary set or a cell in the non-primary set. The backward transmission rule information is information indicating what backward transmission rule should be applied when the UE 1005 performs backward transmission in the serving cell configured.

The above pieces of information are coded in an ASN. 1 coding scheme by the S-eNB 1010 and transferred to the UE 1005.

When receiving the control message, the UE 1005 obtains forward sync on the S_Cell newly configured at operation 1065. The UE 1005, if ready to conduct a random access procedure on the S_Cell, generates a serving cell add response control message and transmits the serving cell add response control message to the S-eNB 1010 at operation 1075.

This is described in greater detail. The UE 1005, upon generating the serving cell add response control message, transmits a D-SR in the P-Cell or initiates a random access procedure in the P-Cell to request to allocate a resource for transmitting the serving cell add response control message. If a backward resource is allocated by a cell belonging to the primary set in response to the request, the UE 1005 transmits the serving cell add response control message to the S-eNB 1010 using the allocated resource.

If the UE 1005 receives an HARQ ACK or RLC ACK responsive to the serving cell add response control message, the UE 1005 initiates a random access procedure in a predetermined serving cell of the non-primary set at operation 1080. The UE 1005 determines a serving cell of the non-primary set to initiate the random access procedure.

As an example, in case there is one serving cell, where random access-related information is configured, among the serving cells in the non-primary set, the UE 1005 determines to perform random access in the serving cell.

In case there are a plurality of serving cells, where random access-related information is configured, among the serving cells in the non-primary set, the UE 1005 determines to perform random access in a serving cell including the PUCCH S_Cell among the plurality of serving cells.

In case there are a plurality of serving cells with random access-related information configured among the serving cells in the non-primary set and the plurality of serving cells do not include the PUCCH S_Cell, the UE 1005 determine to perform random access in, among serving cells containing random access-related information, the serving cell, where serving cell information has been configured earlier than the other serving cells.

In case there are a plurality of serving cells with random access-related information configured among the serving cells in the non-primary set and the plurality of serving cells do not include the PUCCH S_Cell, the UE 1005 determines to perform random access in a serving cell explicitly indicated by an eNB.

The random access procedure includes a process in which the UE 1005 transmits a preamble, as a predetermined frequency resource for a serving cell, in a sub-frame, receives a response message responsive to the preamble transmission, and performs backward transmission according to control information contained in the response message. A detailed description is given below.

If the random access procedure is complete as described supra, the D-eNB 1015 determines that the UE 1005 can perform data communication in an S_Cell of the non-primary set and initiates scheduling for the UE 1050.

In such case, such an event may occur where the UE 1005 should simultaneously perform backward transmission in a serving cell of the primary set and a serving cell of the non-primary set. The UE 1005 applies backward transmission rule 1 to the case where the simultaneous transmission is for backward transmission for the same set. The UE 1005 applies backward transmission rule 2 to the case where the simultaneous transmission is for backward transmission for different sets at operation 1085. Backward transmission rule 1 and backward transmission rule 2 are described below.

The S-eNB 1010 transmits a serving cell add control message to the UE 1005 and then performs a DRB relocation procedure with the D-eNB 1015 and the S-GW 1020 at operation 1070. The procedure includes a process of transferring data of DRSs to be processed in the D-eNB 1015 from the S-eNB 1010 to the D-eNB 1015 and a process of releasing an EPS bearer corresponding to a reconfigured DRB among EPS bearers configured between the S-GW 1020 and the S-eNB 1010 and reconfiguring an EPS bearer between the S-GW 1020 and the D-eNB 1015.

In order for the D-eNB 1015 to quickly initiate data communication, the UE 1005 may process a random access procedure for the D-eNB 1015 before transmitting a serving cell add response message.

For example, when an S_Cell receives the serving cell add control message and is ready to initiate random access, the UE 1005 initiates the random access procedure. The serving cell add response message may be transmitted after the random access procedure is complete or in parallel with the random access procedure. As an example, the UE 1005 transmits the serving cell add response message only when backward transmission resources for the serving cells in the primary set become available so that the serving cell add response message is transmitted to the S-eNB 1010.

Now defined are backward transmission rules according to an embodiment of the present disclosure.

Newly defined backward transmission rules are rules for selecting backward transmission to be performed when such an event occurs where a UE incapable of simultaneous transmission in two or more serving cells is requested to perform simultaneous backward transmission in two or more serving cells. The defined backward transmission rules may also include a rule by which the UE selects a transmission operation for which to reduce transmission power among the transmission operations simultaneously performed when simultaneous backward transmission runs short of transmission power.

Granting a higher priority to a backward transmission operation (e.g., backward transmission A) than to another backward transmission operation (e.g., backward transmission B) as described below means that a UE incapable of performing the backward transmission operations simultaneously performs only the higher-priority backward transmission without performing the lower-priority backward transmission. In case the UE can simultaneously perform the backward transmission operations, but is short of transmission power, the UE reduces the transmission power for the backward transmission in order of priority. That is, the UE reduces the transmission power in ascending order of priority, i.e., starting from a backward transmission operation with a lower priority.

Backward transmission rule 1 applies to the case where serving cells requiring simultaneous transmission belong to the same set (i.e., the case where the serving cells are controlled by the same eNB, the same scheduler).

For example, if the UE should perform backward transmission in sub-frame x' for serving cell x and in sub-frame y' for serving cell y, serving cell x and serving cell y both belong to the primary set or non-primary set, and x' and y' at least partially overlap each other on the time axis, the UE applies backward transmission rule 1.

Since in the situation backward transmission is controlled by the same eNB, the eNB may recognize that the UE incapable of simultaneous transmission is being required to do simultaneous transmission or the eNB may fail to recognize that simultaneous transmission is required due to unexpected errors.

For example, the first situation may arise, e.g., when PUSCH transmission and HARQ feedback transmission should be performed at the same time. In this case, strictly prohibiting the above situation from occurring in the eNB might put serious restrictions to forward scheduling or backward scheduling. Accordingly, the situation is allowed to arise. However, it is preferable that when the above situation arises, the UE and the eNB communicate signals in the same manner.

For example, the second situation may arise, e.g., when HARQ feedback transmission and SR transmission should be carried out at the same time. The eNB cannot exactly predict when the UE is to transmit an SR, and such situation may be thus impossible to completely exclude.

In such case, it is preferable to transmit a signal with more material attributes among the two signals.

Backward transmission rule 1 allows the UE to, when the backward transmission operations overlap, select a backward transmission operation to be performed, based on the following Table 6 considering the attribute (or type) of each backward transmission operation.

TABLE 6

| | backward transmission 1 | backward transmission 2 | Selected backward transmission | Remarks |
|---|---|---|---|---|
| 1 | CQI | CQI | N/A | Two signals both occur in only P-Cell or PUCCH S_Cell. Invalid case |
| 2 | CQI | SRS | CQI | Rather than SRS related to backward signal quality, CQI related to forward signal quality is more important. |
| 3 | CQI | HARQ AN | N/A | Two signals both occur in only P-Cell or PUCCH S_Cell. |
| 4 | CQI | PUSCH | PUSCH + CQI | Predetermined some of PUSCH transmission resources for S_Cell are used for CQI transmission. Accordingly, while CQI transmission is not conducted in P-Cell or PUCCH S_Cell, PUSCH transmission in S_Cell rate-matches for CQI transmission. |
| 5 | CQI | SR | N/A | Two signals both occur in only P-Cell or PUCCH S_Cell. |
| 6 | SRS | CQI | CQI | Same as case 2 |
| 7 | SRS | SRS | SRS | SRS with longer period is first transmitted. Or, SRS of TAG with more imminent TA timer expiration is first transmitted. |
| 8 | SRS | HARQ AN | HARQ AN | HARQ AN signal is important. Thus, HARQ AN is transmitted. |
| 9 | SRS | PUSCH | SRS | Typically control signal is more important than user data. |
| 10 | SRS | SR | SR | Rather than SRS related to backward signal quality, SR signal informing occurrence of data is more important. |
| 11 | HARQ AN | CQI | N/A | Same as case 3 |
| 12 | HARQ AN | SRS | HARQ AN | Same as case 8 |
| 13 | HARQ AN | HARQ AN | N/A | Two signals both occur in only P-Cell or PUCCH S_Cell. |
| 14 | HARQ AN | PUSCH | PUSCH + HARQ AN | Predetermined some of PUSCH transmission resources for S_Cell are used for HARQ AN transmission. Accordingly, while HARQ AN transmission is not conducted in P-Cell or PUCCH S_Cell, PUSCH transmission in S_Cell rate-matches for HARQ AN transmission. |
| 15 | HARQ AN | SR | N/A | Two signals both occur in only P-Cell or PUCCH S_Cell. |
| 16 | PUSCH | CQI | PUSCH + CQI | Same as case 4 |
| 17 | PUSCH | SRS | SRS | Same as case 9 |
| 18 | PUSCH | HARQ AN | PUSCH + HARQ AN | Same as case 14 |

TABLE 6-continued

| | backward transmission 1 | backward transmission 2 | Selected backward transmission | Remarks |
|---|---|---|---|---|
| 19 | PUSCH | PUSCH | PUSCH | Select PUSCH containing data of RB with higher priority |
| 20 | PUSCH | SR | SR or PUSCH | select PUSCH if BSR having triggered SR may be contained in PUSCH Otherwise select SR. |
| 21 | SR | CQI | NA | Same as case 5 |
| 22 | SR | SRS | SR | Same as case 10 |
| 23 | SR | HARQ AN | NA | Same as case 15 |
| 24 | SR | PUSCH | SR or PUSCH | Same as case 20 |
| 25 | SR | SR | NA | Invalid case |

Backward transmission rule 1 may be further simplified. For example, when PUCCH transmission and PUSCH transmission should be simultaneously performed, if PUCCH transmission and PUSCH are performed in the same serving cell, a predetermined rule applies to use some of the PUSCH transmission resources for PUCCH transmission. However, if PUCCH transmission and PUSCH transmission are performed in different serving cells, respectively, priority may be granted to PUCCH transmission.

Backward transmission rule 2 applies to the case where serving cells requiring simultaneous transmission belong to different sets (i.e., the case where the serving cells are controlled by different eNBs, different schedulers).

For example, if the UE should perform backward transmission in sub-frame x' for serving cell x and in sub-frame y' for serving cell y, serving cell x belongs to the primary set and serving cell y belongs to the non-primary set or vice versa, and x' and y' at least partially overlap each other on the time axis, the UE applies backward transmission rule 2. Since in this situation backward transmission operations are controlled by different eNBs, the eNBs cannot recognize that the UE incapable of simultaneous transmission is required to do simultaneous transmission. Accordingly, the backward transmission operation with more important attributes should be selected.

In the case of simultaneous transmission for different sets, unlike simultaneous transmission for the same set, the importance is determined depending on, rather than the type of backward signals, which set backward signals are transmitted to. As described above, control plane data is primarily communicated in the primary set, and user plane data is primarily communicated in the non-primary set. Accordingly, it may be said that backward transmission of the primary set is more important than backward transmission of the non-primary set.

Backward transmission rule 2 allows the UE to, when the backward transmission operations overlap, select a backward transmission operation based on the following Table 7 considering which set each backward transmission operation is for.

TABLE 7

| | Primary set | Non-primary set | Selected backward transmission | Remarks |
|---|---|---|---|---|
| 1 | CQI | CQI | Non-primary set transmission | Control plane data is communicated in primary set. Given that the amount of control plane is neglectable as compared with the amount of user plane data, primary set CQI transmission for enhancing forward scheduling efficiency of primary set is of very low importance. |
| 2 | CQI | SRS | | |
| 3 | CQI | HARQ AN | | |
| 4 | CQI | PUSCH | | |
| 5 | CQI | SR | | |
| 6 | SRS | CQI | Primary set transmission | SRS transmission of primary set may be used for maintaining backward transmission timing in primary set. Given that backward transmission needs to be quickly done in primary set, SRS transmission of primary set is more important than any backward transmission operation of non-primary set. |
| 7 | SRS | SRS | | |
| 8 | SRS | HARQ AN | | |
| 9 | SRS | PUSCH | | |
| 10 | SRS | SR | | |
| 11 | HARQ AN | CQI | Primary set transmission | HARQ AN of primary set is HARQ AN for control plane data and is thus more important than any backward transmission operation of non-primary set. |
| 12 | HARQ AN | SRS | | |
| 13 | HARQ AN | HARQ AN | | |
| 14 | HARQ AN | PUSCH | | |
| 15 | HARQ AN | SR | | |
| 16 | PUSCH | CQI | primary set transmission | PUSCH transmission of primary set is for transmission of control plane data, and is thus more important than any backward transmission operation of |
| 17 | PUSCH | SRS | | |
| 18 | PUSCH | HARQ AN | | |
| 19 | PUSCH | PUSCH | | |

TABLE 7-continued

| | Primary set | Non-primary set | Selected backward transmission | Remarks |
|---|---|---|---|---|
| 20 | PUSCH | SR | | non-primary set. |
| 21 | SR | CQI | primary set transmission | SR transmission of primary set is for transmission of control plane data, and is thus more important than any backward transmission operation of non-primary set. |
| 22 | SR | SRS | | |
| 23 | SR | HARQ AN | | |
| 24 | SR | PUSCH | | |
| 25 | SR | SR | | |

Backward transmission rule 2 defined in Table 7 above may be summarized as follows.

First, when backward transmission of the primary set and backward transmission of the non-primary set overlap each other on the time axis, if the backward transmission of the primary set is CQI transmission, the backward transmission of the non-primary set is performed, while unless the backward transmission of the primary set is CQI transmission (or includes other backward transmission than CQI transmission), the backward transmission of the primary set is performed.

If only control plane data is processed in the primary set, it is preferable to set the period of CQI transmission or SRS transmission of the primary set to be very long. Accordingly, the S-eNB may reconfigure CQI transmission resources/period and SRS transmission resources/period of the primary set (or P-Cell) to minimum values at operation 1060.

If CQI transmission is infrequent in the primary set, the frequency at which the CQI transmission of primary set overlaps the backward transmission of non-primary set is reduced. Accordingly, to simplify the UE's operation, changes may be made to backward transmission rule 2 as follows so that backward transmission of primary set is selected although it is CQI transmission.

For example, when backward transmission of primary set overlaps backward transmission of non-primary set on the time axis, the backward transmission of primary set is performed, and the backward transmission of non-primary set is not.

Typically, since the primary set is highly likely to have P-Cell only configured, backward transmission rule 2 may be changed so that when P-Cell transmission and S_Cell backward transmission overlap on the time axis, and the S_Cell is not a serving cell in the primary set, backward transmission of P-Cell is performed, but backward transmission of S_Cell is not.

The rule may be further simplified as follows. As an example, if P-Cell transmission and S_Cell backward transmission overlap on the time axis, the backward transmission of P-Cell is performed, but backward transmission of S_Cell is not.

Figure 11:
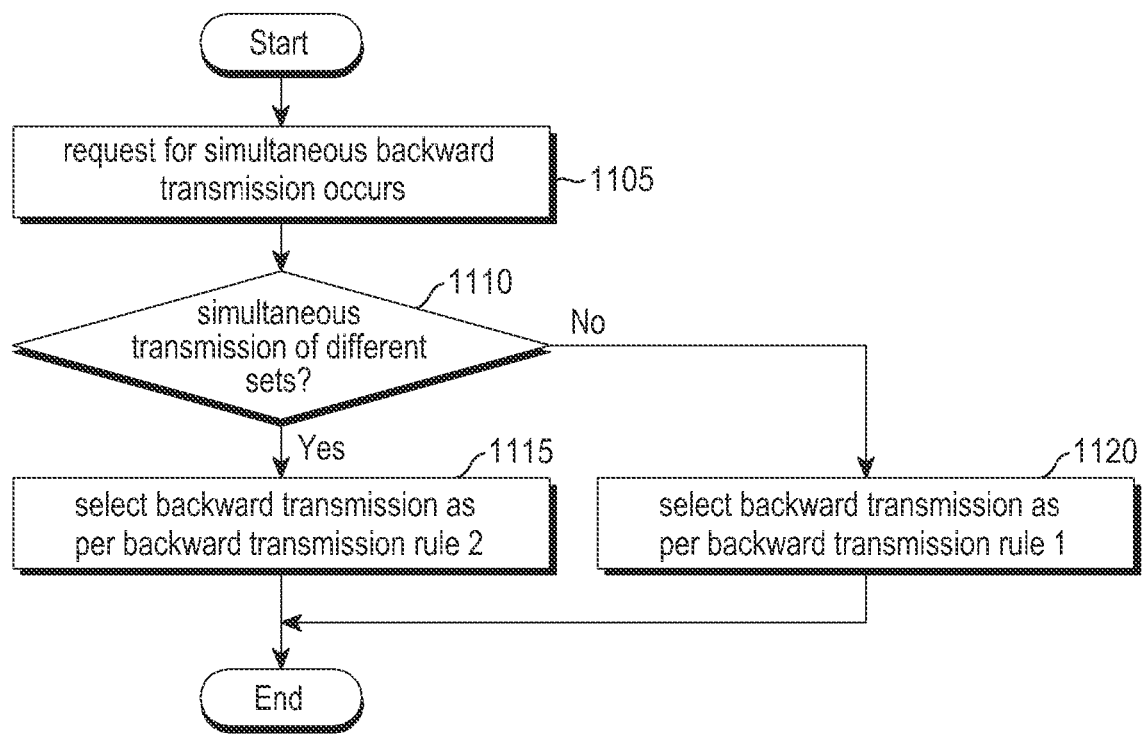
FIG. 11 is a view illustrating an example of a flow of control performed by a UE to communicate signals using a plurality of carriers in a mobile communication system according to an embodiment of the present disclosure.

FIG. 11 illustrates an example of a flow of control performed by a UE to communicate signals using a plurality of carriers in a mobile communication system according to an embodiment of the present disclosure. FIG. 11 illustrates the UE's operation to select a backward transmission operation when the UE is required to do simultaneous backward transmission.

Referring to FIG. 11, the UE monitors whether such an event occurs where the UE should simultaneously perform backward transmission operations requested by a plurality of serving cells at operation 1105. When predefined conditions are all met, the UE determines that such event has occurred where the UE should simultaneously perform backward transmission operations for the plurality of serving cells.

The UE monitors whether at least one of the plurality of serving cells for which backward transmission is required belongs to different set(s) at operation 1110. For example, such an event where backward transmission should be simultaneously performed for serving cell x and serving cell y may be determined by the condition that configuration information of one of serving cell x or serving cell y contains "information indicating serving cell of other base station than serving base station," "information indicating a non-primary set," or "information indicating that predetermined radio bearer data is to be processed exclusively by a corresponding serving cell or serving cell group," and that the above pieces of information are not contained in the remaining serving cells.

If the condition is met, the UE applies backward transmission rule 2 to select a backward transmission operation that it is to perform at operation 1115. Unless the condition is met, the UE applies backward transmission rule 1 to select a backward transmission operation that it is to perform at operation 1120.

Figure 12:
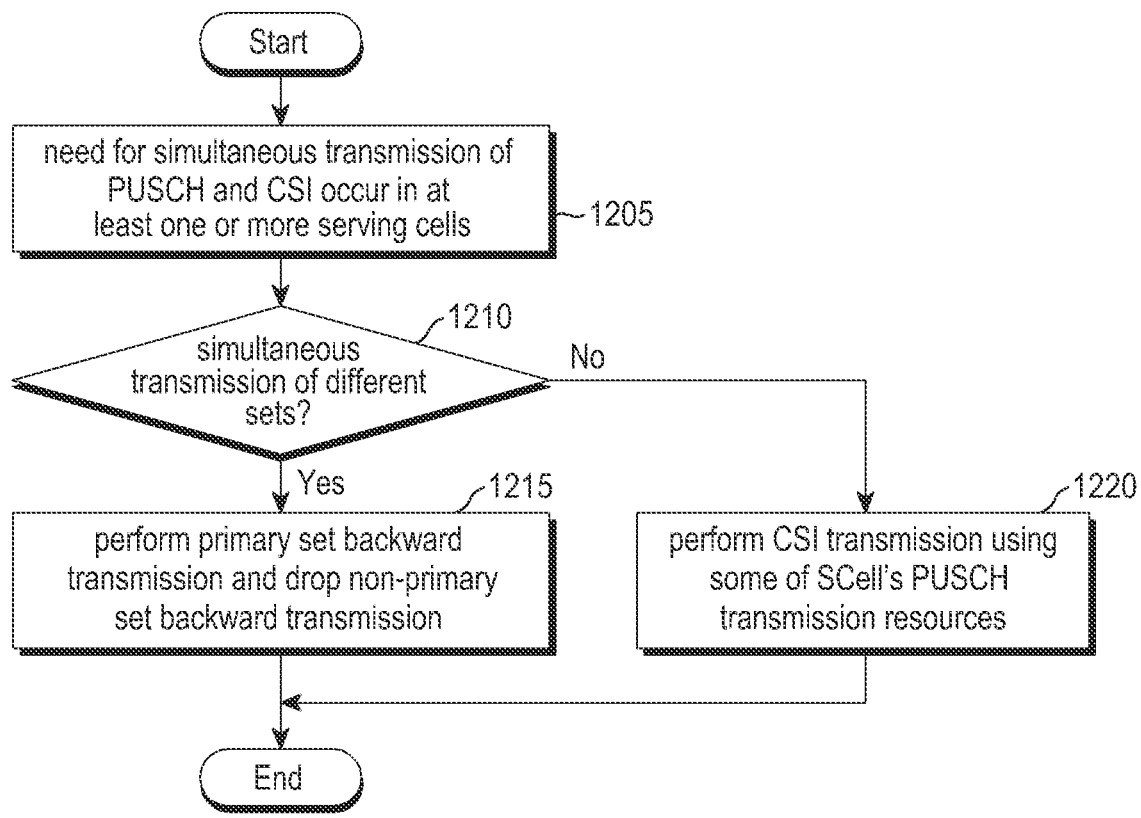
FIG. 12 is a view illustrating another example of a flow of control performed by a UE to communicate signals using a plurality of carriers in a mobile communication system according to an embodiment of the present disclosure.

FIG. 12 illustrates another example of a flow of control performed by a UE to communicate signals using a plurality of carriers in a mobile communication system according to an embodiment of the present disclosure. FIG. 12 defines the UE's operation when such an event occurs where simultaneous transmission of PUSCH and CSI is needed in one or more serving cells.

Referring to FIG. 12, the UE monitors whether there is a need for simultaneous transmission of PUSCH and CSI in at least one or more serving cells at operation 1205. For example, such event arises when CSI transmission should be performed in sub-frame n of P-Cell, and PUSCH transmission should be performed in sub-frame m of a serving cell, and sub-frame n and sub-frame m, at least partially, overlap each other on the time axis. When such event arises, the UE determines that simultaneous transmission of PUSCH and CSI is required in at least one or more serving cells.

When simultaneous transmission of PUSCH and CSI is required in at least one or more serving cells, the UE monitors whether the serving cell where CSI transmission is performed and the serving cell where PUSCH transmission is performed belong to different sets, respectively at operation 1210. For example, the UE monitors whether CSI is transmitted in a serving cell of primary set and PUSCH is transmitted in a serving cell of non-primary set or CSI is transmitted in a serving cell of non-primary set and PUSCH is transmitted in a serving cell of primary set.

When determined that the simultaneous transmission is performed in different sets, the UE performs backward transmission of primary set and abandons backward transmission of non-primary set at operation 1215.

For example, the UE grants priority to the transmission of primary set while abandoning the transmission of non-primary set or sets the priority of backward transmission of primary set to be higher than the priority of backward transmission of non-primary set. As an example, if CSI is transmitted in the primary set, the UE abandons the PUSCH transmission of non-primary set or adjusts the PUSCH transmission power of non-primary set so that the summed transmission power applied to the simultaneous transmission does not exceed a maximum transmission power.

Besides, if PUSCH is transmitted in the primary set, the UE abandons the CSI transmission of non-primary set or adjusts the PUSCH transmission power of non-primary set so that the summed transmission power applied to the simultaneous transmission does not exceed a maximum transmission power. Or, the UE may perform PUSCH transmission of non-primary set while abandoning CSI transmission, considering that CSI transmission of primary set is of lower importance than PUSCH transmission of non-primary set. Or, the UE may grant a lower priority to CSI transmission and a higher priority to PUSCH transmission of non-primary set.

If the CSI is transmitted in the non-primary set, and the PUSCH is transmitted in the primary set, the UE may perform PUSCH transmission while abandoning the CSI transmission by granting priority to the PUSCH transmission of primary set. Or, the UE may grant a higher priority to PUSCH transmission and a lower priority to CSI transmission.

This is why the PUSCH transmission of primary set is of high importance like transmission of RRC control message as described above.

FIG. 13 is a view illustrating an example where backward transmission intervals to two serving cells overlap each other on a time axis for applying an embodiment of the present disclosure.

Referring to FIG. 13, when backward transmission operations for two serving cells overlap each other on the time axis, if the two cells belong to the same TAG, the overlapping interval is limited to one sub-frame. In other words, sub-frame N of serving cell X occupies the same time interval as sub-frame M of serving cell Y (reference numeral 1305).

In case backward transmission operations of two cells respectively belonging to different TAGs overlap each other, the overlapping interval is formed over the two sub-frames. For example, sub-frame N of serving cell X occupies the same time interval as sub-frame M and part of sub-frame M+1 of serving cell Y (reference numeral 1310 in FIG. 13). Or sub-frame N of serving cell X may occupy the same time interval as part of sub-frame M−1 and part of sub-frame M.

For ease of description, the following assumption is made: when sub-frame N of serving cell X overlaps sub-frame M and sub-frame M+1 of serving cell Y or when sub-frame N of S_Cell X overlaps sub-frame M−1 and sub-frame M, the time interval where sub-frame M overlaps sub-frame N is larger than the time interval where sub-frame M−1 or sub-frame M+1 overlaps sub-frame N.

In case two serving cells belong to the same TAG, it is clear that backward transmission of a serving cell in a sub-frame should be compared with backward transmission of the other serving cell in what sub-frame. However, if two serving cells belong to different TAGs, respectively, a sub-frame of one serving cell overlaps two sub-frames of the other serving cell, and thus, it is difficult to exactly determine what should be compared.

As such, for the serving cells belonging to different TAGs, backward transmission rule 1 or backward transmission rule 2 applies to, among multiple sub-frames overlapping each other, most overlapping sub-frames.

For example, as per backward transmission rule 1, when the UE performs backward transmission in serving cell X and serving cell Y, the UE transmits CQI in sub-frame N, HARQ AN in sub-frame N+1, PUSCH in sub-frame M, and SRS in sub-frame M+1. In this case, the UE compares backward transmission in sub-frame N of serving cell X with backward transmission in sub-frame M of serving cell Y and compares backward transmission in sub-frame N+1 of serving cell X with backward transmission in sub-frame M+1 of serving cell Y to determine in which serving cell the UE is to perform backward transmission.

For example, if serving cell X and serving cell Y belong to the same set, the UE applies backward transmission rule 1 to omit CQI transmission in sub-frame N while transmitting PUSCH and CQI together in sub-frame M. The UE transmits HARQ AN in sub-frame N+1, omitting SRS transmission in sub-frame M+1.

If serving cell X belongs to the primary set, and serving cell Y belongs to the non-primary set, the UE transmits CQI in sub-cell N while omitting PUSCH transmission in sub-cell M. The UE transmits AN in sub-cell N+1 and omits SRS transmission in sub-cell M.

If determined to alternately perform transmission in adjacent sub-frames of two serving cells, in case the UE transmits CQI in sub-frame N and PUSCH in sub-frame M+1, simultaneous transmission may have to be done in the overlapping time interval between sub-frame N and sub-frame M+1.

In this case, the UE performs simultaneous transmission if the overlapping time interval, where the simultaneous transmission is performed, is smaller than a predetermined reference value. If the overlapping time interval where the simultaneous transmission is performed is larger than the reference value, the UE also applies backward transmission rule 1 or backward transmission rule 2 to sub-frame N and sub-frame M+1 so that backward transmission is performed in only one of the two sub-frames.

The UE performs CSI transmission using some of PUSCH transmission resources for S_Cell at operation 1220. The UE operates in a differentiated manner depending on how much the sub-frame scheduled for CSI transmission overlaps the sub-frame scheduled for PUSCH transmission, as described above.

Figure 14:
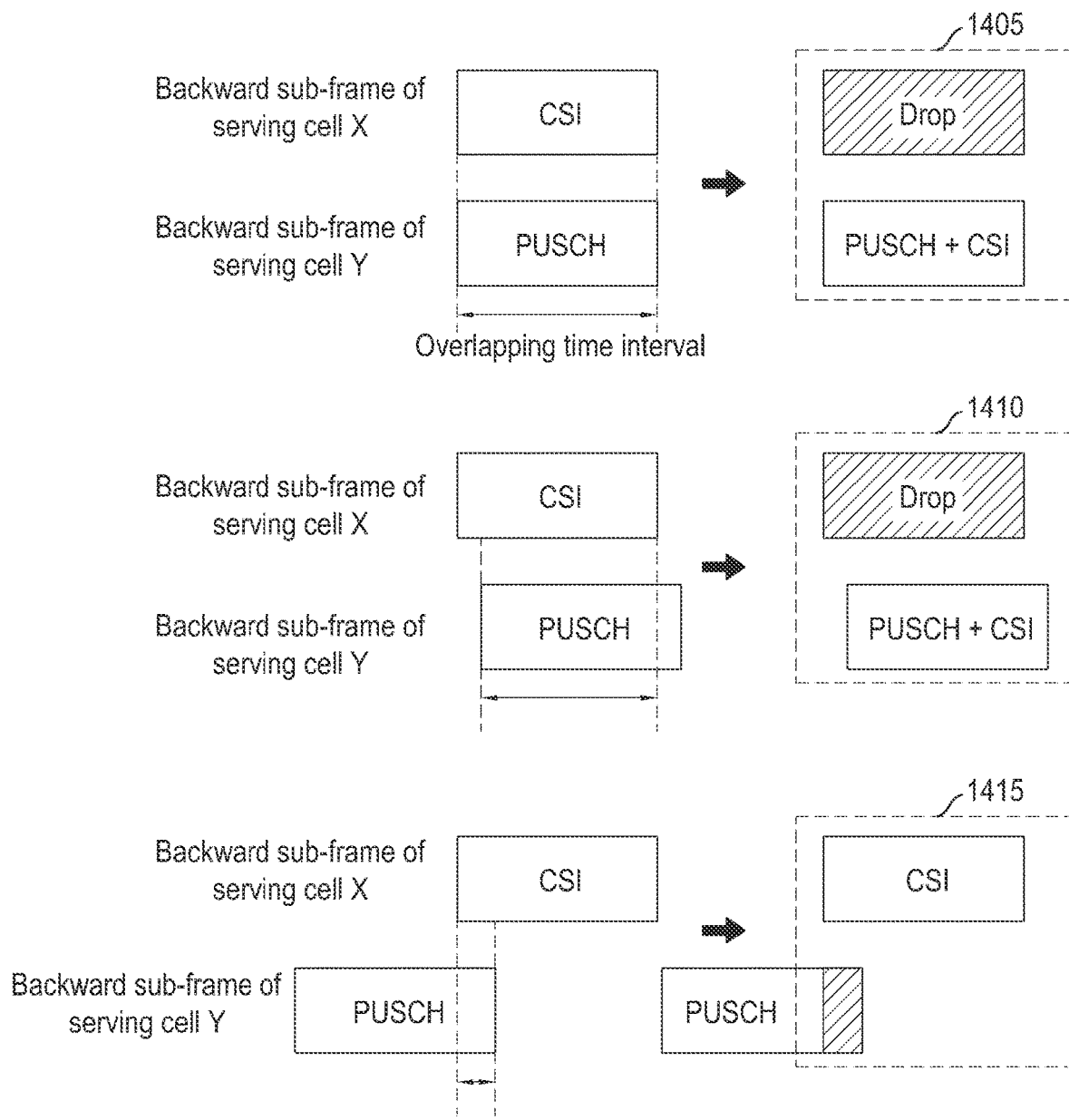
FIG. 14 is a view illustrating examples of operations performed by a user equipment in case backward transmission intervals of two serving cells overlap each other according to an embodiment of the present disclosure.

FIG. 14 is a view illustrating examples of operations performed by a user equipment in case backward transmission intervals of two serving cells overlap each other according to an embodiment of the present disclosure.

Referring to FIG. 14, when sub-frame X' of serving cell X is scheduled for CSI transmission, and sub-frame Y' of serving cell Y is scheduled for PUSCH transmission, if sub-frames X' and Y' occupy the same time interval, the UE abandons CSI transmission in serving cell X and transmits PUSCH and CSI together in serving cell Y at operation 1405. Some of the PUSCH transmission resources are used for CSI transmission, and rate-matching applies to PUSCH transmission.

If part of sub-frame X' overlaps part of sub-frame Y', and the overlapping time interval is larger than the predetermined reference value (for example, larger than a half of the length of a sub-frame), the UE abandons CSI transmission in serving cell X and transmits PUSCH and CSI together in serving cell Y (reference numeral 1410).

However, if part of sub-frame X' overlaps part of sub-frame Y', and the overlapping time interval is smaller than the predetermined reference value (for example, smaller than a half of the length of a sub-frame), the UE performs CSI transmission in serving cell X and PUSCH transmission in serving cell Y. In this case, the UE does not perform PUSCH transmission in the time interval overlapping the CSI transmission time interval. In other words, the UE performs transmission in only part of sub-frame Y' (reference numeral 1415).

As another example, if sub-frame X' and sub-frame Y' only partially overlap each other and sub-frame Y' comes ahead of sub-frame X' (that is, if the start point of the sub-frame scheduled for PUSCH transmission comes ahead of the start point of the sub-frame scheduled for CSI transmission), the UE transmits PUSCH in only the time interval of sub-frame Y, which does not overlap the CSI transmission time interval (or only the time interval not overlapping sub-frame X'), and transmits CSI over the whole time interval for sub-frame X'.

As another example, if sub-frame X' and sub-frame Y' only partially overlap each other and sub-frame X' comes ahead of sub-frame Y' (i.e., if the start point of the sub-frame scheduled for CSI transmission comes ahead of the start point of the sub-frame scheduled for PUSCH transmission), the UE transmits CSI and PUSCH over the whole sub-frame Y' and does not transmit CSI in sub-frame X'.

Figure 15:
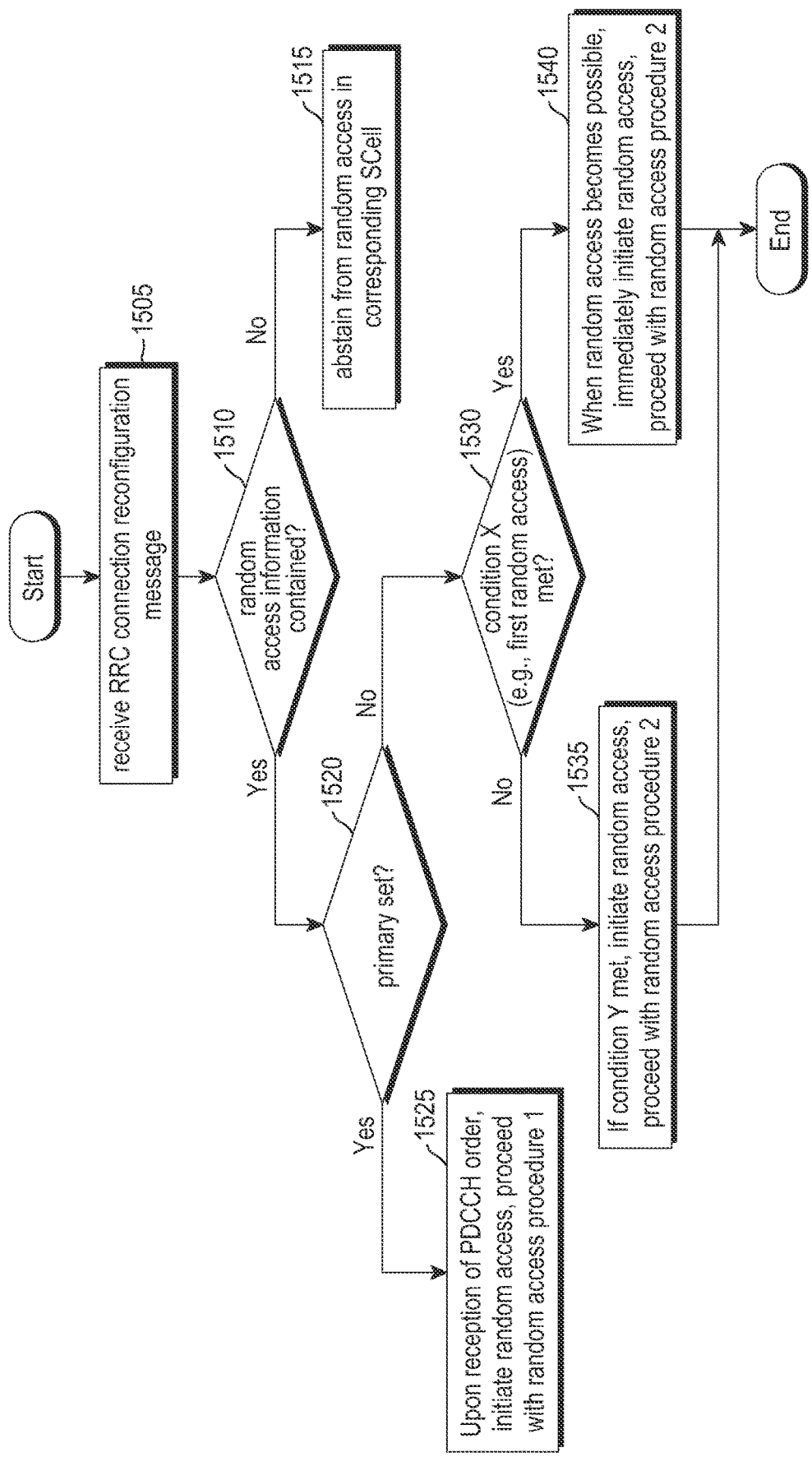
FIG. 15 is a view illustrating a flow of control for a UE to perform random access to a newly added serving cell in a mobile communication system according to an embodiment of the present disclosure.

FIG. 15 illustrates a flow of control for a UE to perform random access to a newly added serving cell in a mobile communication system according to an embodiment of the present disclosure. FIG. 15 defines the operation of the UE performing random access on the newly added serving cell.

Referring to FIG. 15, the UE receives an RRC connection reconfiguration message to add a new serving cell at operation 1505. The RRC connection reconfiguration message may be used for various purposes, such as adding a new serving cell for the UE, removing or modifying existing serving cell, modifying existing radio bearer configuration, and handover command. If the control message contains new serving cell configuration information, e.g., serving cell configuration information containing a serving cell identifier different from those of existing serving cells, the UE may determine that the control message to add a new serving cell has been received.

The UE determines whether the received control message or configuration information on the newly configured serving cell contains random access-related information at operation 1510. The random access-related information includes information on sub-frame where a random access preamble may be transmitted and information on frequency resource, power ramp-up information, maximum count of preamble transmission, and random access response message reception-related information.

The power ramp-up information is information for controlling a power ramp-up operation for stepwise incrementing random access preamble transmission power. As an example, the power ramp-up information may include a ramp-up operation size. The random access response message reception-related information may include information on a time interval (random access response window) for receiving a response message to the preamble after the preamble has been transmitted.

If the random access-related information is not included, the UE does not initiate a random access procedure in the serving cell newly configured at operation 1515. If the random access-related information is included, the UE determines whether the serving cell associated with the random access-related information is a serving cell of primary set or a serving cell of non-primary set at operation 1520. For example, the UE determines whether the serving cell is a serving cell controlled by the same eNB as the eNB controlling the P-Cell or a serving cell controlled by other eNB. Or, the UE determines whether control information indicating that the serving cell is a serving cell of non-primary set is contained in the control message. For reference, the RRC control message communicated between the UE and the eNB is coded in ASN. 1. The UE, if the newly added serving cell is a serving cell of primary set, proceeds with operation 1525, and if a serving cell of non-primary set, proceeds with operation 1530.

The UE, at operation 1525, stores the received random access-related information and waits until it receives control information (PDCCH order) instructing the serving cell to initiate random access. Upon reception of the control message, the UE initiates random access procedure 1 in the serving cell.

The PDCCH order is a predetermined format of physical layer control information and instructs the UE to initiate a random access procedure in a predetermined serving cell.

Random access procedure 1 is described by way of example. The UE transmits a random access preamble in a serving cell. The UE monitors a control channel (PDCCH) of P-Cell, receives a random access response message, and applies the backward grant contained in the random access response message to thus perform backward transmission in the serving cell where the random access preamble has been transmitted.

In the above-described random access procedure 1, the UE monitors the control channel of P-Cell to receive a random access response message for the following reasons.

Random access procedure 1 applies in case random access is performed in the primary set. That is, the serving cell where the UE has transmitted the random access preamble and the P-Cell, both, are controlled by the same eNB. It is preferable in light of complexity of the UE that the random access response message is received by a single cell rather than by several cells. Accordingly, the control channel of P-Cell is monitored in random access procedure 1 to receive the random access response message.

At operation 1525, the UE, rather than immediately initiating the random access procedure, waits until the UE receives the PDCCH order for the following reasons.

The UE having proceeded with operation 1525 means that the procedure is related with an S_Cell of primary set. The reason why random access is performed in the S_Cell of primary set is to establish a backward transmission timing for the TAG where the S_Cell belongs. In this case, the eNB is aware that the UE should do random access in the S_Cell. Accordingly, it is the eNB which can determine a proper random access initiation time, and thus, it is preferable to initiate random access at the time indicated by the eNB.

The UE, at operation 1530, determines whether condition X is met to determine whether to immediately perform random access in the newly configured serving cell.

For example, condition X corresponds to the case where the non-primary set where the newly configured serving cell belongs is a newly configured set that has never been configured before, or the newly configured serving cell (or TAG of the newly added serving cell) belongs to a non-primary set and no random access has been successfully performed yet in the non-primary set (or the TAG), or the newly added serving cell (or the TAG of the newly added serving cell) belongs to a non-primary set and no random access has been initiated yet in the non-primary set (or the TAG), or the newly added serving cell belongs to a non-primary set and the TA timer of the TAG where the PUCCH S_Cell of the non-primary set belongs has not been driven yet, or the newly added serving cell (or the TAG of the newly added serving cell) belongs to a non-primary set, the TAG includes a PUCCH S_Cell, and the TA timer of the TAG is not driven yet (or has not been driven yet).

"Condition X is met" means that the backward timing for the non-primary set where the newly configured serving cell belongs is not yet established and that the UE should perform an operation necessary for establishing a backward timing of the non-primary set.

The UE proceeds with operation 1540 if condition X is met, and otherwise, proceeds with operation 1535.

The UE, at operation 1535, waits until condition Y is met, and if condition Y is met, initiates random access. The UE, if the random access is initiated, applies random access procedure 2.

For example, condition Y corresponds to the case where a PDCCH order instructing to initiate random access in a corresponding serving cell is received, or new data has been generated in a non-primary set radio bearer and the data is higher in priority than the data of the non-primary set radio bearer already stored, or a change in path loss of the non-primary set serving cell currently in active state exceeds a predetermined reference value or meets a predetermined condition (for example, when the change in path loss of the non-primary set serving cell is larger than a change in path loss at the time that PHR was reported before).

Random access procedure 2 is described by way of example. The UE transmits a random access preamble in a serving cell, monitors a control channel (PDCCH) of the cell (or PUCCH S_Cell) where the random access preamble has been transmitted, and receives a random access response message. The UE applies a backward grant contained in the random access response message and transmits backward transmission in the serving cell where the random access response message has been received.

In the above-described random access procedure 2, the UE monitors the control channel of the cell where the random access preamble has been transmitted to receive the random access response message for the following reasons.

Random access procedure 2 applies in case random access is performed in the non-primary set. That is, the serving cell where the UE has transmitted the random access preamble and the P-Cell are controlled by different eNBs, respectively. For communication of random access response message in the P-Cell, the control message should be communicated between eNBs, and this may cause a significant delay. Accordingly, despite a slight increase in the complexity of UE, reception of the random access response message in the non-primary set would lead to enhanced efficiency in light of the overall capability.

At operation 1540, the UE initiates a random access procedure if condition Z is met and applies random access procedure 2. Condition Z is for the UE to initiate random access in a corresponding serving cell as early as possible.

For example, condition Z corresponds to the case where the UE obtains forward sync with the corresponding serving cell to recognize a backward preamble transmission time interval or measures path loss in the serving cell for a predetermined time or more to retain a reliable path loss measurement value.

Figure 16:
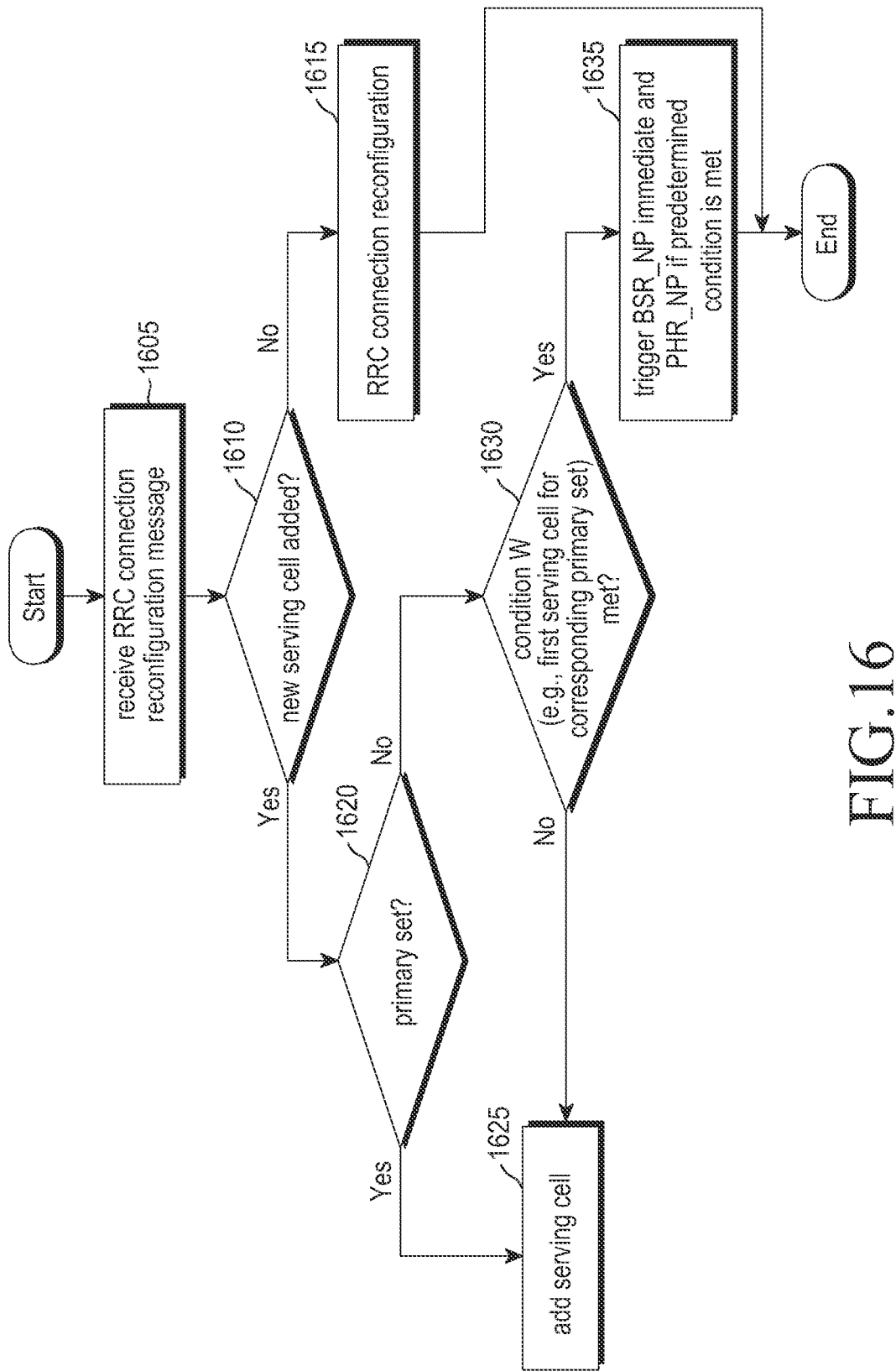
FIG. 16 is a view illustrating an example of a flow of control performed by a UE to configure a serving cell in a mobile communication system according to an embodiment of the present disclosure.

FIG. 16 illustrates an example of a flow of control performed by a UE to configure a serving cell in a mobile communication system according to an embodiment of the present disclosure. FIG. 16 illustrates the operation of the UE when receiving a control message to configure a serving cell. In particular, FIG. 16 illustrates an operation according to a method for quickly transferring scheduling-related information when the UE configures a serving cell of non-primary set.

Referring to FIG. 16, the UE, at operation 1605, receives an RRC connection reconfiguration message. The RRC connection reconfiguration message may be used for various purposes, such as adding a new serving cell for the UE, removing or modifying existing serving cell, modifying existing radio bearer configuration, and handover command.

The UE, at operation 1610, determines whether the received control message is one for adding a new serving cell. If the control message contains new serving cell information, e.g., serving cell configuration information containing a serving cell identifier different from those of existing serving cells, the UE is said to have received a control message to add a new serving cell.

If the new serving cell is added, the UE proceeds with operation 1620. However, if no new serving cell is added, the UE proceeds with operation 1615 to perform a reconfiguration operation according to the configuration information contained in the RRC connection reconfiguration message.

The UE, at operation 1620, determines whether the newly configured serving cell belongs to the primary set or the non-primary set. The UE determines whether the newly configured serving cell is a serving cell controlled by the same eNB as the eNB controlling the P-Cell or a serving cell controlled by other eNB. Or, the UE determines whether control information indicating that the serving cell is a serving cell of non-primary set is contained in the control message. For reference, the RRC control message communicated between the UE and the eNB is coded in ASN. 1. The UE, if the newly added serving cell is a serving cell of primary set, proceeds with operation 1625, and if a serving cell of non-primary set, proceeds with operation 1630.

The UE, at operation 1625, adds a new serving cell according to the received serving cell configuration information and terminates the process. Adding a new serving cell means an operation, e.g., to reconfigure a radio front end so that the serving cell may be received.

The UE, at operation 1630, determines whether condition W is met. If condition W is not met, the UE proceeds with operation 1625. If condition W is met, the UE proceeds with operation 1635. Condition W is for determining whether the eNB controlling the newly configured serving cell has received the UE's scheduling information before. Not having received before (i.e., when condition W is met), the UE proceeds with operation 1635 to initiate a procedure for quickly transmitting scheduling information.

For example, condition W corresponds to the case where the non-primary set where the newly configured serving cell belongs is a newly configured set that has never been configured before, or the newly configured serving cell (or TAG of the newly added serving cell) belongs to a non-primary set and no scheduling information has been transmitted yet in the non-primary set (or the TAG), or the newly added serving cell (or the TAG of the newly added serving cell) belongs to a non-primary set and no random access has been initiated yet in the non-primary set (or the TAG), or the newly added serving cell is a PUCCH S_Cell first configured in a non-primary set.

"Condition W is met" means that backward scheduling may be conducted soon on the UE in the non-primary set, but the eNB managing the non-primary set has not received yet a buffer state report or power headroom report from the UE.

Accordingly, the UE triggers a buffer state report or power header room report so that scheduling may be smoothly received by the non-primary set. In this case, the buffer state report and the power head room report differ from typical power state report and power headroom report. The buffer state report and the power head room report are denoted Buffer Status Report NonPrimary (BSR_NP) and Power Headroom Report NonPRimary (PHR_NP).

The UE, at operation 1635, triggers the BSR_NP and the PHR_NP. In this case, the UE immediately triggers the BSR_NP and triggers the PHR_NP after a predetermined period passes (or after a predetermined condition is met).

The predetermined period is 1) a time taken for the UE to obtain a reliable path loss measurement value for the newly configured serving cell, and 2) to prevent the PHR_NP from being transmitted in a random access procedure.

The BSR_NP is the same or different from legacy BSRs as shown in the following Table 8.

TABLE 8

| | Legacy BSRs | BSR_NP |
|---|---|---|
| Format | Short BSR consists of a two-bit LCG id and a six-bit buffer state value. Long BSR includes four consecutive buffer state values each with six bits, respectively indicating buffer states for LCG 0, LCG 1, LCG 2, and LCG 3. | Same as legacy BSR |
| Conditions for regular BSR triggering | Determines whether regular BSR triggering is done considering all transmittable data as stored in UE. Specifically, triggered if data with higher priority than data currently stored newly occurs. | Determines whether regular BSR triggering is done targeting only data of non-primary set logical channel among transmittable data stored in UE. Specifically, regular BSR is triggered if data is generated in non-primary set logical channel, the logical channel belongs to at least one logical channel group, and the logical channel is higher in priority than non-primary set logical channel data among the transmittable data currently stored. |
| Conditions for periodic BSR triggering | Triggered if a predetermined timer expires. The timer is redriven whenever BSR is transmitted. | Triggered if a predetermined timer expires. The timer is redriven whenever BSR is transmitted through non-primary set. |
| BSR details | Targets all the logical channels configured in UE. Specifically, the buffer states of logical channels stroing data to be transmitted and belonging to LCGs among logical channels configured in UE are stored per LCG. | Targets non-primary set logical channels. Specifically, the buffer states of logical channels storing data to be transmitted and belonging to LCGs among non-primary set logical channels configured in UE are stored per LCG. For example, logical channel 1 and logical channel 2 are configured in UE, logical channel 1 and logical channel 2 both belong to LCG 1, and logical channel 2 is a non-primary set logical channel and the two logical channels both store data to be transmitted. Although summed data of logical channel 1 and logical channel 2 for LCG 1 is reported in typical BSR, only data of logical channel 2 for LCG 1 is reported in BSR_NP. |

Non-primary set logical channel means a logical channel where data is communicated only through serving cell of non-primary set. The eNB indicates to the UE which logical channel is a non-primary set logical channel while configuring a serving cell of non-primary set for the UE. In the future, the UE multiplexes data generated in the non-primary set logical channel into an MAC PDU transmitted to the non-primary set.

The PHR_NP is the same or different from the legacy PHR as shown in the following Table 9.

TABLE 9

| | Typical PHR | PHR_NP |
|---|---|---|
| Format | Power headroom information per serving cell or power headroom and maximum transmission power information | Same as legacy PHR |
| Conditions for regular PHR triggering | When UE is allocated transmission resources for backward transmission, serving cell path loss meeting all of the following conditions is changed by a predetermined reference value. 1) serving cell now in active state, 2) "a serving cell, cell a, set as path loss reference cell is set as a path loss reference cell for another cell, cell b" means path loss of cell a is referenced when setting backward transmission power of cell b. | When UE is allocated transmission resources for backward transmission, path loss of non-primary set serving cell meeting the following conditions is changed by a predetermined reference value. 1) non-primary set serving cell now in active state, 2) non-primary set serving cell set as path loss reference cell. |

TABLE 9-continued

| | Typical PHR | PHR_NP |
|---|---|---|
| | Base station may set path loss relationship using a predetermined control message. | |
| Conditions for periodic PHR triggering | Triggered if a predetermined timer expires. The timer is redriven whenever PHR is transmitted. | Triggered if a predetermined timer expires. The timer is redriven whenever PHR is transmitted through non-primary set. |
| PHR details | Power headroom information of serving cell meeting the following conditions among serving cells configured in UE is stored. 1) Maximum transmission power-related information of serving cell meeting all of the following conditions among serving cells now in active state is stored. 1) Serving cell now in active state 2) serving cell where PUSCH is transmitted in sub-frame where power headroom is transmitted. | Power headroom information of serving cell meeting all of the following conditions among serving cells configured in UE 1) serving cell now in active state 2) maximum transmission power-related information of serving cell meeting all of the following conditions among serving cells of non-primary set is stored 1) serving cell now in active state 2) serving cell of non-primary set 3) serving cell where PUSCH is transmitted in sub-frame where power headroom is transmitted. |

In Table 9 above, the non-primary set serving cell means a serving cell controlled by other eNB than an eNB controlling the P-Cell among serving cells. The control message for configuring the serving cell signals information indicating whether the serving cell is a non-primary set serving cell or not.

Figure 17:
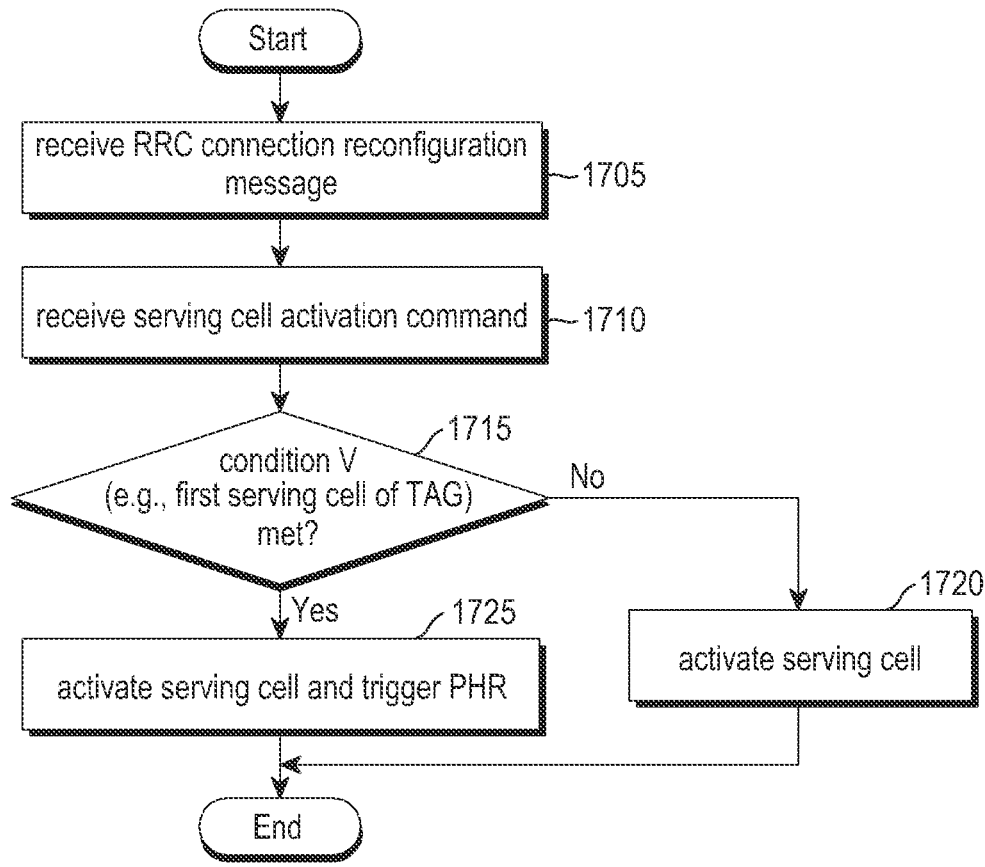
FIG. 17 is a view illustrating another example of a flow of control performed by a UE to configure a serving cell in a mobile communication system according to an embodiment of the present disclosure.

FIG. 17 illustrates another example of a flow of control performed by a UE to configure a serving cell in a mobile communication system according to an embodiment of the present disclosure.

Referring to FIG. 17, a PHR is for an eNB to be able to reference backward transmission power-related situation of a UE when scheduling backward transmission in a serving cell for the UE.

The PHR includes the maximum transmission power information that the UE may apply to the serving cell and a difference (power headroom) between the maximum transmission power and transmission power now in use. Among various factors influencing the power headroom, path loss is difficult for the base station to exactly predict.

Accordingly, the UE triggers power headroom if the current path loss relative to the latest path loss that the UE has applied when reporting power headroom is changed by a predetermined reference or more.

If a pico cell is configured for the UE operating in the macro cell, the path loss of the pico cell may be highly likely to be significantly low as compared with the path loss that the UE has used. Accordingly, it is preferable to report power headroom. However, the existing triggering defined, e.g., triggering based on a change relative to the previous path loss does not help. This is why in case a new serving cell is added, there is no previous path loss.

According to an embodiment of the present disclosure, there is proposed a method for triggering power headroom if a new pico cell is configured.

The UE, at operation 1705, receives an RRC connection reconfiguration message. The RRC connection reconfiguration message may be used for various purposes, such as adding a new serving cell for the UE, removing or modifying existing serving cell, modifying existing radio bearer configuration, and handover command.

The UE, if the received control message includes control information for adding a new serving cell, adds a new serving cell and waits until the serving cell is activated.

The UE, if receiving a control message for activating the serving cell at operation 1710, proceeds with operation 1715.

The UE, at operation 1715, determines whether the conditions for PHR triggering defined as follows are met in order to determine whether to need to trigger PHR on the activated serving cell.

For example, the conditions for PHR triggering may be defined by:
1) New serving cell is activated that has not been yet
2) The serving cell is a serving cell where backward is configured.
3) The serving cell is a serving cell first activated for a TAG.
4) Extended PHR format is configured.

Here, the extended PHR format is a format configured to report the power headrooms of all activated serving cells. Regular PHR format is a format configured to report the power headroom of only P-Cell. "Regular PHR format is configured" means that the eNB has not considered the power headrooms of the other cells than P-Cell. Thus, it is preferable to limit the PHR triggering to the cases where the extended PHR format is being configured.

The UE, if the PHR triggering conditions are met, proceeds with operation 1725, and if not, proceeds with operation 1720.

Typically, macro cell and pico cell belong to different TAGs, respectively. Accordingly, in case TAG is first configured as above, PHR is triggered for the serving cells belonging to the TAG.

The above conditions may be modified as follows.

For example, the modified conditions for PHR triggering may be defined by:
1) Serving cell of TAG newly defined.
2) At least one serving cell where backward is configured is present in the TAG.
3) No PHR has been triggered yet in the serving cell of the TAG (or no PHR has been transmitted yet)
4) Extended PHR format is configured.

Further, focusing on path loss, the PHR triggering conditions may be modified as follows.

Other examples of PHR triggering conditions may be defined by

1) New serving cell is activated that has not been yet
2) The serving cell is a serving cell where backward is configured.
3) Difference between path loss of the serving cell and path loss of other serving cell now in active state and set as path loss reference cell is more than a predetermined reference (for example, when a new serving cell, cell a, has been activated, there are serving cells now in active state, serving cells B, C, and D, serving cell b operates as path loss reference cell for serving cell b, and serving cell C operates as path loss reference cell for serving cells C and D, at least one of the difference in path loss between serving cell a and serving cell b and the difference in path loss between serving cell a and serving cell C exceeds the predetermined reference)
4) Extended PHR format is configured.

The UE performs activation on the cell indicated to be activated at operation 1720. Specifically, the UE starts to monitor PDCCH for the cell, initiates to report channel information on the cell (Channel Status Information, CSI), and starts to transmit SRS of the cell.

The UE performs activation on the cell indicated for activation at operation 1725, and at the time that a predetermined condition is met, triggers PHR. As an example, the condition may be a time when a path loss measurement value becomes available for the activated serving cell.

Among serving cells belonging to the non-primary set, a predetermined serving cell may switch to active state without receiving a separate activation command. For such a serving cell, operation 1710 of receiving a serving cell activation command may be replaced with a operation at which the serving cell is activated.

For example, if the UE receives an RRC connection reconfiguration message to add a serving cell, the UE determines whether the newly added serving cell is of type 1 or type 2. Type 1 serving cell means a serving cell activated by a separate control message (Activation/Deactivation MAC CE) indicating activation, and type 2 serving cell means a serving cell activated in other way than by a separate control message indicating activation. For example, PUCCH S_Cell may be a type 2 serving cell, and PUCCH S_Cell is activated at the moment a random access procedure is initiated. The other S_Cells than PUCCH S_Cell may be type 1 serving cells.

For type 1 serving cells, the UE waits until an activation command is received, and if receiving an activation command on a corresponding serving cell, determines whether backward has been configured in the serving cell. The UE, if there is backward configuration, triggers PHR.

For type 2 serving cells, the UE waits until an activation condition is met, and if the condition is met, triggers PHR. Specifically, if a PUCCH S_Cell is configured, the UE waits until random access is initiated in the PUCCH S_Cell, until a preamble is transmitted, or until a random access response message is received during the course of the initiated random access procedure, or if a random access response message is received, triggers PHR.

The random access response message includes a backward grant. The UE, after receiving a random access response message, reports PHR upon first backward transmission for the PUCCH S_Cell. In order to transmit more important data rather than PHR upon the first backward transmission, the time of PHR triggering may be defined as the time that the first backward transmission has been performed.

Figure 18:
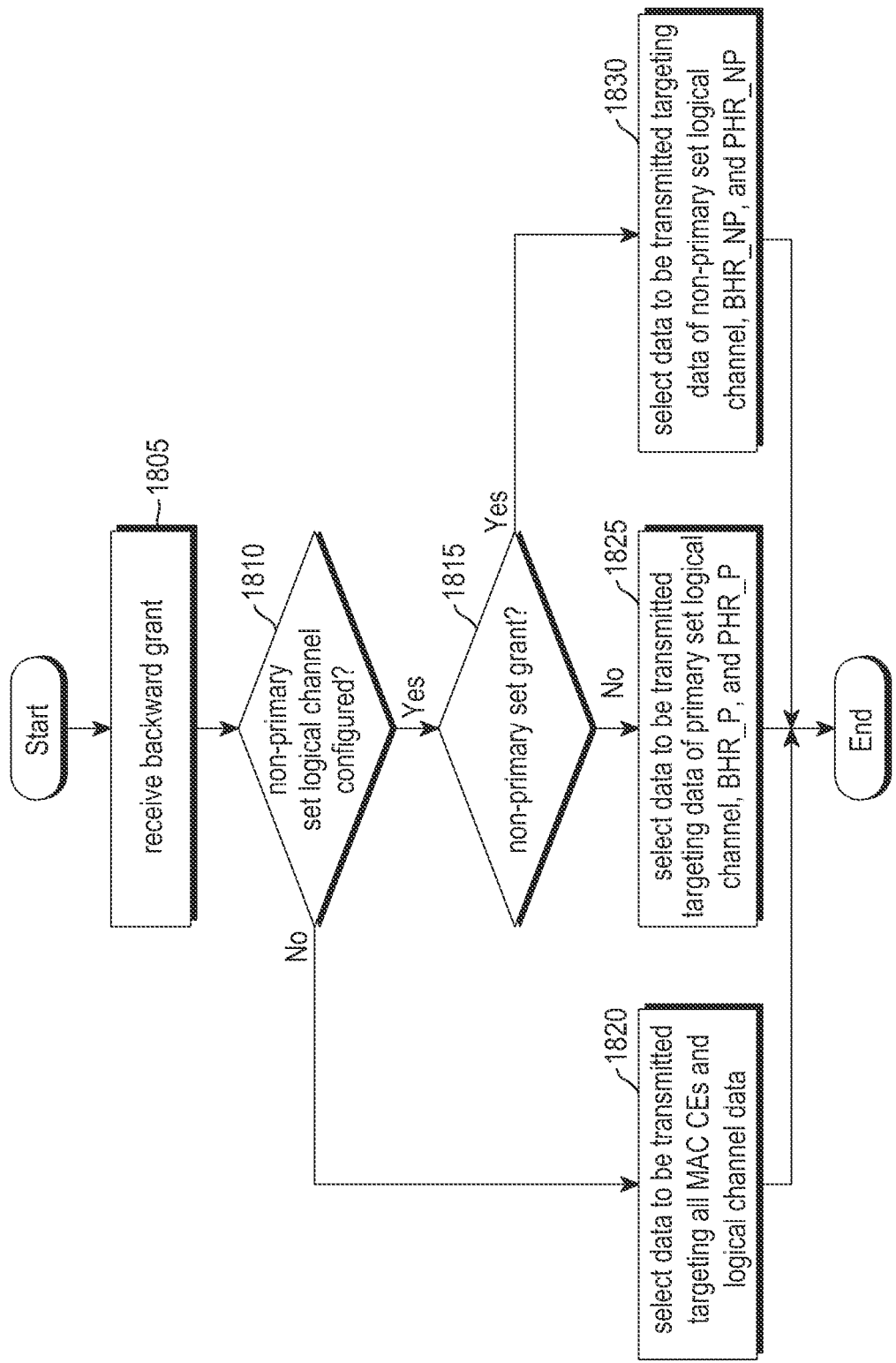
FIG. 18 is a view illustrating a flow of control performed by a UE receiving a backward grant message in a mobile communication system according to an embodiment of the present disclosure.

FIG. 18 illustrates a flow of control performed by a UE receiving a backward grant message in a mobile communication system according to an embodiment of the present disclosure.

Referring to FIG. 18, the UE receives a backward grant at operation 1805. Here, the backward grant is formed of a control message transmitted through a PDCCH for an eNB to instruct the UE to perform backward transmission. The UE, upon reception of the backward grant, may be aware when backward transmission is performed in which serving cell and using what transmission resources. The UE selects data to be transmitted considering which serving cell the backward grant is about.

The UE, at operation 1810, determines whether the following condition is met.

For example, the condition regarding a method for selecting data to be transmitted is that non-primary set serving cell is configured in the UE or non-primary set logical channel should be configured in the UE.

Unless the above condition is met, the UE proceeds with operation 1820, and if met, proceeds with operation 1815.

The UE, at operation 1820, determines what data is to be transmitted and how much, considering the transmittable data currently stored and BSR and PHR. In this case, the UE considers predetermined priorities as below. The priority for data increase from top to bottom.

CCCH (Common Control Channel) data
BSR (except BSR generated to fill padding space)
PHR
Data of logical channel retaining transmittable data
Data of logical channel is differentiated in priority depending on logical channel priority granted to logical channels.

The UE selects data to be transmitted according to priority so that data with a higher priority is first transmitted.

The CCCH data means a predetermined RRC control message. The CCCH data may be a control message (RRC CONNECTION REQUEST) first exchanged between the UE and eNB or a control message (RRC CONNECTED REESTABLISHMENT REQUEST) transmitted by the UE when the UE, after having temporarily lost connection with the eNB due to, e.g., poor radio environment, restores the connection.

The CCCH data, despite logical channel data, is not explicitly granted a priority, but is implicitly treated as having the highest priority.

The UE, at operation 1815, determines whether backward grant is for a serving cell of primary set or a serving cell for non-primary set. "The backward grant is for a serving cell" means that the backward grant indicates backward transmission of the serving cell.

The UE proceeds with operation 1825 if the backward transmission is for primary set serving cell and operation 1830 if for non-primary set serving cell.

The UE, at operation 1825, determines what data is to be transmitted and how much, considering BSR_P, PHR_P, and transmittable data stored in the primary set logical channel. BSR_P is a BSR generated by data of primary set logical channel and is the one obtained by extending to primary set logical channel and primary set serving cell, in the concept, BSR_NP described above in connection with Table 8. That is, a description of BSR_P is obtained by replacing non-primary set logical channel with primary set logical channel and non-primary set serving cell with primary set serving cell in the description of BSR_NP in Table 8.

PHR_P is a PHR generated for primary set serving cell and is the one obtained by extending to primary set serving cell, in the concept, PHR_NP described above in connection with Table 9. That is, a description of PHR_P is obtained by replacing non-primary set serving cell with primary set serving cell in the description of PHR_NP in Table 9.

The primary set logical channels are the remaining logical channels except those indicated as non-primary set logical channels among the logical channels configured in the UE. The primary set logical channels are communicated through only serving cell of primary set. CCCH is always included in primary set logical channel.

The UE selects data to be transmitted by applying the following priority at operation 1825.

CCCH (Common Control Channel) data
BSR_P (except BSR_P generated to fill padding space)
PHR_P
Data of primary set logic channel retaining transmittable data
Data of logical channel is differentiated in priority depending on logical channel priority granted to logical channels.

The UE selects data to be transmitted so that data with a higher priority is first transmitted.

The UE, at operation 1830, determines what data is to be transmitted and how much, considering BSR_NP, PHR_NP, and transmittable data stored in the non-primary set logical channel. In this case, the following priority applies.

BSR_NP (except BSR_P generated to fill padding space)
PHR_NP
Data of non-primary set logic channel retaining transmittable data
Data of logical channel is differentiated in priority depending on logical channel priority granted to logical channels.

The UE selects data to be transmitted so that data with a higher priority is first transmitted.

If the UE in idle state is informed what service and in what transmission speed the UE may be served in the current serving cell, the information may be delivered to the user through the screen of the UE. The user may determine using the information whether a data service is initiated in the serving cell. The transmission speed a UE feels is affected by various factors such as available bandwidth, number of MIMO layers, load state, and UE's processing capability.

Accordingly, eNB broadcasts, through system information, a total number of bandwidths and serving cells aggregatable considering carrier aggregation, number of MIMO layers offerable from the serving cells, and ratio of transmission resources allocable to a new UE under current load state. The UE computes an expected data rate considering the information and its processing capability and displays the data rate on the screen.

Figure 19:
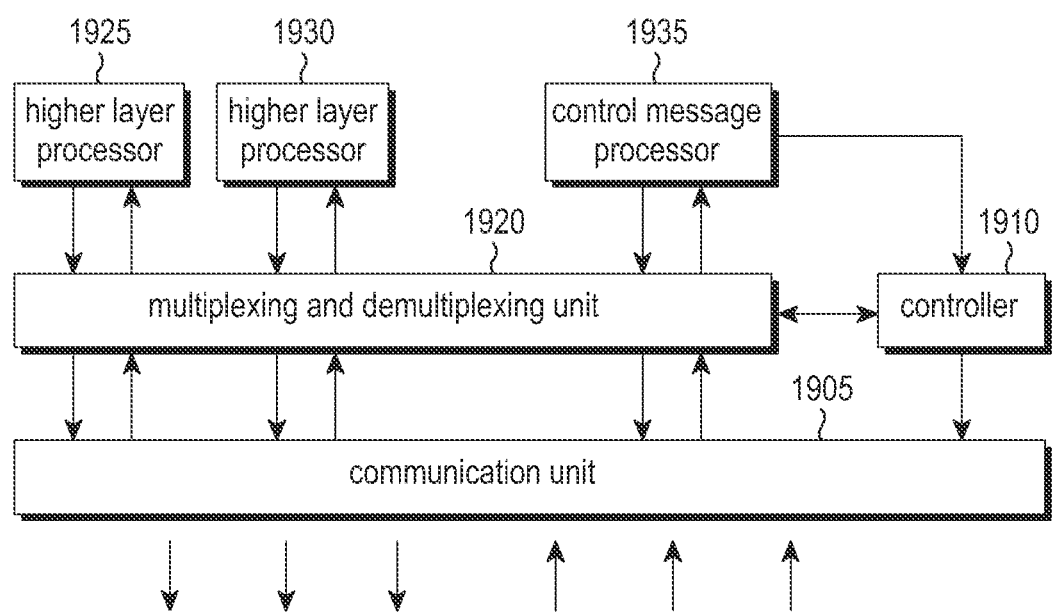
FIG. 19 is a view illustrating a configuration of a UE according to an embodiment of the present disclosure.

FIG. 19 illustrates the configuration of a UE according to an embodiment of the present disclosure.

Referring to FIG. 19, the UE includes a communication unit 1905, a controller 1910, a multiplexing and demultiplexing unit 1920, a control message processor 1935, and higher layer processors 1925 and 1930.

The communication unit 1905 receives data and predetermined control signals through a forward channel of a serving cell. The communication unit 1905 transmits data and predetermined control signals through a backward channel. As an example, in case multiple serving cells are configured, the communication unit 1905 performs data communication and control signal communication with the multiple serving cells.

The multiplexing and demultiplexing unit 1920 multiplexes data generated in the higher layer processors 1925 and 1930 or the control message processor 1935 or demultiplexes data received from the communication unit 1905 and transfers the resultant data to the higher layer processors 1925 and 1930 or the control message processor 1935.

The control message processor 1935 is a device corresponding to an RRC layer. The control message processor 1935 processes control message received from an eNB and performs necessary operations. For example, the control message processor 1935 receives an RRC control message and transfers S_Cell related information to the controller 1910.

The higher layer processors 1925 and 1930 may be configured per service. The higher layer processors 1925 and 1930 process data generated in a user service, such as File Transfer Protocol (FTP) or Voice over Internet Protocol (VoIP) and transfers the processed data to the multiplexing and demultiplexing unit 1920, or processes data transferred from the multiplexing and demultiplexing unit 1920 and transfers the processed data to a higher layer service application.

The controller 1910 identifies a scheduling command received through the communication unit 1905, for example, backward grants and controls the communication unit 1905 and the multiplexing and demultiplexing unit 1920 so that backward transmission is performed with proper transmission resources at a proper time. The controller 1910 overall controls various procedures for S_Cell configuration, various procedures for activation/deactivation, and various procedures related to multi-cell RRC function.

Figure 20:
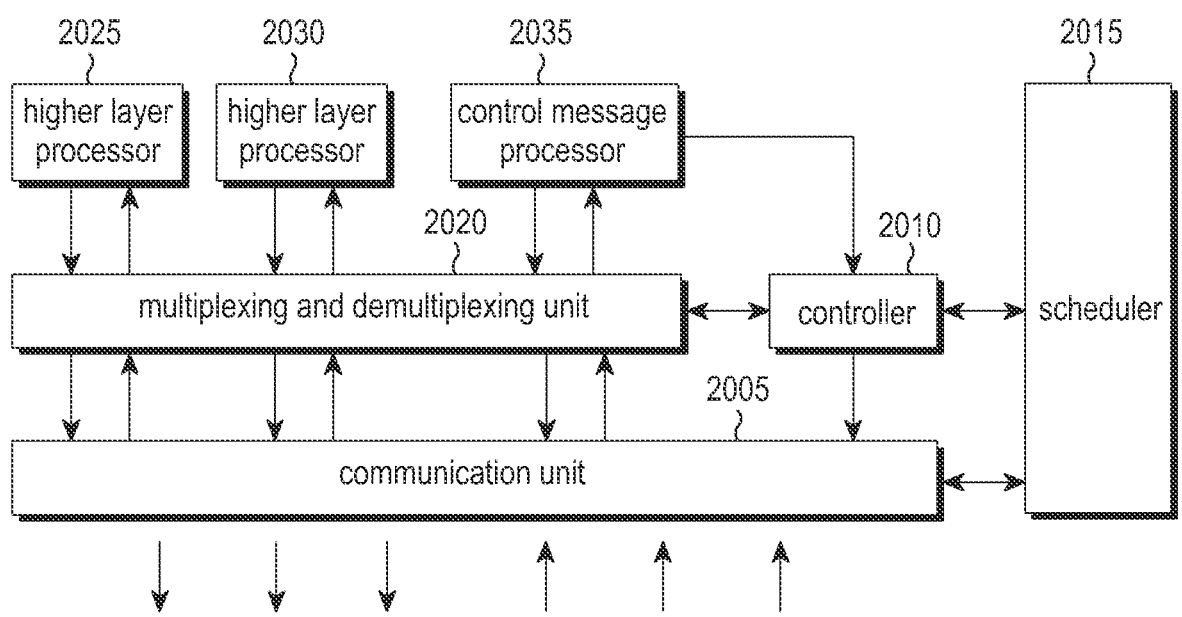
FIG. 20 is a view illustrating a configuration of an eNB according to an embodiment of the present disclosure.

FIG. 20 illustrates the configuration of an eNB according to an embodiment of the present disclosure.

Referring to FIG. 20, the eNB includes a communication unit 2005, a controller 2010, a multiplexing and demultiplexing unit 2020, a control message processor 2035, higher layer processors 2025 and 2030, and a scheduler 2015.

The communication unit 2005 transmits data and predetermined control signals through a forward carrier. The communication unit 2005 receives data and predetermined control signals through a backward carrier. As an example, in case multiple carriers are configured, the communication unit 2005 performs data communication and control signal communication through the multiple carriers.

The multiplexing and demultiplexing unit 2020 multiplexes data generated in the higher layer processors 2025 and 2030 or the control message processor 2035 or demultiplexes data received from the communication unit 2005 and transfers the resultant data to the higher layer processors 2025 and 2030, the control message processor 2035, or the controller 2010.

The control message processor 2035 processes control message transmitted from the UE and performs necessary operations, or generates control messages to be transferred to the UE and transfers the control messages to a lower layer.

The higher layer processors 2025 and 2030 may be configured per bearer. The higher layer processors 2015 and 2030 configure data transferred from an S-GW or other eNB in an RLC PDU and transfer to the multiplexing and demultiplexing unit 2020, or configure an RLC PDU transferred from the multiplexing and demultiplexing unit 2020 in a PDCP SDU and transfers to the S-GW or the other eNB.

The scheduler 2015 allocates transmission resources to the UE at a proper time considering the UE's buffer state and channel state and processes the communication unit 2005 to process signals transmitted from the UE or to transmit signals to the UE.

Although not shown, EPS bearer devices are configured per EPS bearer, and the EPS bearer devices process data transferred from the higher layer processors 2025 and 2030 and transfer to a next network node.

The controller 2010 overall controls various procedures for S_Cell configuration, various procedures for activation/deactivation, and various procedures related to multi-cell RRC function.

Figure 21:
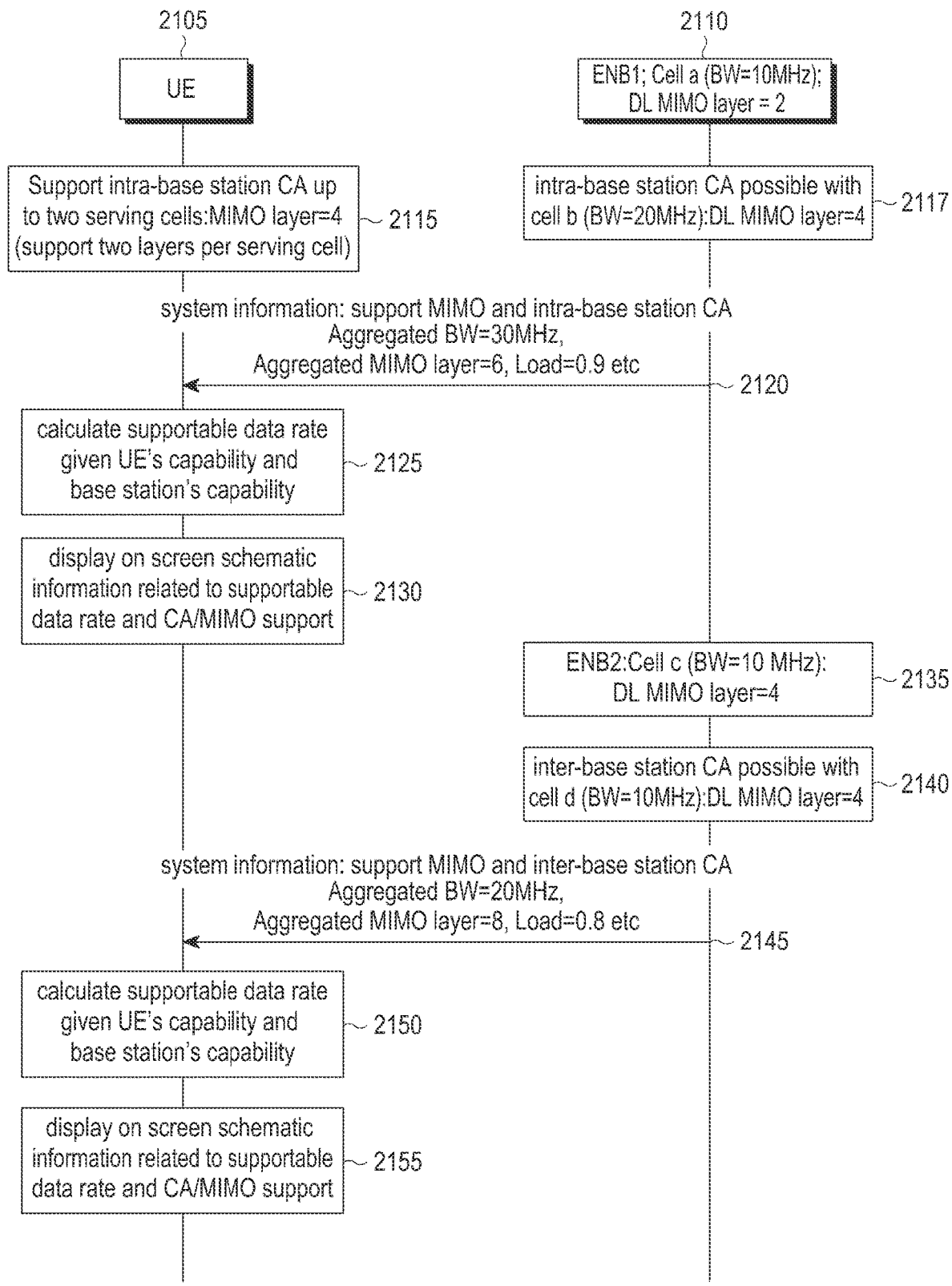
FIG. 21 is a view illustrating an overall operation according to an embodiment of the present disclosure.

FIG. 21 illustrates an overall operation according to an embodiment of the present disclosure.

Referring to FIG. 21, a UE 2105 in idle state where no RRC connection is configured selects cell a controlled by an eNB 1 2110 and camps on. "Camp on" means receiving system information of the corresponding cell and monitoring a call channel. As an example, the UE 2105 camps on the accessible cell with a predetermined reference or more of channel quality through cell selection and cell reselection.

Assume that the UE 2105 supports intra-base station CA for up to two serving cells and there are up to four MIMO layers at operation 2115. That is, the UE 2105 is assumed to have capability that may support two layers per serving cell.

Cell a has the capability of a cell bandwidth (BW) of 10 MHz and up to two downlink MIMO layers. eNB 1 2110 may carrier-aggregate cell a and cell b. Cell b has the capability of a cell bandwidth of 20 MHz and up to four MIMO layers at operation 2117.

eNB 1 2110 broadcasts system information regarding a serving cell and neighbor cells that it may carrier-aggregate on its own through predetermined system information blocks (SIBs) at operation 2120. An example of the system information may be defined as in the following Table 10.

TABLE 10

Whether CA and MIMO are supported in eNB = supported
upon applying supported CA, total sum of bandwidths (aggregated BW) = 30 MHz
The summed bandwidth of cell a and cell b
Information on cells that may be carrier-aggregated
Information indicating cell b, evolved UMTS Terrestrial Radio Access (e-UTRA)
Absolute Radio Frequency Channel Number (EARFCN), information indicating
center frequency of cell b, or information indicating which ones of inter-frequency
neighbor cells of SIB 5 may be carrier-aggregated (for example, an integer indicating
the location where it is stored in SIB 5)
Upon applying CA number of MIMO layers = 6
Summed value of MIMO layers of cell a and MIMO layers of cell b
Not applying CA number of MIMO layers = 2
MIMO layers of cell a
Not applying CA load = 0.9
Load state of cell a. For example, indicates 90% of the overall transmission
resources are in use
Upon CA load = 0.8
Summed load state of cell a and cell b. For example, indicates 80% of
transmission resources of cell a and cell b are in use The UE 2105 calculates a predicted data transmission rate when configuring an RRC connection in the corresponding cell considering the information defined in Table 10 and its capability according to "Predicted Data Transmission Rate=BW*spectral efficiency*(1−load)" at operation 2125.

Frequency band combinations that the UE 2105 may apply CA to are predefined. The UE 2105, if supportive of CA on frequency band combinations reported to be applicable for CA (in the above example, combinations of frequency bands of cell a and frequency bands of cell b), uses aggregated BWs as BWs.

The UE 2105 determines spectral efficiency considering the number of MIMO layers per serving cell. The UE 2105 may database the spectral efficiency per the number of MIMO layers and may determine spectral efficiency from the number of MIMO layers available at the corresponding time.

For example, when if the number of MIMO layers is n, an average spectral efficiency is x b/s/Hz, and if the number of MIMO layers is m, the average spectral efficiency is y b/s/Hz, if upon applying CA, the number of MIMO layers per serving cell is n, the spectral efficiency is x.

The UE 2105 displays information regarding, e.g., whether MIMO/CA is supported and a predicted data transmission rate on the screen using schematic symbols at operation 2130.

For example, if CA is not supported, the UE 2105 may denote it with one arrow, and if CA is supported, may denote it with two or more arrows. The predicted data transmission rate may be denoted with a representative value of a predetermined range, like 100 in the range from 10 to 100 Mbps and 500 in the range from 100 to 500. The predicted data transmission rate may be denoted, rather than with a numeral, with the thickness or color of an arrow.

The UE 2105, if a new serving cell is reselected, performs the same procedure to update the information displayed on the screen at operations 2135, 2140, 2145, 2150 and 2155. Unless the UE 2105 supports inter CA, the UE 2105 may determine that CA is not supported in cell c to thus display one arrow at operation 2155. The UE 2105 calculates a predicted data transmission rate in CA-unsupportive state and displays it on the screen at operation 2155.

In general, there are two reasons for which a UE experiences continuous random access failure in a mobile communication system. Congestion occurs in the current cell or downlink in the current cell is good while uplink is poor. For example, the second reason is that downlink signals reflected on the water surface are received by the UE.

If the continuous random access failure comes from the first reason, the current serving cell is most likely to have the best channel quality among others, and thus, reselecting other cell may negatively affect the system.

In contrast, if the random access failure is attributed to the second reason, the current serving cell, although it is not the cell with the best channel quality, is likely the best cell due to abnormal signal paths, and thus, it is preferable to reselect a cell other than the current cell.

Typically, cell congestion may be inferred from various factors. For example, if access class barring information (ac-Barring Info) is being broadcast as the system information of the current cell, although there are differences in degrees, it means that there is some degree of congestion. Or, if the UE has received at least one or more back-off indicators when performing random access, this means that there is congestion on the random access channel. Or, experiencing a contention failure when performing random access means that congestion is present on the random access channel.

(RAPID, Random Access Preamble ID) mapped with the preamble transmitted from the UE, is a valid random access response message.

The UE determines whether the random access issue comes from congestion or from a forward-backward imbalance at operation 2210. An example of a condition under which the UE determines that the random access issue comes from congestion is defined in the following Table 11.

TABLE 11

| Types | Definitions |
| --- | --- |
| Access failure 1 due to congestion | Receives at least one time back-off indicator while performing corresponding random access. The back-off indicator is information with which eNB instructs UE to delay preamble transmission and is transmitted to multiple unspecified UEs in random access response messages. |
| Access failure 2 due to congestion | Size of back-off applied during corresponding random access is not less than a predetermined reference value |
| Access failure 3 due to congestion | Contention resolution failure occurs at least one or more times during corresponding random access |
| Access failure 4 due to congestion | Access class barring information is broadcast as system information during corresponding random access |

Accordingly, it is preferable that, if the UE, upon random access failure, has received one or more back-off indicators during the course of random access, experienced contention failure, or access class barring information (ac-Barring Info) is being broadcast as system information, the UE reselects a cell with the best downlink channel condition among selectable neighbor cells including the current cell and then resumes the random access operation.

Accordingly, it is preferable that, upon random access failure, the UE has received no back-off indicators, has not experienced contention failure, or the access class barring information is not being broadcast as system information, the UE reselects a cell with the best downlink channel condition among the other cells than the current cell and then resumes the random access operation.

Figure 22:
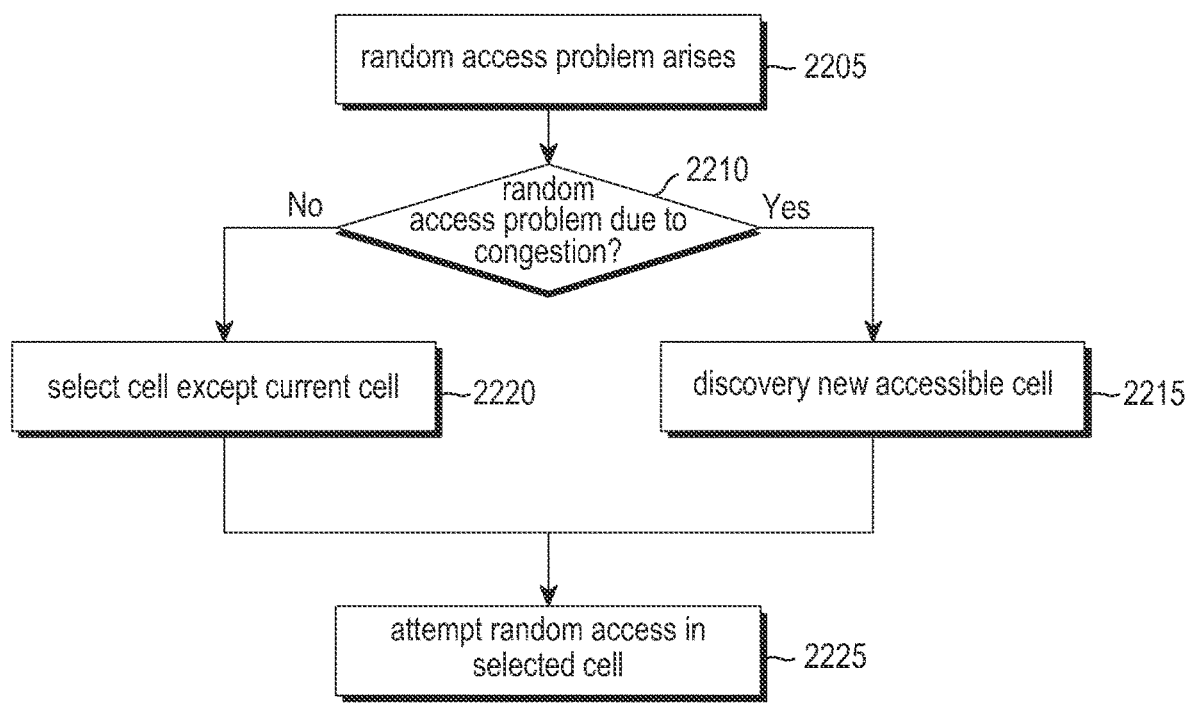
FIG. 22 is a view illustrating a flow of control performed by a UE according to an embodiment of the present disclosure.

FIG. 22 illustrates a flow of control performed by a UE according to an embodiment of the present disclosure.

Referring to FIG. 22, the UE monitors whether a random access issue arises in a P-Cell at operation 2205. As an example, the UE, if despite having transmitted preambles a predetermined number of times in the P-Cell, not receiving a valid random access response message, determines that a random access issue has arisen.

The UE manages the number of times by which the UE has transmitted preambles in the current random access procedure with a variable, PREAMBLE_TRANSMISSION_COUNTER, and is signaled a parameter, preambleTransMax, in an RRC connection configuration process. The UE, whenever failing to receive a random access response message after having transmitted a preamble, increases PREAMBLE_TRANSMISSION_COUNTER by one, and compares the same with preamble Trans Max+1. If PREAMBLE_TRANSMISSION_COUNTER is smaller, the UE proceeds with a preamble retransmission process. If PREAMBLE_TRANSMISSION_COUNTER is the same as preamble Trans Max+1, the UE determines that a random access issue has arisen.

For example, the UE determines that the random access response message, addressed with an identifier (RA-RNTI) mapped with the time/frequency where the UE has transmitted the preamble and containing a preamble identifier The UE, upon meeting the random access failure condition due to congestion or failing to meet the random access failure condition due to the forward/backward imbalance, proceeds with operation 2215. The UE, upon failing to meet the random access failure condition due to congestion or meeting the random access failure condition due to the forward/backward imbalance, proceeds with operation 2220. For example, the random access failure condition due to the forward/backward imbalance may correspond to when no valid random access response message has been received while performing corresponding random access.

The UE, at operation 2215, performs a cell selection process to discover a new accessible cell. Upon discovery of the new accessible cell, the UE measures the forward channel reception strength/quality of the current serving cell and neighbor cells to identify whether the current serving cell is an access barred cell. The UE, upon discovery of a new accessible cell, proceeds with operation 2225.

The UE, at operation 2220, discovers new accessible cells among the other cells than the current serving cell. The UE, upon discovery of a new accessible cell, proceeds with operation 2225.

The UE, at operation 2225, performs a random access procedure by applying the random access-related information of SIB2 of the selected cell. Through the random access procedure, the UE transmits an RRC_CONNECTION_REESTABLISHMENT_REQUEST message. The control message includes the identifier (PCI, Physical Cell Id) of a previous serving cell and C-RNTI information used in the previous serving cell.

The eNB, if aware of the UE or having information on the UE, restores the RRC connection by transmitting a control message (RRC_CONNECTION_REESTABLISHMENT) indicating RRC connection reconfiguration.

Typically, the UE's RRC connection state transition process in the serving cell with a forward/backward imbalance is highly likely to continuously fail.

Figure 23:
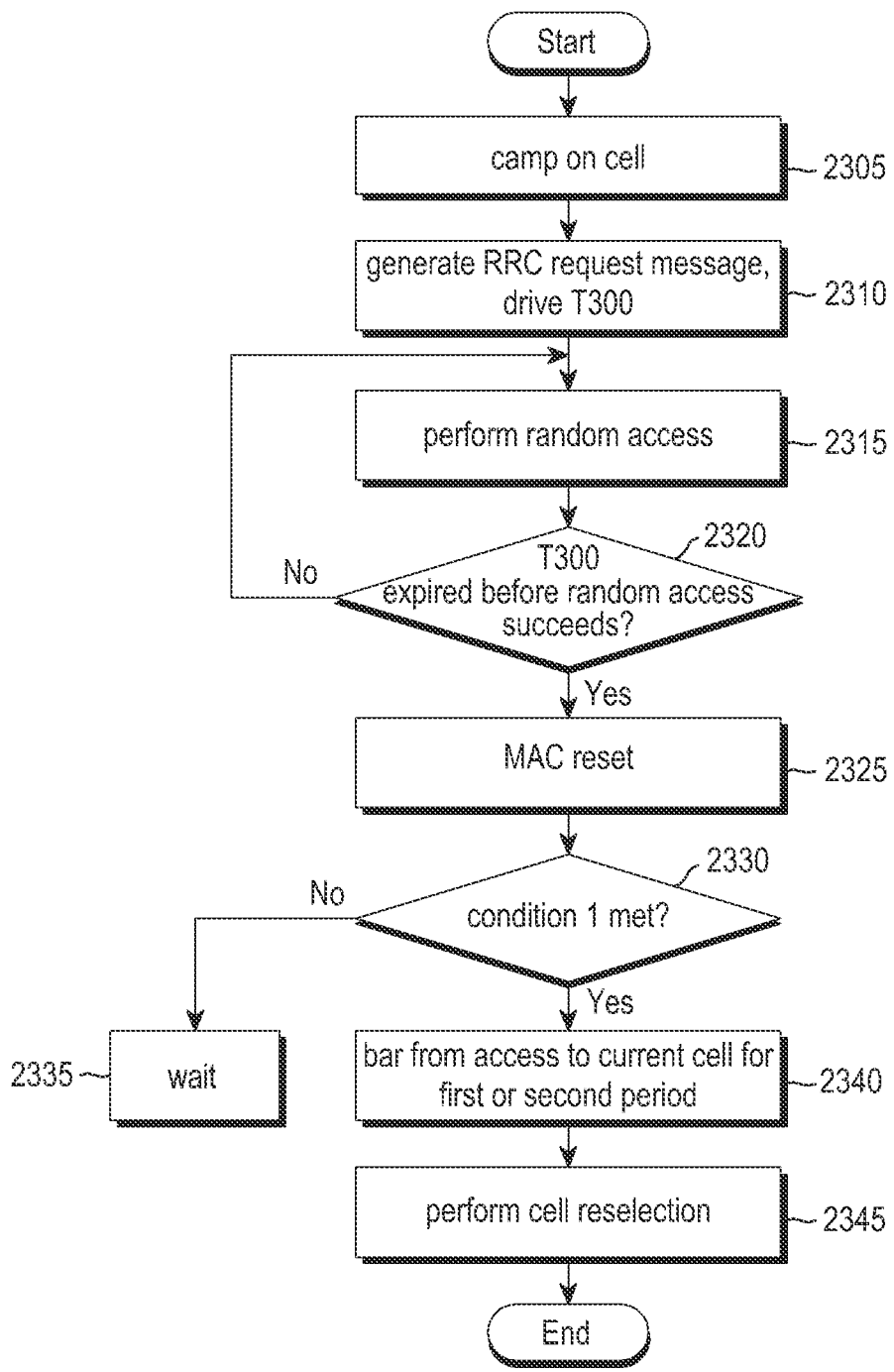
FIG. 23 is a view illustrating a flow of control performed by a UE when an RRC connection process fails due to a forward/backward imbalance in a mobile communication system according to an embodiment of the present disclosure.

FIG. 23 illustrates a flow of control performed by a UE when an RRC connection process fails due to a forward/backward imbalance in a mobile communication system according to an embodiment of the present disclosure.

Referring to FIG. 23, the UE camps on a cell at operation 2305. For example, the UE obtains system information in the cell and monitors a call channel. The UE, when a need occurs for configuring an RRC connection at a time, generates an RRC connection request message at operation 2310. As an example, the UE determines that an RRC connection needs to be configured by an RRC connection configuration request from a higher layer to an RRC layer. The UE transfers the generated RRC connection request message to the RLC layer and then drives T300.

The UE, at operation 2315, initiates a random access procedure in the current cell. The random access procedure includes transmitting a preamble, receiving a random access response message, transmitting message 3 using a backward transmission resource indicated by the response message, and in response thereto, receives message 4. Messages 3 and 4, respectively, may correspond to the RRC connection request message and the RRC connection configuration message (RRC connection setup).

The UE, if having transmitted the preamble but not receiving yet a valid random access response message, retransmits a random access preamble. The UE, when having transmitted message 3 but not receiving message 4, retransmits a random access preamble as well.

The UE, at operation 2320, determines whether T300 expires before the random access procedure is successfully complete. If T300 expires before the random access procedure is successfully done, the UE proceeds with operation 2325. Unless T300 expires before the random access procedure is successfully done, the UE returns to operation 2315. The UE, when returning to operation 2315, continues to perform the random access procedure.

The UE, at operation 2325, stops the random access procedure by resetting the MAC. The UE, at operation 2330, determines whether condition 1 is met. Condition 1 may be a "current serving cell access barring condition."

The current serving cell access barring condition includes a first current serving cell access barring condition "While T300 is driven, no valid random access response message has been received" and a second current serving cell access barring condition "T300 has consecutively expired in the current serving cell." The second current serving cell access barring condition "T300 has consecutively expired in the current serving cell" has the same meaning as "RRC connection configuration process has consecutively failed in the current serving cell."

The UE, if the above-defined "current serving cell access barring condition" is not met, proceeds with operation 2335 to report a higher layer that the RRC connection configuration has failed. The UE waits until the RRC connection configuration is needed again. As an example, the UE, when the higher layer requests the RRC connection configuration again, may determine that the RRC connection configuration is needed.

The "current serving cell access barring condition" being met implies that the RRC connection configuration failure is highly likely to come from a forward/backward imbalance. Accordingly, the UE determines that the current cell is barred from access for a predetermined period in order to select a serving cell other than the current serving cell. The predetermined period of time may vary depending on the type of the UE. As an example, a first period is set to the predetermined period for normal UEs, and a second period is set to the predetermined period for UEs with no mobility (for example, metering devices). Which one the UE sets to the predetermined period may be previously set in its memory or OS.

The UE, at operation 2340, bars access to the current cell for the predetermined period set as the first or second period. The predetermined period after barring access to the current cell, the UE, at operation 2345, reports the higher layer that the RRC connection configuration has failed and performs a cell reselection process on the other cells than the current cell. For example, the UE selects a cell meeting a predetermined reference among cells with a channel quality/reception strength higher than a predetermined reference as a new serving cell. Upon selection of a new serving cell, the UE waits until the RRC connection configuration is needed again.

Typically, one serving cell in a mobile communication system is specified with one center frequency, but may belong to several frequency bands as well. For example, part of a frequency band belonging to frequency band x may belong to a newly defined frequency band. In this case, one center frequency may belong to several frequency bands. A cell broadcasts frequency band information using system information. If one cell supports several frequency bands, an eNB broadcasts all the supported frequency bands through system information. A frequency band with the highest priority among the frequency bands is broadcast with first information (freqBandIndicator) and at least one remaining frequency band is broadcast with second information (multiBandInfoList).

An EARFCN is information for specifying a center frequency. The EARFCN is changed depending on what frequency band applies. The relationship between the frequency band and the EARFCN is already defined in the standard. A security key (KeNB*) to be used by a target eNB may be produced using the EARFCN. If the target cell is a cell supportive of several frequency bands, it is preferable that the UE and the eNB produce KeNB* using the same EARFCN.

Figure 24:
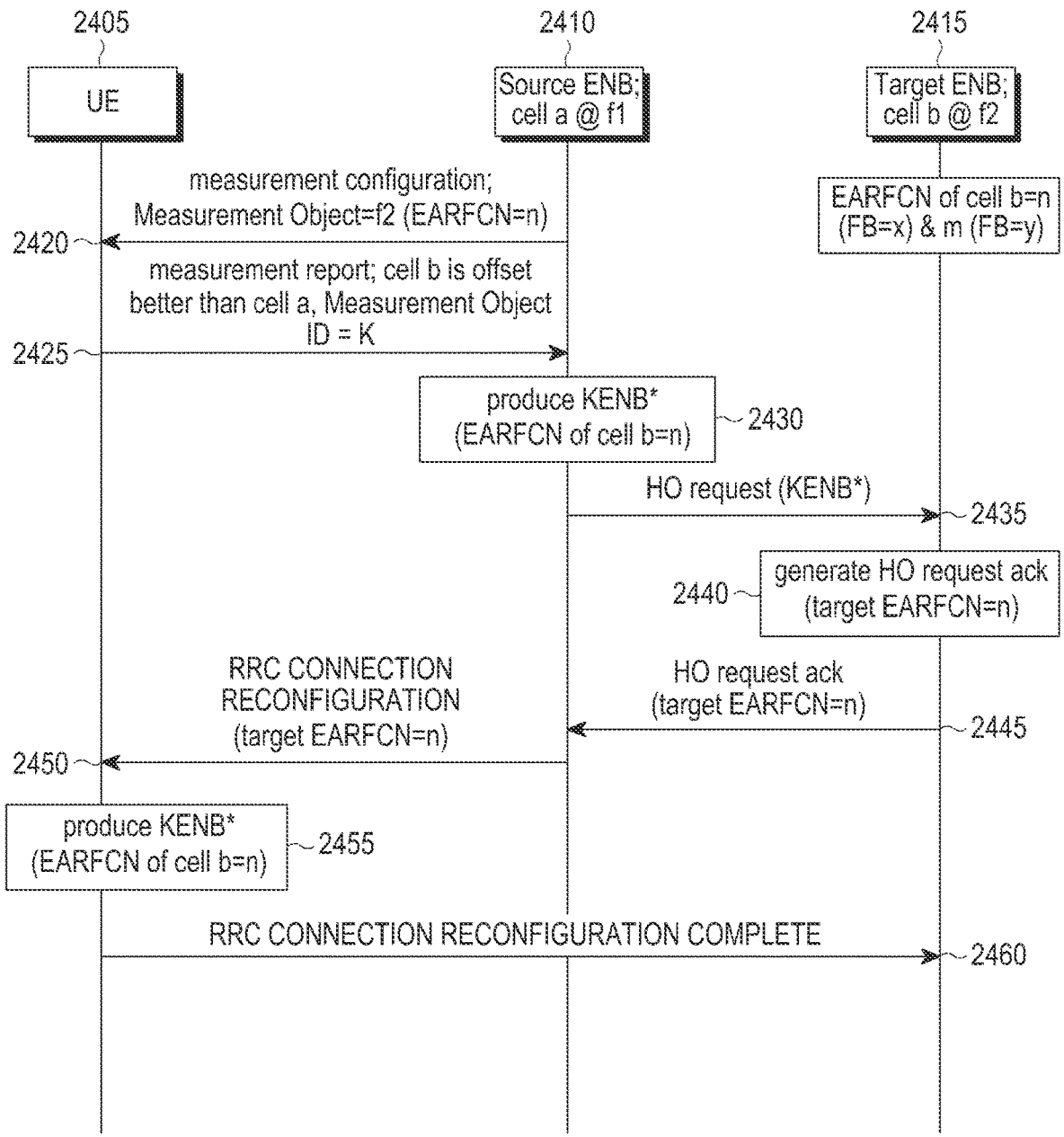
FIG. 24 is a view illustrating a signaling procedure for generating a security key in a mobile communication system according to an embodiment of the present disclosure.

FIG. 24 illustrates a signaling procedure for generating a security key in a mobile communication system according to an embodiment of the present disclosure.

Referring to FIG. 24, a UE 2405 configures an RRC connection with cell a using center frequency f1 in an S-eNB 2410 to perform a typical data communication process. At a time, the S-eNB 2410 instructs the UE 2405 to measure predetermined targets for measurement at operation 2420. For example, the targets for measurement may be cells using center frequency f2 in a target eNB (T-eNB).

The UE, if there is a cell belonging to both frequency band x and frequency band y among the cells with center frequency f2, selects one of the two frequency bands to determine an EARFCN corresponding to center frequency f2 and notifies the UE 2405 of the determined EARFCN.

Specifically, the S-eNB 2410 notifies the UE 2405 of an EARFCN (hereinafter, a "first EARFCN") corresponding to the frequency band broadcast with the first information, as a target for measurement. For example, f2 may belong to frequency band x and frequency band y. When the EARFCN is n in frequency band n and m in frequency band y, if n is an EARFCN with the first information, the S-eNB 2410 designates EARFCN n as a target for measurement for the UE 2405. The S-eNB 2410 may allocate an integer identifier (ID of target for measurement) to the target for measurement.

The UE 2405 measures a specific frequency based on the first EARFCN. If it is detected by the measurement that a predetermined cell (e.g., cell b) is better in channel quality/reception strength than the current serving cell, the UE 2405 generates a measurement result control message and transmits the control message to the S-eNB 2410 at operation 2425. The measurement result message includes information on the target for measurement (ID of the target for measurement) and related information. Besides, the measurement result message may contain a measurement result and an identifier of a cell having triggered measurement reporting.

The S-eNB 2410 determines whether the UE 2405 needs to hand over to cell b. The S-eNB 2410, if determined that the UE 2405 needs handover, determines an EARFCN to specify the center frequency of cell b to which the UE is to hand over. The S-eNB 2410, if cell b (i.e., the target cell present in the T-eNB 2415) belongs to several frequency bands, selects the first EARFCN. Belonging to several frequency bands means being related to several EARFCNs. For example, the S-eNB 2410 selects an EARFCN produced by the frequency band of the first information or an EARFCN used to indicate a target for measurement.

The S-eNB 2410 generates a security key, KeNB*, based on various variables such as the EARFCN or the identifier of the target cell at operation 2430. The S-eNB 2410 transmits a handover request control message including the security key, KeNB*, to the T-eNB 2415 in operation 2435. The T-eNB 2415 determines whether to accept the handover request considering, e.g., the QoS of traffic to be handed over or current load conditions, and generates a response message according to the result at operation 2440.

For example, the T-eNB 2415, upon determining to accept the handover request, generates a handover request accept control message and transmits the control message to the S-eNB 2410 at operation 2445. The handover request accept control message includes the EARFCN information of the target cell. The EARFCN information is produced by the frequency band of the first information. As an example, the T-eNB 2415 includes, in the handover request accept control message, the EARFCN produced by the frequency band broadcast with the first information in the target cell.

The S-eNB 2410 transmits, to the UE 2405, an RRC connection reconfiguration message to support the handover at operation 2450. The RRC connection reconfiguration message includes the first EARFCN indicating the center frequency of the target cell.

The UE 2405, at operation 2455, generates a security key, KeNB*, by putting the first EARFCN in a predetermined key generation function. The UE 2405 performs a random access procedure with the T-eNB 2415 using the generated security key, KeNB*. The UE 2405, if succeeding in random access, generates an RRC connection reconfiguration complete message protected by a new security key and transmits the message to the T-eNB 2415 in operation 2460.

Figure 25:
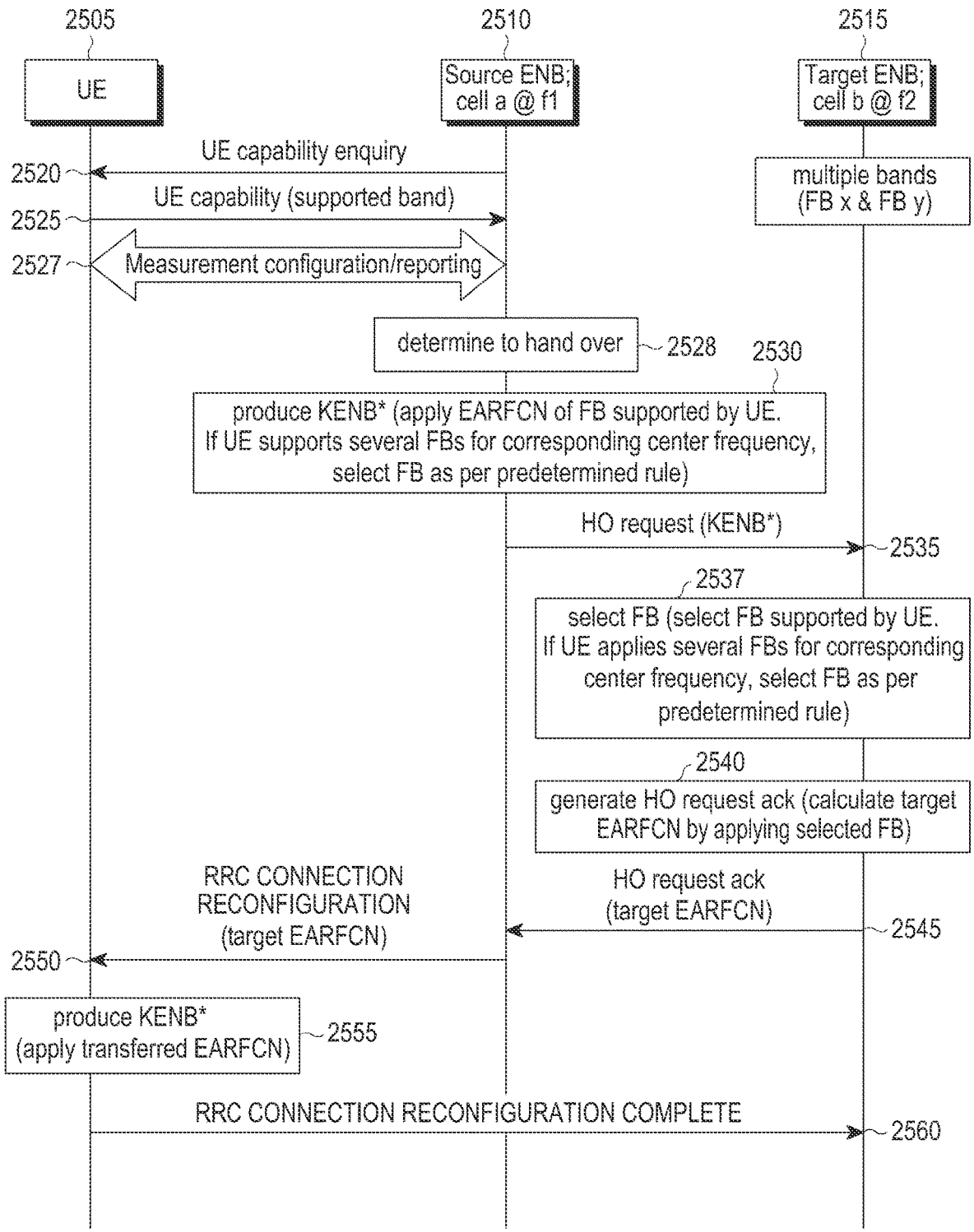
FIG. 25 is a view illustrating a signal processing procedure according to an embodiment of the present disclosure.

FIG. 25 illustrates a signal processing procedure according to another embodiment of the present disclosure.

Referring to FIG. 25, the UE 2505 configures an RRC connection with cell a using center frequency f1 in an S-eNB 2510 to perform a typical data communication process. The S-eNB 2510 instructs the UE 2505 to report capability at a time at operation 2520. The UE 2505, in response to the instruction, generates a control message to report its capability, and transmits the generated capability report control message to the S-eNB 2510 at operation 2525. The capability report control message includes information regarding bands supported by the UE 2505.

The UE 2505 may support only FB x, only FB y, or both the FBs. If the UE 2505 has reported that it supports at least one of FB x and FB y, the S-eNB 2510 may consider enabling the UE 2505 to hand over cell b.

For example, the S-eNB 2510 configures a measurement for the UE 2505. The S-eNB 2510 monitors whether the UE 2505 reports a measurement result including information indicating that handover to cell b is required at operation 2527. The S-eNB 2510, when reported the measurement result by the UE 2505, determines whether to allow the UE 2505 to hand over to cell b in the T-eNB 2515 at operation 2528.

The S-eNB 2510 produces a security key, KeNB* at operation 2530. The security key, KeNB*, may be produced by the following example.

Select FB to be applied to cell b

Produce the EARFCN corresponding to the center frequency of cell b by applying the selected FB Generate KeNB* by inputting information on the EARFCN or target cell identifier to a key generation function The S-eNB 2510, if there is only one FB supported by the UE 2505 among the FBs of the target cell when selecting the FB of the target cell supporting one or more FBs, selects the FB supported by the UE 2505. However, if there are one or more FBs supported by the UE 2505 among the FBs of the target cell, the S-eNB 2510 selects an FB by applying a predetermined rule.

As an example, three rules to be applied to select the FB may be defined.

First Rule for FB Selection

Selects the lowest FB among the FBs supported by the target cell and the UE both. For example, if the center frequency or the frequency band of the target cell belongs to frequency band x and frequency band y and meets the condition: x>y, and the UE supports frequency band x and frequency band y both, the base station selects frequency band y.

Second Rule for FB Selection

Selects the highest FB among the FBs supported by the target cell and the UE both. For example, if the center frequency or the frequency band of the target cell belongs to frequency band x and frequency band y and meets the condition: x>y, and the UE supports frequency band x and frequency band y both, the base station selects frequency band x.

Third Rule for FB Selection

Select the FB foremost reported by the UE in the capability report control message among the FBs supported by the target cell and the UE both. For example, if the center frequency or the frequency band of the target cell belongs to frequency band x and frequency band y, and x has been reported ahead of y, the base station selects frequency band x.

Fourth Rule for FB Selection

Select the FB rearmost reported by the UE in the capability report control message among the FBs supported by the target cell and the UE both. For example, if the center frequency or the frequency band of the target cell belongs to frequency band x and frequency band y, and x has been reported ahead of y, the base station selects frequency band y.

As another considerable rule, the S-eNB 2510 may select an EARFCN using the size of EARFCNs. For example, an EARFCN applied with FB x and an EARFCN applied with FB y are compared, and the bigger or smaller may be selected.

The S-eNB 2510 transmits a handover request control message including the security key, KeNB*, to the T-eNB 2515 at operation 2535. The handover request control message may include information on the capability of the UE 2505, i.e., information on the frequency band supported by the UE 2505.

The T-eNB 2515 determines whether to accept the handover request considering, e.g., the QoS of traffic to be handed over or current load conditions. If accepting the handover request, the T-eNB 2515 selects an FB by applying the same FB selection rule as the rule that the S-eNB 2510 has used at operation 2537. The T-eNB 2515, at operation 2540, generates a handover request accept control message including the EARFCN produced by applying the selected FB, and at operation 2545, transmits the generated handover request accept control message to the S-eNB 2510.

The S-eNB 2510 transmits, to the UE 2505, an RRC connection reconfiguration message to support the handover at operation 2550. The RRC connection reconfiguration message includes the EARFCN indicating the center frequency of the target cell, i.e., the EARFCN determined by the T-eNB 2515.

The UE 2505, at operation 2555, generates a security key, KeNB*, by putting the first EARFCN in a predetermined key generation function. The UE 2505 performs a random access procedure with the target cell (cell b) in the T-eNB 2515, and if succeeding in the random access, generates an RRC connection reconfiguration complete message protected by a new key and transmits to the T-eNB 2515 at operation 2560.

Proposed is a method in which a UE using a very long DRX cycle identifies changed system information broadcast by an eNB and updates the same in order to reduce power consumption according to an embodiment of the present disclosure. The UE using the very long DRX cycle may be a machine type communication device infrequently connecting with an eNB to communicate data.

Proposed is a method in which the UE with the very long DRX cycle previously identifies whether SI is changed before a call occasion and updates the same in the embodiment.

The method may come in two options.

The first option is that the UE wakes up before the call occasion and determines whether SI is changed using the value_Tag information. The UE may receive SIB1 and identify the value_Tag information with the received SIB1. If SI has been changed, the UE updates the SI. value_Tag included in SIB1, if the SI is changed, increases the counter value by one. The UE compares value_Tag included in SIB1 with the latest value_Tag value stored therein, and if not the same, determines that SI has changed.

The second option is that the UE wakes up before a call occasion and immediately updates the SI.

The second option may apply as per the applied very long DRX cycle. For example, if the very long DRX cycle has a length of 3 hours or less, the first option is preferable. Otherwise, if the cycle is three hours or more, the second option is preferable.

Typically, the validity for SI is defined as three hours. The UE, three hours after obtaining SI, considers the obtained SI as invalid, and receives new SI.

Another considerable method is to delay the UE's operation until the UE recognizes that the UE has been called.

As an example, the UE, if necessary to switch active state, performs a cell reselection operation. The UE may receive calls only when the UE is in the acceptable state (agreed state). The UE, after receiving a call, performs a call reselection operation. The state in which the UE operates is determined depending on particular conditions. The UE's operation is delayed until the UE turns to the agreed state. The delay time is preset or set by an eNB, and if the permitted delay time elapses, a call may be received by another method.

Besides, a method for preventing unnecessary reception of SIB1 and other SIBs to reduce power consumption of the UE may be used as well. It is apparent that the UE's attempt to receive SIB1 and other SIBs may cause power consumption.

Typically, use of a very long DRX cycle poses limitations on minimizing the MIB reception. The MIB includes only essential information, such as a system frame number (SFN), a frequency band, and PHICH configuration information. In particular, the DRX cycle is operated based on SFN information, and thus, MIB reception is inevitable. In contrast, an attempt to receive unnecessary SIB1 and other SIBs may be reduced.

A method for reducing an attempt to receive unnecessary SIB1 comes in two options as follows.

The first option is to add value_Tag to MIB. value_Tag is included in SIB1. SIB1 information should be received to identify whether the SI has been changed. However, if the SI has not been changed, the reception of SIB1 information would be an unnecessary operation. This causes power consumption of the UE.

The second option is to add a larger size of value_Tag to MIB. value_Tag has a value ranging from 0 to 31. value_Tag increments by one whenever SI is changed. In case the UE uses a very long DRX cycle, the SI may be changed 32 times or more for a predetermined period. Accordingly, a bigger size of value_Tag may be required.

The following is a method for reducing the attempt to receive unnecessary SIB.

value_Tag increments by one even when other SIB information is changed. However, the UE using a very long DRX cycle does not need all of the SIB information. Accordingly, a new value_Tag is defined for the UE using a very long DRX cycle. The new value_Tag is included in MIB or SIB1. The value_Tag is incremented by one when only SIB information necessary for the UE using the very long DRX cycle is changed.

For example, it can be said that SIB2 is related to access barring information or cell information, SIB3 and SIB4 to intra-freq neighbor related information, SIB3 and SIB5 to inter-freq related information, and SIB14 to access barring information of MTC devices. Accordingly, the value_Tag value newly defined for SIB corresponding to a change in the related information may be increased by one.

The other SIBs, SIBs 6, 7, 8, 9, 10, 11, 12, 13, 15, and 16, may be SIBs unnecessary for the UE using the very long DRX cycle. The form of the SIB related to the new value_Tag may be previously configured by the eNB and reported to the UE or may be previously defined.

As an example, proposed is a method for using value_Tag or an indicator included in MIB/SIB1 for a change in SIB2. The SI necessary for the UE using a very long DRX cycle to receive a call is not full SIB2 information but partial information. For example, it may be PCCH/PDSCH configuration information. Accordingly, the UE is to include, in MIB or SIB1, a new indicator or new value_Tag indicating a change in the SI in SIB2 necessary to receive a call.

The last method is to transmit call reception-related configuration information to MIB or SIB1.

Figure 26:
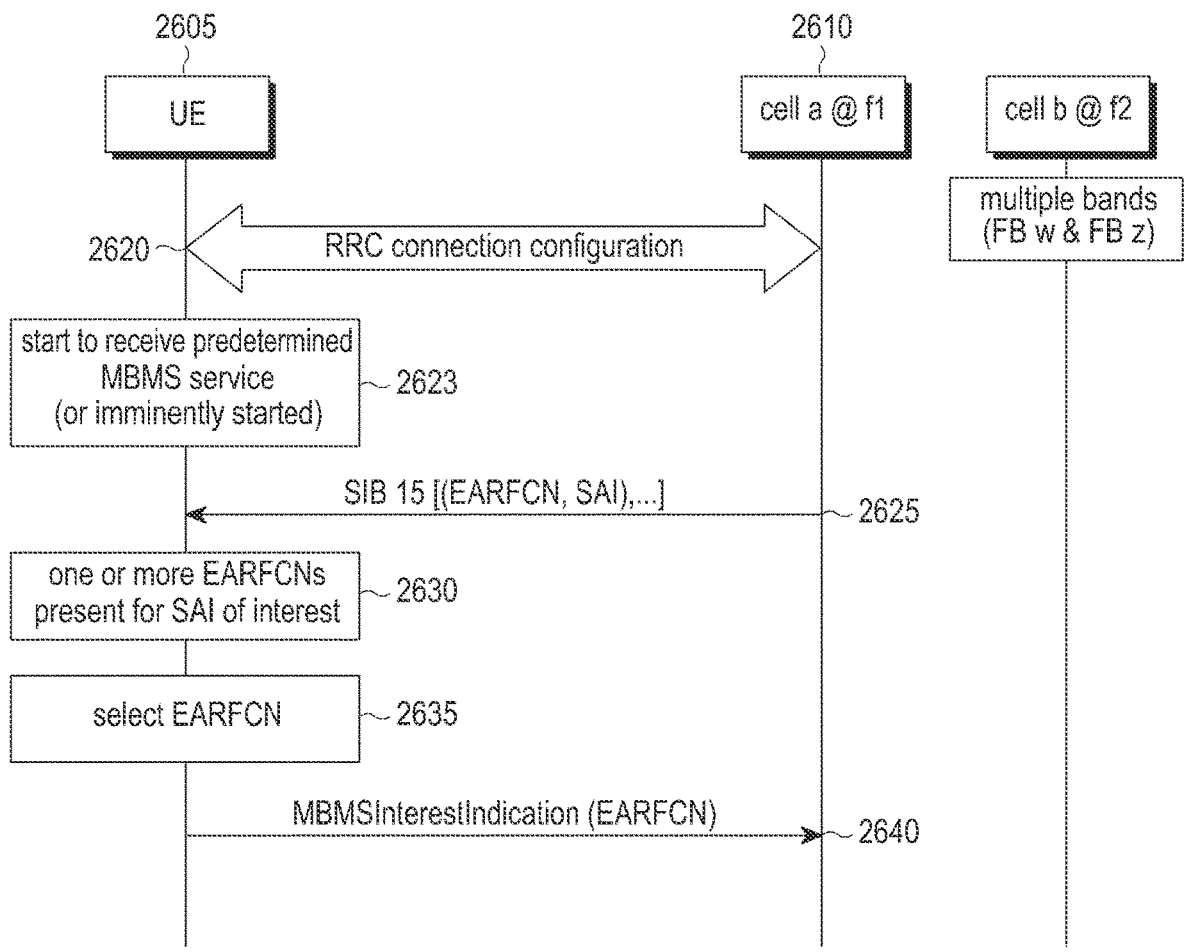
FIG. 26 is a view illustrating a signal processing procedure according to an embodiment of the present disclosure.

Proposed is a method and apparatus by which the UE receives an MBMS service in a cell supportive of several frequency bands when MBMS services are offered in the cell, according to an embodiment of the present disclosure FIG. 26 illustrates a signal processing procedure according to an embodiment of the present disclosure.

Referring to FIG. 26, a UE 2605 configures an RRC connection with cell a 2610 at operation 2620. Having configured an RRC connection with cell a 2610, the UE 2605 communicates data through cell a 2610.

The UE 2605 starts to receive an MBMS service through a multicast channel (MCH) at a time or recognizes that an MBMS service to be desired to be received is initiated soon at operation 2623. The UE 2605 may determine whether the MBMS service is to be started soon using a service start/end time displayed in a user service description (USD). The USD may contain information specifying the mapping relationship between the MBMS services and service area identifiers (SAIs). The USD may be obtained through an SMS, an MMS, or an IP multimedia subsystem (IMS).

The US 2605 obtains SIB 15 retaining MBMS service-related information for neighbor cells at operation 2625. The UE 2605, if obtaining SIB 15, may omit operation 2625. SIB 15 includes information indicating which service area neighbor frequencies belong to. The information indicating which service area neighbor frequencies belong to consists of an EARFCN and an SAI. As an example, if f2 corresponds to SAI n and SAI m, and f3 to SAI k and SAI h, SIB 15 may include "EARFCN x (EARFCN of f2), SAI n, SAI m" and "EARFCN y (EARFCN of f3), SAI k, SAI h".

The UE 2605, if there is an SAI related to the currently received service or a service to be received, generates a control message, MBMSInterestIndication, containing the EARFCN of the SAI and transmits to cell a 2610 at operation 2640.

If there is a frequency belonging to several frequency bands among frequencies provided by the MBMS service, cell a 2610 individually transmits EARFCNs per frequency band. For example, f2 belongs to FB w and FB z, and EARFCNs are x and x', respectively. Cell a 2610 broadcasts the following information through SIB 15.

EARFCN x (EARFCN of f2), SAI n, SAI m
EARFCN x' (another EARFCN of f2), SAI n, SAI m
EARFCN y (EARFCN of f3), SAI k, SAI h Having received SIB 15, the UE 2605 identifies the EARFCN where its desired MBMS service is offered, i.e., the SAI matched EARFCN. One frequency may correspond to several EARFCNs at operation 2630. The UE 2605, if understanding only one EARFCN among the several EARFCNs, selects the understood EARFCN at operation 2635. The UE 2605, if understanding one or more EARFCNs, selects an EARFCN by applying a predetermined rule at operation 2635. Understanding one or more EARFCNs may be appreciated as different EARFCNs specifying the same frequency, indeed.

As an example, summarizing the rule by the UE 2605 determines EARFCNs, the UE 2605 may make such determination based on whether the corresponding frequency band identifier is larger or smaller or based on whether the EARFCN is larger or smaller. As an example of the determination based on whether the corresponding frequency band identifier is larger or smaller, the EARFCN with the highest or lowest frequency band identifier may be selected. As an example of the determination based on whether the EARFCN is larger or smaller, the highest or lowest EARFCN may be selected.

The UE 2605 generates a control message, MBMS Interest Indication, containing the selected EARFCN, and transmits the generated MBMS Interest Indication message to cell a 2610 at operation 2640. Cell a 2610 determines whether to allow the UE 2605 to hand over by referencing the MBMS Interest Indication message in the future. As an example, cell a 2610 recognizes the frequency at which the UE 2605 receives an MBMS service and manages the mobility of the UE 2605 such that such a situation does not occur where the UE 2605 fails to receive the frequency.

Figure 27:
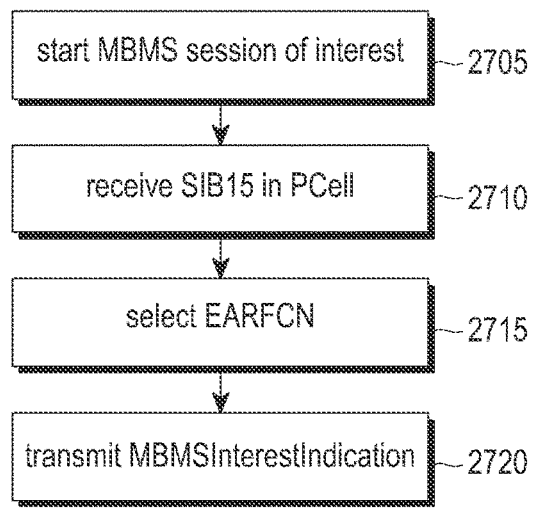
FIG. 27 is a view illustrating a flow of control performed by a UE according to an embodiment of the present disclosure.

FIG. 27 illustrates a flow of control performed by a UE according to an embodiment of the present disclosure.

Referring to FIG. 27, the UE, at operation 2705, recognizes that the MBMS service MBMS session which the UE intends to receive is started soon.

The UE, at operation 2710, receives SIB from a P-Cell 15 to determine whether there is a frequency at which the MBMS session may be received and examines per-frequency SAI information of the received SIB 15.

As an example, the UE examines whether the per-frequency SAI information of the received SIB 15 meets the following condition.

There is SAI corresponding to the MBMS session which the UE intends to receive among frequencies included in SIB 15. The frequency is denoted frequency x.

The UE may simultaneously receive the current serving frequency and frequency x.

The band of frequency x is included in the supportable frequency band combination (supported_Band_Combination) reported in the UE capability report control message.

The UE terminates the whole process if frequency x is not in the supportable frequency band combination. The UE, if frequency x is in the supportable frequency band combination, selects the EARFCN for frequency x at operation 2715.

The UE, at operation 2720, generates an MBMS Interest Indication control message including the EARFCN and transmits to an eNB.

Proposed is a scheme for applying differentiated operations to a primary set and a non-primary set when SR errors occur according to an embodiment of the present disclosure.

Typically, the UE requests the eNB to allocate transmission resources in order to transmit data on uplink. For example, the UE may request the allocation of transmission resources using a scheduling request (SR) transmission resource allocated to the UE or using a random access procedure.

As an example, a dedicate-scheduling request (D-SR) procedure defines an operation of requesting transmission resources to transmit uplink data using SR transmission resources. A random access-scheduling request (RA-SR) procedure defines an operation of requesting transmission resources to transmit uplink data using a random access procedure.

The SR transmission resources may be configured as some of PUCCH transmission resources. The PUCCH transmission resources for the UE may be configured by a P-Cell or a PUCCH S_Cell. The UE may have one or more SR transmission resources at a time. In this case, the UE should have a scheme to select an SR transmission resource to be used among one or more SR transmission resources.

For example, in case a non-primary set is configured for the UE, the UE and the eNB may process logical channels separately for each set. As an example, the logical channels for a service with high sensitivity to transmission delays or jitters and creating a small amount of data such as VoIP are processed through a serving cell of the primary set. However, the logical channels for a service creating a great amount of data such as FTP may be processed through a serving cell of a non-primary set.

For ease of description, the logical channel processed in a serving cell of a primary set is denoted a "primary set logical channel," and the logical channel processed in a serving cell of a non-primary set is denoted a "non-primary set logical channel."

The eNB informs the UE, using a control message such as an RRC connection reconfiguration, which one is a primary set logical channel and which one is a non-primary set logical channel. It may also be possible to explicitly notify the non-primary set logical channel so that the other logical channel is recognized as the primary set logical channel.

The UE, if a regular BSR is caused by data of a logical channel, determines whether the BSR has been triggered by the primary set logical channel or by the non-primary set logical channel.

If the BSR has been triggered by the primary set logical channel, the UE triggers the SR transmission of the P-Cell. However, if the BSR has been triggered by the non-primary set logical channel, the UE triggers the SR transmission of the PUCCH S_Cell.

The UE increases related SR_COUNTER by one whenever transmitting SRs. The UE, unless SR is canceled until SR_COUNTER reaches a predetermined reference value, determines that SR transmission has failed. The SR_COUNTER includes SR_COUNTER for P-Cell (hereinafter, "SR_COUNTER_P") and SR_COUNTER for PUCCH S_Cell (hereinafter, "SR_COUNTER_NP").

The UE receives dsr-TransMax and dsr-TransMax NP from the eNB. dsr_TransMax is configured before the non-primary set serving cell is configured, and dsr-TransMax NP is configured while the non-primary set serving cell is configured.

The UE, when SR transmission failure occurs, performs differentiated operations depending on the serving cells where SR transmission failure has occurred.

Figure 28:
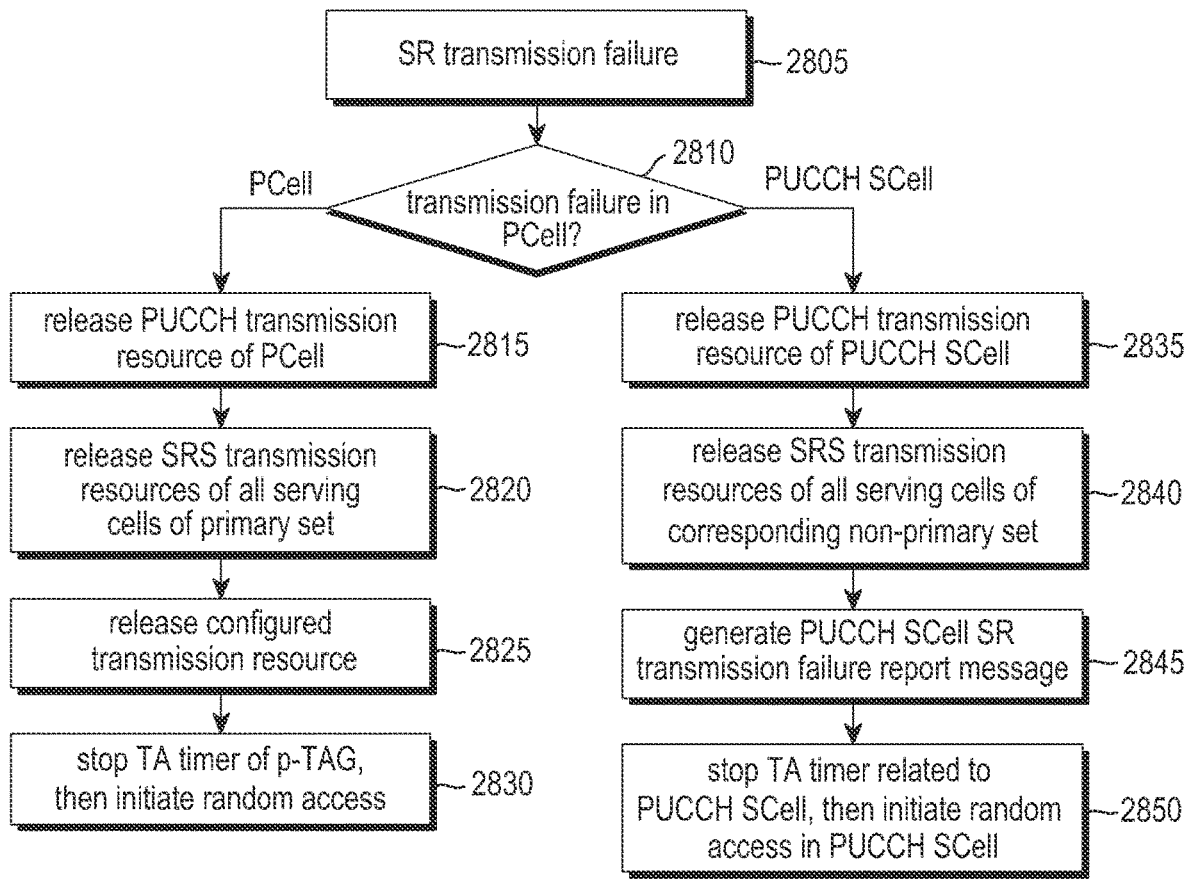
FIG. 28 is a view illustrating a flow of control performed by a UE configured with inter-eNB CA upon Scheduling Request (SR) transmission failure according to an embodiment of the present disclosure.

FIG. 28 illustrates a flow of control performed by a UE configured with inter-eNB CA upon SR transmission failure according to an embodiment of the present disclosure.

Referring to FIG. 28, the UE, if SR transmission failure occurs, determines whether SR transmission failure occurs in a P-Cell or in a PUCCH S_Cell at operations 2805 and 2810. For example, the UE examines whether the SR transmission failure has been determined by the result of comparison between SR_COUNTER_P and dsr-TransMax or by the result of comparison between SR_COUNTER_NP and dsr-TransMax NP.

The UE, if SR transmission fails in the P-Cell (or primary set), proceeds with operation 2815, and if SR transmission fails in the PUCCH S_Cell (or non-primary set), proceeds with operation 2835.

"SR transmission fails in the P-Cell" means a problem has arisen in the backward transmission of the P-Cell. "SR transmission fails in the PUCCH S_Cell" means a problem has arisen in the backward transmission of the PUCCH S_Cell. For example, the problem may be a configuration error in backward transmission power. In such case, proper measures need to be taken to the corresponding set as well as the corresponding cell.

The UE releases the PUCCH transmission resources of the P-Cell and releases the SRS transmission resources of all the serving cells in the primary set at operations 2815 and 2820. The UE may release the SRS transmission resources of P-TAG serving cells as well. The UE releases the configured transmission resources, i.e., configured backward grants and configured forward assignments at operation 2825. The UE initiates random access in the P-Cell at operation 2830.

As described above, the SR transmission failure may have probably come from configuration errors in backward transmission power. In such case, the UE may reconfigure the backward transmission power through power ramping in the random access procedure. The SR transmission failure may come from the UE's backward sync problem. In such case, the UE may reestablish backward sync through the random access procedure.

If the TA timer of the TAG where the serving cell, in which random access is to be performed, belongs is being driven at the time, the UE disregards the TA command received in the random access procedure. Accordingly, the UE, at operation 2830, examines whether the TA timer of the P-TAG is being driven before initiating random access, and if being driven, stops the timer.

The UE, if proceeding with operation 2835, releases the PUCCH transmission resources of the PUCCH S_Cell. The UE releases the SRS transmission resources of all the serving cells in the non-primary set at operation 2840. The UE may release the SRS transmission resources of the serving cells belonging to the same TAG as the PUCCH S_Cell.

The UE generates an RRC control message to report that SR transmission failure has occurred in the PUCCH S_Cell at operation 2845. The RRC control message may include the identifier of the PUCCH S_Cell where the SR transmission failure has occurred and information on the SR transmission power. As an example, the information on the SR transmission power may include an average value of the transmission power values that the UE has applied to the SR transmission or information indicating whether the SR transmission power has exceeded the maximum transmission power.

The UE initiates a random access procedure in the PUCCH S_Cell at operation 2850. The UE examines whether the TA timer related to the PUCCH S_Cell, i.e., the TA timer of the TAG where the PUCCH S_Cell belongs, is being driven prior to initiating the random access, and if being driven, stops the timer.

Proposed is a UE's operation for RRC diversity according to an embodiment of the present disclosure. That is, according to the following embodiment, prepared is a scheme in which the UE reduces handover failure by communicating mobility related control messages with a plurality of cells.

Figure 29:
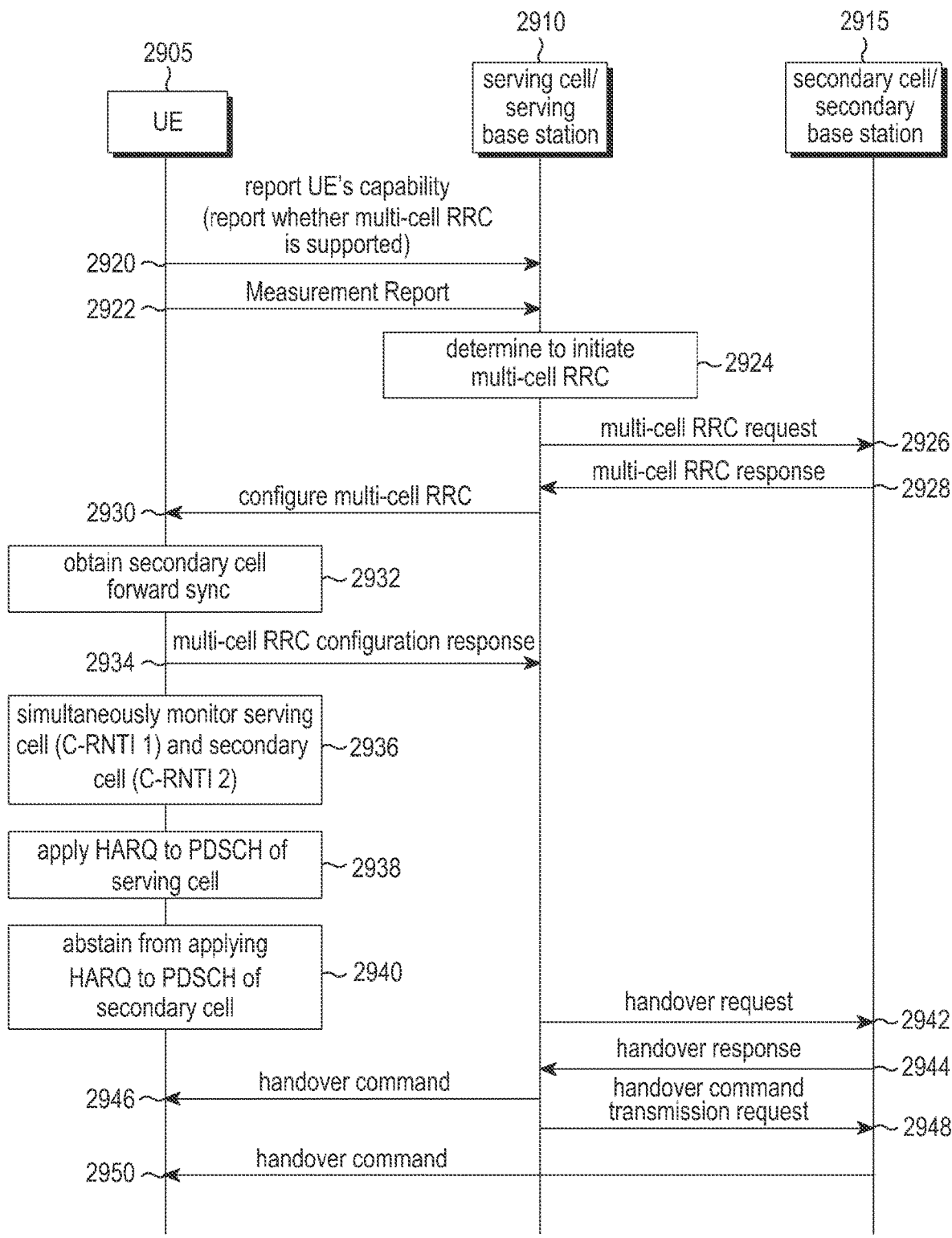
FIG. 29 is a view illustrating a signaling procedure according to an embodiment of the present disclosure.

FIG. 29 illustrates a signaling procedure according to an embodiment of the present disclosure.

Referring to FIG. 29, if predetermined conditions are met in an LTE network, a UE 2905 reports its capability to a S-eNB 2910 at operation 2920. A representative example of the predetermined conditions is that an eNB requests the UE to report its capability.

The capability report message includes a list of frequency bands supported by the UE, a frequency band combination list, and MIMO capability per frequency band combination. Besides, the capability report message may further include information indicating whether the UE supports a multi-cell RRC function. Here, the multi-cell RRC function is information indicating whether the UE may receive an RRC control message from the serving cell and a neighbor cell meeting a predetermined condition (hereinafter, "secondary cell").

To that end, the multi-cell RRC capability information includes first information and second information. The first information is information indicating whether the UE supports the multi-cell RRC function in case the serving cell and the secondary cell have the same center frequency (intra-frequency case). The first information may be defined by one bit commonly applied to all frequency bands. The second information is information indicating whether the UE supports the multi-cell RRC function in case the serving cell and the secondary cell have different center frequencies (inter-frequency case). The second information may be represented with one bit per frequency band combination in the "frequency band combination list supported by the UE."

For example, if the second information was set to "Yes" for a frequency band combination, this means that, although the serving cell and the secondary cell have different center frequencies for the frequency band combination, the UE supports the multi-RRC function.

If a predetermined event occurs while the UE communicates data with the current serving cell (or base station), the UE generates a measurement result message and transmits to the S-eNB at operation 2922. As an example, the predetermined event may be when such a situation occurs where the channel quality of a neighbor cell meets a predetermined reference.

The measurement result message may include information regarding, e.g., the identifier of a cell with the channel quality meeting the predetermined reference, the forward center frequency, the channel quality of cell, or strength of a reference signal of cell. For example, the identifier of the cell with the channel quality meeting the predetermined reference may be a physical layer cell identifier (PCI or Physical Cell Id).

The S-eNB 2910 receives the measurement result message from the UE 2905. "The measurement result message has been received" means that, in case the neighbor cell transmits forward data to the UE 2905, the UE 2905 has a high chance to be successfully receive the forward data.

For example, if the UE's multi-cell RRC capability allows RRC control messages to be communicated in the neighbor cell and the current serving cell, the S-eNB 2910 determines that the neighbor cell is set to the secondary cell for the UE 2905 at operation 2924. The S-eNB 2910 transmits, to a base station managing the secondary cell (hereinafter, "secondary base station") 2915, a control message to request to apply the multi-cell RRC function to the UE 2905 (at operation 2926. The control message may contain information related to the identifier (C-RNTI) of the UE and the UE's channel state.

The secondary base station 2915 determines whether to accept the request from the S-eNB 2910 considering the cell load condition of the secondary cell and the allocation condition of the C-RNTI. The secondary base station 2915, if determining to accept, transmits to the S-eNB 2910 a control message to accept the multi-cell RRC request at operation 2928. The control message includes the C-RNTI information to be applied to the UE. The C-RNTI may be the same or different from the C-RNTI used by the UE in the serving cell (hereinafter, "C-RNTI 1").

The secondary base station 2915, if C-RNTI 1 is being used in the secondary cell, may select one of unused C-RNTI's and include in the control message. Hereinafter, the C-RNTI allocated by the secondary base station to the UE is denoted "C-RNTI 2."

The S-eNB 2910 generates a control message to instruct multi-cell RRC configuration and transmits to the UE 2905 at operation 2930. The control message may include information specifying the secondary cell, the C-RNTI 2 information, and information specifying a search space.

For example, the information specifying the secondary cell includes information specifying the forward center frequency of the secondary cell and PCI information. In this case, C-RNTI 2 may or may be not included. As an example, unless C-RNTI 2 is included, this means that C-RNTI 1 is the same as C-RNTI 2.

The information specifying the search space is information for informing what search space should be monitored when the UE monitors the PDCCH of the secondary cell. The search space includes a UE-specific search space and a common search space.

The UE 2905 monitors both the UE-specific search space and the common search space for the serving cell and only part of the UE-specific search space meeting a predetermined condition for the secondary cell. As an example, the predetermined condition may be a search space with an aggregation level more than a predetermined value. The search space-related information may be related to the aggregation level. For example, if n has been designated as the search space-related information in the configuration message, the UE 2905 monitors, using C-RNTI 2, only the search space with an aggregation level more than n among UE-specific search spaces.

When receiving the control message, the UE 2905 obtains forward sync for the secondary cell at operation 2932. Here, "obtaining forward sync for the secondary cell" means that receiving a predetermined forward channel (e.g., a sync channel) of the secondary cell to establish frequency sync and time sync.

The UE 2905, if forward sync with the secondary cell is established, generates a multi-cell RRC control message including information indicating that the multi-cell RRC configuration has succeeded, and transmits to the S-eNB 2910 at operation 2934. The multi-cell RRC control message may include the latest measurement result for the secondary cell or channel quality indicator (CQI) information on the secondary cell.

After transmitting the multi-cell RRC control message, the UE 2905 simultaneously monitors the PDCCHs of the serving cell and the serving cell at operation 2936. The UE 2905 applies C-RNTI 1 to the serving cell to monitor UE-specific search spaces with all the aggregation levels and common search spaces with aggregation level 4 and aggregation level 8 while applying C-RNTI 2 to the secondary cell to monitor a UE-specific search space with a predetermined aggregation level.

If forward data is scheduled in the serving cell, i.e., if the PDSCH addressed to C-RNTI 1 is received, the UE 2905 applies an HARQ operation at operation 2938. As an example, the UE 2905 decodes the PDSCH. The UE 2905, if the decoding succeeds, transmits an HARQ ACK, and if fails, transmits an HARQ NACK.

The UE 2905, if forward data is scheduled in the secondary cell, i.e., if the PDSCH addressed to C-RNTI 2 is received in the secondary cell, does not apply the HARQ operation at operation 2940. The UE 2905 decodes the PDSCH. The UE 2905, if the decoding succeeds, transfers the decoded data to a higher layer device, e.g., an RRC device, and does not transmits an HARQ feedback. The UE 2905, if the decoding fails, discards the data and does not transmit the HARQ feedback.

The S-eNB 2910 may determine to allow the UE 2905 to hand over to a predetermined cell at a time. In such case, the S-eNB 2910 transmits a control message to request handover (HANDOVER REQUEST) to the secondary base station of a handover candidate cell at operation 2942. Here, assume that the handover target cell is the same as the secondary cell for ease of description. The handover request message may include the UE's identifier, information related to the bearer configured in the UE, and security-related information.

The secondary base station 2915 determines whether to accept the handover request. The secondary base station 2915, if determining to accept the handover request for the UE 2905, generates a handover request response message (HANDOVER REQUEST ACK) and transmits to the S-eNB 2910 at operation 2944.

The S-eNB 2910 receives the handover request response message and generates a handover command RRC control message (RRC connection configuration) based on the information included in the received handover request response message. The S-eNB 2910 generates Message Authentication Code-Integrity (MAC-I). The S-eNB 2910 scrambles an MAC-I attached handover command RRC control message (RRC connection reconfiguration) to generate a PDCP PDU. The S-eNB 2910 adds a handover command to the generated PDCP PDU to generate an MAC PDU, and transmits the generated MAC PDU to the UE 2905 at operation 2946.

The S-eNB 2910 transmits the handover command transmission request control message to the secondary base station 2915 at operation 2948. The handover command transmission request control message may include the MAC PDU, a level at which the MAC PDU is properly transmitted and its related information, or the CQI information reported by the UE 2905 at operation 2934. The MAC PDU may be the same as the MAC PDU transmitted at operation 2946.

The secondary base station 2915 transmits, to the UE 2905, the MAC PDU contained in the handover command transmission request control message using C-RNTI 2 and a predetermined search space at operation 2950.

The UE 2905, when receiving the handover command control message from one of the serving cell or the secondary cell, initiates a handover procedure by applying the received handover command control message information.

The UE 2905, when receiving the handover command control message from both the serving cell and the secondary cell, initiates a handover procedure by applying the received handover command control message information. The UE 2905 disregards the handover control message received later.

Figure 30:
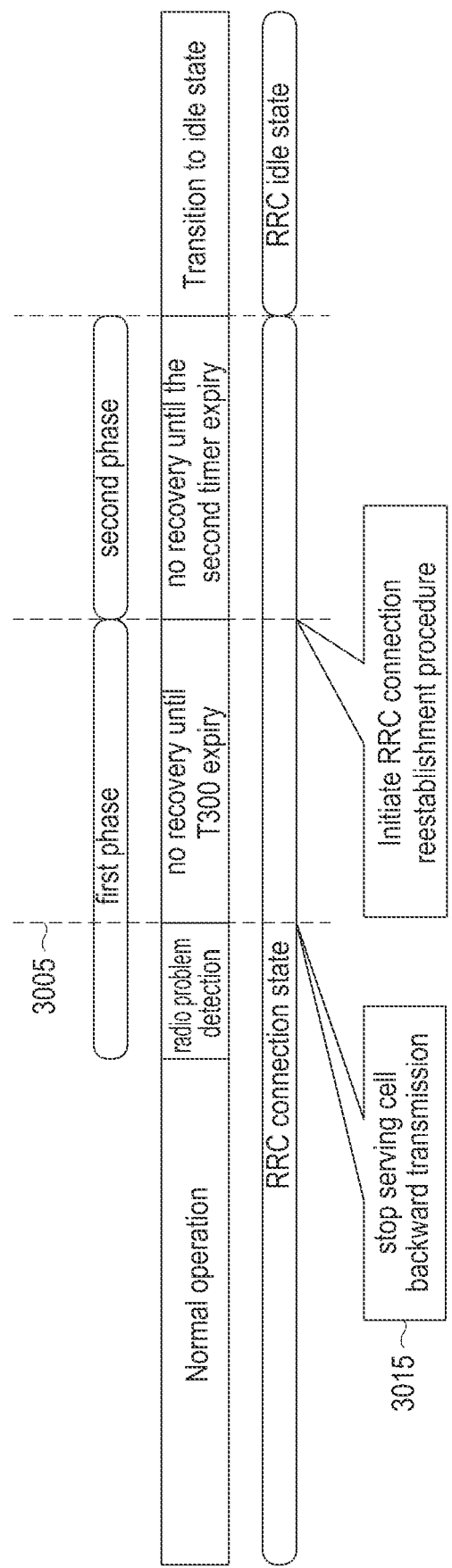
FIG. 30 is a view illustrating a UE's operation upon radio link failure according to an embodiment of the present disclosure.

FIG. 30 illustrates a UE's operation upon radio link failure according to an embodiment of the present disclosure.

In the mobile communication system, the serving radio link state may be deteriorated due to unexpected errors in such an extent that the normal communication is impossible even before the eNB commands the UE to hand over. If such circumstance arises, the UE may be at an impasse in the current serving cell. To prevent this, the UE continues to monitor the channel state of the current serving cell. The UE, if the channel state of the current serving cell meets a predetermined condition, may control its mobility on its own. This is referred to as "radio channel monitoring (radio link monitoring)." The UE applies differentiated radio channel monitoring operations to the cases a multi-RRC function has been configured or not.

The UE, if the channel state of the serving cell lasts at less than a predetermined reference for a predetermined time, determines that a radio link problem has occurred (radio link problem detection) (3005).

For example, the UE may determine that the radio link problem has occurred when async indicators have been consecutively generated N310 times for the serving cell. The async indicators are generated when the reception quality of a predetermined channel or signal of the serving cell (e.g., cell reference signal (Cell Reference Signal)) fails to meet a predetermined reference. As an example, the async indicators are generated when the situation where the PDCCH error ratio calculated with respect to the reception quality is more than 10% lasts 200 ms or more. The UE obtains N310 from SIB2 of the serving cell.

The UE, upon detecting a radio link problem, stops the backward transmission of the serving cell and drives the T310 timer (3015). The T310 timer is broadcast through SIB2 of the serving cell.

The UE, unless the multi-RRC function is configured, monitors whether the serving cell is restored while the T310 is driven. For example, the UE determines that the serving cell has been restored when the sync indicators have been consecutively generated N311 times for the serving cell. The sync indicators are generated when the reception quality of a predetermined channel or signal of the serving cell (e.g., cell reference signal (Cell Reference Signal)) meets a predetermined reference. As an example, the sync indicators are generated when the situation where the PDCCH error ratio calculated with respect to the reception quality is more than 5% lasts 100 ms or more. The UE obtains N311 of SIB2 of the P-Cell.

The UE, if the multi-RRC function is configured, monitors whether the serving cell is restored while the T310 is driven, simultaneously monitoring whether a handover command control message is received in the secondary cell. The UE, if the handover command control message is received in the secondary cell, stops T310 and initiates handover.

The UE, unless the serving cell is restored until T310 expires, declares a radio link failure, drives T311, and initiates an RRC connection reestablishment process. The RRC connection reestablishment process means a process in which the UE searches for a cell where communication is to be resumed and communicates predetermined RRC control messages with the cell to resume the RRC connection.

The UE, if the multi-RRC function is configured, monitors whether the handover command control message is received in the secondary cell while T311 is driven. The UE, if the handover command control message is received in the secondary cell, stops T311 and initiates handover. The UE selects the secondary cell ahead of other cells when selecting the cell where the UE is to resume communication.

The UE, when receiving a predetermined RRC control message, performs integrity check on the MAC-I of the received RRC control message. Upon integrity check failure, the UE examines whether the cell where the RRC control message has been received is the serving cell or the secondary cell.

If the RRC control message has been received from the serving cell, the UE initiates an RRC connection reestablishment process. If the RRC control message has been received from the secondary cell, the UE discards the received RRC control message and does not initiate the RRC connection reestablishment process.

Proposed is a new scheme related to MTC according to an embodiment of the present disclosure.

Typically, MTC devices have a very long communication period and use batteries without continuously powered in communicating with eNBs. Representative MTC devices include meter devices or sensors. A very critical issue for MTC devices is efficient power consumption. Proposed is a method for facilitating paging reception when using a very long DRX period to allow MTC devices to efficiently use power according to an embodiment of the present disclosure.

Figure 31:
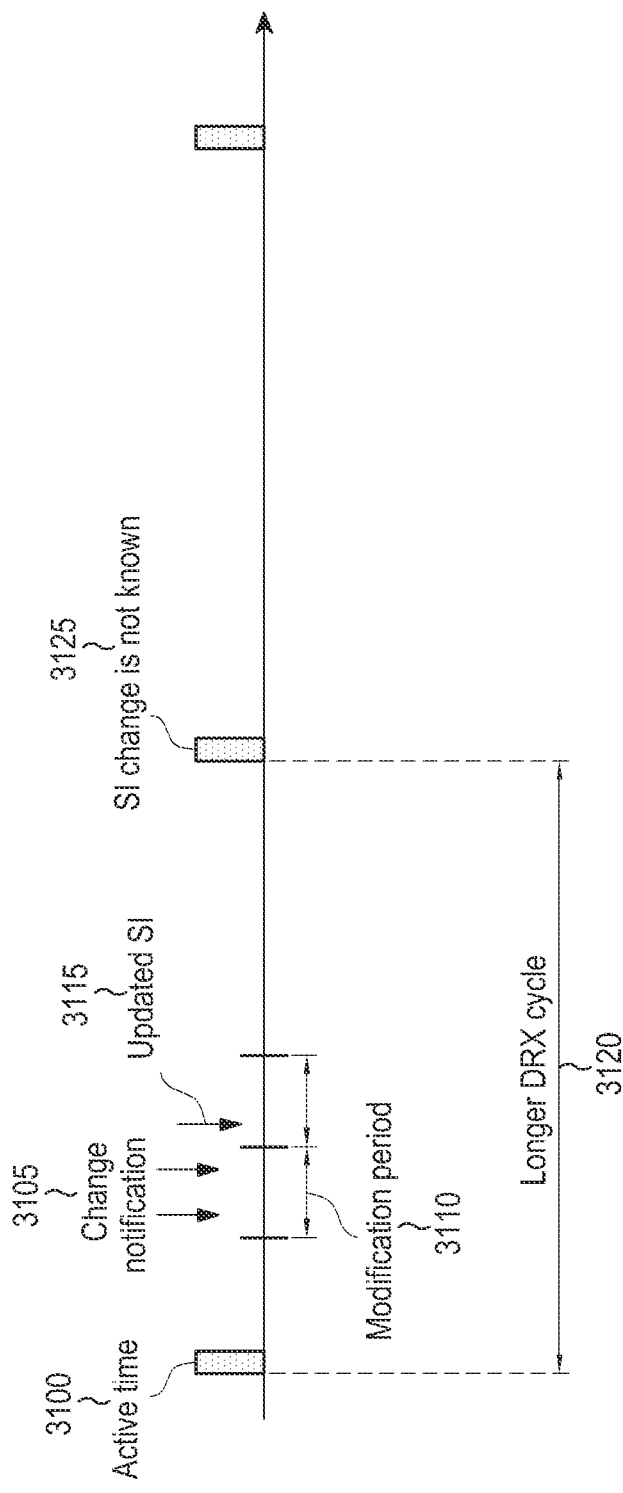
FIG. 31 is a view illustrating a scheme for saving power consumption for Machine Type Communications (MTC) devices according to an embodiment of the present disclosure.

FIG. 31 is a view illustrating a scheme for saving power consumption for MTC devices according to an embodiment of the present disclosure. FIG. 31 is a view for describing the issue of missing identifying newly updated system information in case a very long DRX cycle applied.

Referring to FIG. 31, the eNB, if SI is changed in the method of identifying SI change and updating SI, informs the UE, using a paging 3105, that the SI is to be changed during a predetermined modification period 3110.

The UE may receive the paging in an Active time interval 3100 that comes at each DRX period. The UE grasps that the SI is to be changed soon by receiving the paging.

The eNB broadcasts the changed SI 3115 in a next modification period. Typically, the maximum DRX cycle is defined as 2.56 seconds in the LTE system. Accordingly, the modification period 3110 should be set so that the UE can receive the paging even when the DRX cycle up to 2.56 seconds applies.

If a very long DRX cycle 3120 applies to save the power consumption of an MTC device, the MTC device cannot receive a paging indicating whether SI has changed. This leads the MTC device to use wrong SI when the Active time 3125 comes up and the MTC device receives the paging. An approach to prevent this is to allow the eNB to continue to transmit the paging for a period equal or longer than the very long DRX cycle so that the MTC device can receive the paging indicating the SI change even though the very long DRX cycle applies.

This may cause a very large signaling overhead, and thus, is not a good method. Proposed is a method in which when a very long DRX cycle applies, the MTC device wakes up prior to the paging reception timing to receive SI, according to an embodiment of the present disclosure.

Figure 32:
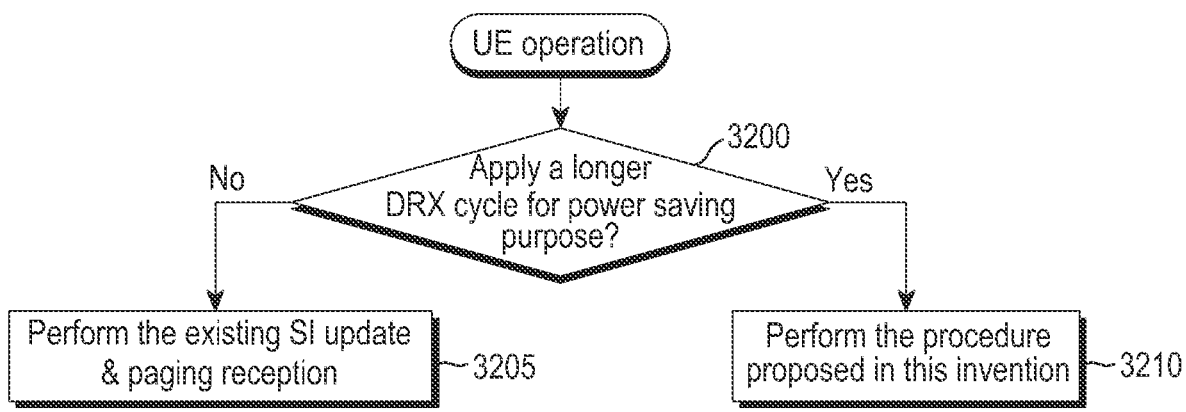
FIG. 32 is a view illustrating conditions for applying an embodiment of the present disclosure.

FIG. 32 is a view illustrating conditions for applying an embodiment of the present disclosure.

Referring to FIG. 32, the MTC device, at operation 3200, determines whether a very long DRX cycle has applied to save power consumption. The MTC device, unless the very long DRX cycle has applied, performs SI update and paging reception operations by a normal method at operation 3205. The MTC device, if the very long DRX cycle has applied, applies a newly proposed method at operation 3210.

For example, the proposed method features the following.

First, a very long DRX cycle configured by a predetermined method is set to be longer than the modification period.

Second, in case a very long DRX cycle applies, the UE wakes up earlier than the paging reception timing to perform a cell selection or cell reselection operation, and then performs an operation for receiving SI.

Third, the time when the UE wakes up may be set by the eNB or may be a predetermined time or may be determined by the UE's implementation.

Fourth, to save reception time in the SI reception operation, a new indicator is included in SIB1, and it is determined based on the same whether to receive SIB information subsequent to SIB1.

Fifth, the indicator is used by only the UE applying the very long DRX cycle. Whenever SI is changed, it is increased by one within a particular range, and it is reflected whether the SIB14 information including at least EAB (Extended Access Barring).

Figure 33:
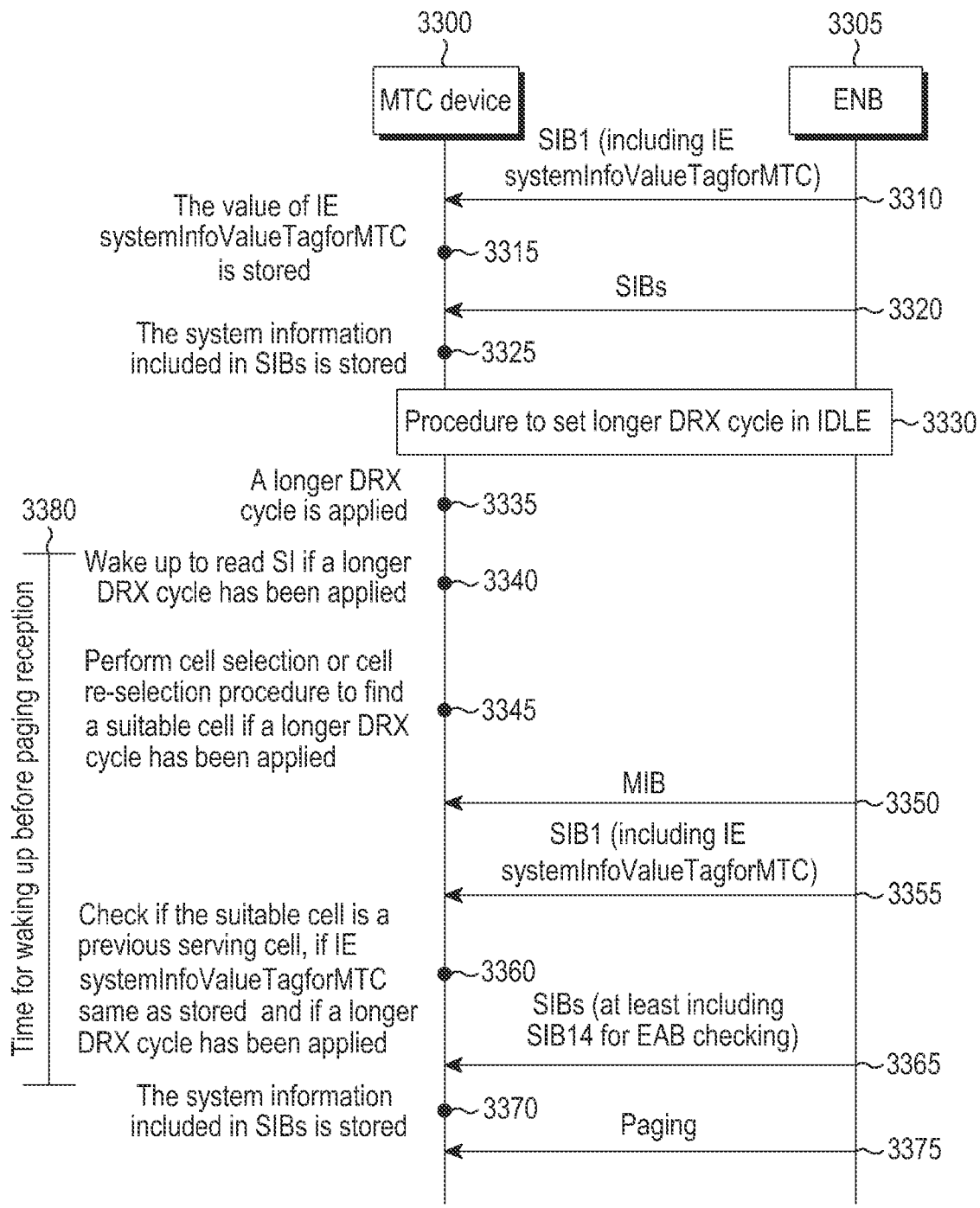
FIG. 33 is a view illustrating a procedure for a scheme in which an MTC device wakes up earlier than a paging reception timing to receive Status Information (SI) according to an embodiment of the present disclosure.

FIG. 33 illustrates a procedure for a scheme in which an MTC device wakes up earlier than the paging reception timing to receive SI according to an embodiment of the present disclosure. In the proposed embodiment, in case a very long DRX cycle applies, the MTC device wakes up earlier than the paging reception timing to perform a cell selection or cell reselection operation, and then, includes a new indicator in SIB1 in the SI reception operation in order to save reception time.

Referring to FIG. 33, an MTC device 3300, at operation 3310, receives the SIB1 information from an eNB 3305. The SIB1 includes a newly defined indicator and a systemInfoValueTagforMTC. The indicator, unlike the value tag, has a value increased by one within a particular range even when SIB14 including at least EAB information is changed.

If, whenever SI is changed, the indicator's value is increased by one and reaches the maximum value, the MTC device 3300 resets the indicator's value that has reached the maximum value to "0." The EAB information indicates whether to allow MTC devices to access. Accordingly, whether the EAB information is changed is critical information to the MTC devices applied with a very long DRX cycle.

The legacy value tag indicator indicating changes in SI do not reflect whether SIB14 is changed. The newly defined indicator disregards MTC devices not applied with the very long DRX cycle.

The MTC device 3300, at operation 3315, records the received indicator information. The MTC device 3300, at operation 3320, receives the remaining SIBs. The MTC device 3300, at operation 3325, stores the SI. The MTC device 3300 and the eNB 3305, at operation 3330, apply the very long DRX cycle depending on predetermined methods. The very long DRX cycle means a value larger than a particular value with a period longer than at least 2.56 seconds. The particular value may be set or may be predetermined value. The MTC device 3300, at operation 3335, applies the determined very long DRX cycle.

The MTC device 3300, at operation 3340, if the very long DRX cycle has applied, wakes up before the paging reception timing that then comes up. The time 3380 when the MTC device 3300 wakes up before the paging reception time may be set by the eNB 3305, may be a predetermined time, or may be determined by the UE's implementation.

The MTC device 3300, if the very long DRX cycle is used, performs a cell selection or cell reselection process at operation 3345. Since the MTC device 3300 cannot measure channel during the very long DRX cycle, it is needed to be checked whether the UE has moved and whether the suitable cell where communication is possible is still the previous serving cell.

Accordingly, in the proposed embodiment, a process in which the MTC device with the very long DRX cycle newly discovers a suitable cell before the paging reception timing is necessarily performed.

The MTC device 3300 receives MIB at operation 3350 and receives SIB1 at operation 3355. SIB1 includes the above-mentioned indicator. The method in which the indicator is not included or the indicator is not used has been described above in connection with the second embodiment.

At operation 3360, the MTC device 3300, if the MTC device 3300 uses a very long DRX cycle, the newly discovered suitable cell is the previous serving cell, and the indicator's value is the same as the value of the previously recorded indicator, does not receive SIBs subsequent to SIB1. The reason is that this means that the SI retained by the MTC device 3300 has not been newly renewed.

Otherwise, the MTC device 3300, at operation 3365, receives necessary subsequent SIBs. If there are the SIBs, the SIBs contain at least SIB14. The MTC device 3300, at operation 3370, stores the received SI information. The MTC device 3300, at operation 3375, receives a paging using the stored SI.

Figure 34:
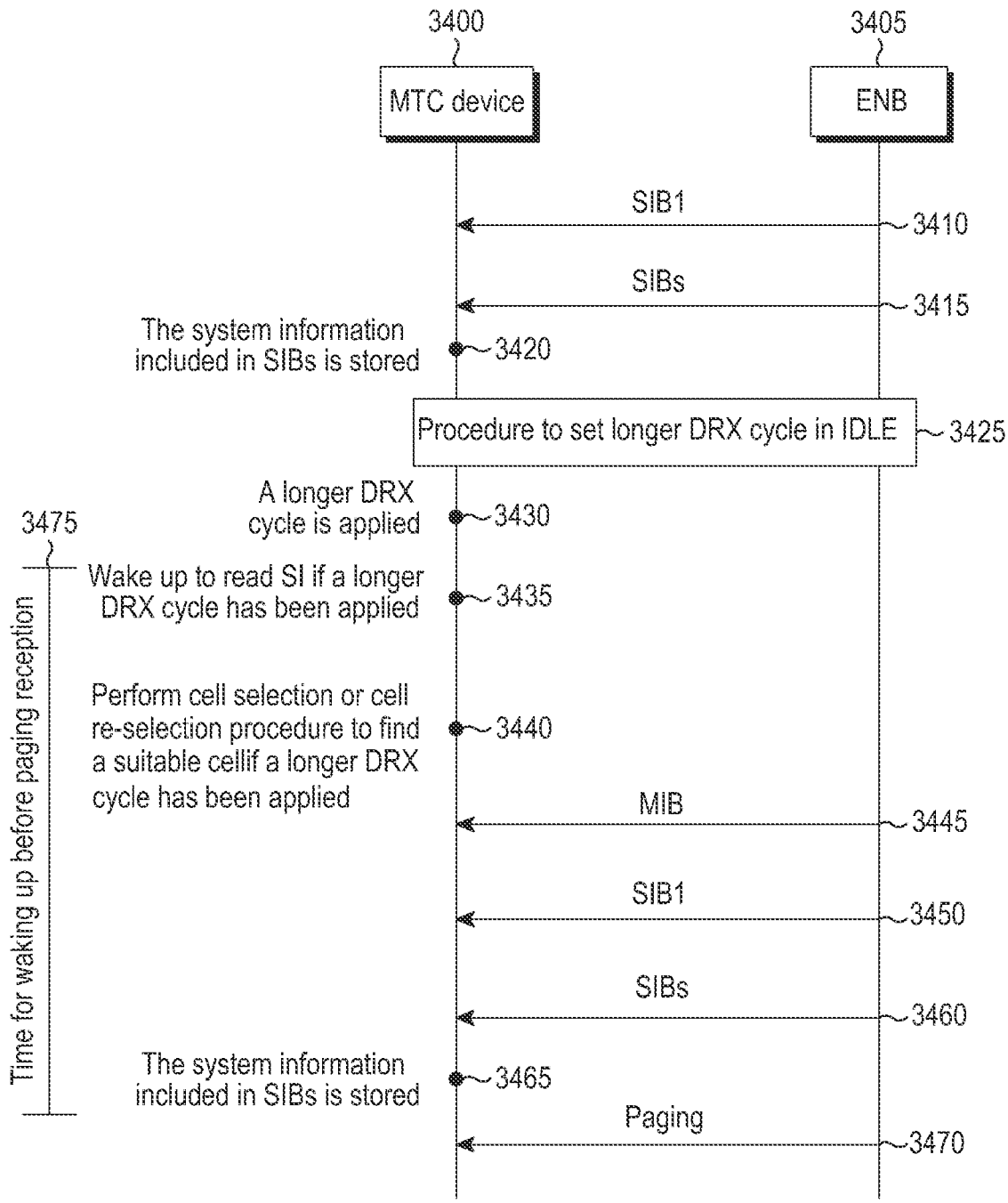
FIG. 34 is a view illustrating a procedure for another scheme in which an MTC device wakes up earlier than a paging reception timing to receive SI according to an embodiment of the present disclosure.

FIG. 34 illustrates a procedure for a scheme in which an MTC device wakes up earlier than the paging reception timing to receive SI according to an embodiment of the present disclosure. In the proposed embodiment, in case a very long DRX cycle applies, the MTC device wakes up earlier than the paging reception timing to perform a cell selection or cell reselection operation, and then performs an operation for receiving SI.

Referring to FIG. 34, an MTC device 3400, at operation 3410, receives the SIB1 information from an eNB 3405, and at operation 3415, receives the remaining SIBs. The MTC device 3400, at operation 3420, stores the SI. The MTC device 3400 and the eNB 3405, at operation 3425, apply the very long DRX cycle depending on predetermined methods. For example, the MTC device 3400, at operation 3425, applies the determined very long DRX cycle.

The MTC device 3400, at operation 3430, if the very long DRX cycle applies, wakes up before the paging reception timing that then comes up. The time 3475 when the MTC device 3300 wakes up before the paging reception time may be set by the eNB 3405, may be a predetermined time, or may be determined by the UE's implementation.

The MTC device 3400, if the very long DRX cycle is used, performs a cell selection or cell reselection process at operation 3435. Since the MTC device 3400 cannot measure channel during the very long DRX cycle, it is needed to be checked whether the UE has moved and whether the suitable cell where communication is possible is still the previous serving cell.

Accordingly, in the proposed embodiment, a process in which the MTC device with the very long DRX cycle newly discovers a suitable cell before the paging reception timing is necessarily performed. Further, in the second embodiment, no indicator is used to receive all the SIBs necessary for the MTC device.

To that end, the MTC device 3400 receives MIB at operation 3445 and receives SIB1 at operation 3450. Besides, the MTC device 3400 additionally receives actually necessary SIB information, e.g., SIB2 and SIB14. Since it does not take the MTC device 3400 to receive SIBs, indicators as used in the first embodiment might not be that useful. Further, it may prevent an increase in complexity due to introduction of a new indicator.

The MTC device 3400, at operation 3460, receives necessary SIBs subsequent to SIB1. The MTC device 3400, at operation 3465, stores the received SI. The MTC device 3400, at operation 3570, receives a paging using the stored SI.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

The invention claimed is:

1. A method for providing a broadcast service based on multiple frequency bands by a terminal in a wireless communication system, the method comprising:
   determining whether a frequency band combination supported by the terminal includes a frequency band of a frequency at which a particular broadcast service is received by the terminal;
   determining one of two frequency bands included in the frequency band combination, wherein a center frequency of a cell belongs to the two frequency bands;
   transmitting, to a base station, a control message including identification information corresponding to the frequency at which the particular broadcast service is received, wherein the identification information comprises information related to the center frequency; and
   receiving a user service description (USD) specifying a mapping relationship between the particular broadcast service and service area identification (SAI),
   wherein the USD is received via a short message service (SMS), a multimedia message service (MMS) or an internet protocol (IP) multimedia subsystem (IMS), and
   wherein the information related to the center frequency is determined by the terminal based on identifiers of frequency bands included in the frequency band combination.

2. The method of claim 1, wherein the determining comprises:
   identifying whether a system information block (SIB) provided from the cell includes the SAI corresponding to the particular broadcast service;
   if the SIB includes the SAI, determining whether to be able to support a frequency band corresponding to at least one frequency that the system information block includes for the SAI; and
   if the frequency band is supported, identifying use frequency information corresponding to the at least one frequency.

3. The method of claim 2, wherein in a case where the system information block includes a plurality of frequency information corresponding to the SAT, one selected from among the plurality of frequency information is reported to the base station in the control message.

4. The method of claim 3, wherein the determining further comprises:
   determining whether to be able to receive the particular broadcast service using start time information of a broadcast service included in the USD.

5. A terminal for providing a broadcast service based on multiple frequency bands in a wireless communication system, the terminal comprising:
   a transceiver; and
   a processor configured to:
      determine whether a frequency band combination supported by the terminal includes a frequency band of a frequency at which a particular broadcast service is able to be received,
      determine one of two frequency bands included in the frequency band combination, wherein a center frequency of a cell belongs to the two frequency bands,
      control the transceiver to transmit, to a base station, a control message including identification information corresponding to the frequency at which the particular broadcast service is received, wherein the identification information comprises information related to the center frequency,
      control the transceiver to receive a user service description (USD) specifying a mapping relationship between the particular broadcast service and service area identification (SAD,
   wherein the USD is received via a short message service (SMS), a multimedia message service (MMS) or an internet protocol (IP) multimedia subsystem (IMS), and
   wherein the information related to the center frequency is determined by the terminal based on identifiers of frequency bands included in the frequency band combination.

6. The terminal of claim 5, wherein the processor is further configured:
   to identify whether a system information block (SIB) provided from the cell includes the SAI corresponding to the particular broadcast service;

if the SIB includes the SAI, to determine whether to be able to support a frequency band corresponding to at least one frequency that the system information block includes for the SAI; and if the frequency band is supported, to identify use frequency information corresponding to the at least one frequency.

7. The terminal of claim 6, wherein the processor is further configured:

in a case where the system information block includes a plurality of frequency information corresponding to the SAT, to select one frequency information from among the plurality of frequency information and to report the selected frequency information to the base station in the control message.

8. The terminal of claim 7, wherein the processor is further configured to determine whether to be able to receive the particular broadcast service using start time information of a broadcast service included in user service information.

* * * * *